(12) United States Patent
Watanabe

(10) Patent No.: US 7,637,616 B2
(45) Date of Patent: Dec. 29, 2009

(54) RETINAL SCANNING DISPLAY WITH EXIT PUPIL EXPANDED BY OPTICS OFFSET FROM INTERMEDIATE IMAGE PLANE

(75) Inventor: Mitsuyoshi Watanabe, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 308 days.

(21) Appl. No.: 11/727,854

(22) Filed: Mar. 28, 2007

(65) Prior Publication Data
US 2007/0171370 A1    Jul. 26, 2007

Related U.S. Application Data

(63) Continuation-in-part of application No. PCT/JP2005/017680, filed on Sep. 27, 2005.

(30) Foreign Application Priority Data

Sep. 29, 2004  (JP) ............................. 2004-282932
Mar. 9, 2005   (JP) ............................. 2005-065130
Mar. 9, 2005   (JP) ............................. 2005-065132

(51) Int. Cl.
*A61B 3/10* (2006.01)
(52) U.S. Cl. ..................................... 351/211
(58) Field of Classification Search ............. 351/204, 351/205, 206, 246, 247, 209–212; 359/629–633, 359/726–730, 197, 212; 600/558
See application file for complete search history.

(56) References Cited

U.S. PATENT DOCUMENTS

| 5,442,413 | A  | 8/1995  | Tejima et al. |
| 5,701,132 | A  | 12/1997 | Kollin et al. |
| 5,757,544 | A  | 5/1998  | Tabata et al. |
| 5,969,871 | A  | 10/1999 | Tidwell et al. |
| 6,157,352 | A  | 12/2000 | Kollin et al. |
| 2004/0109135 | A1 | 6/2004 | Watanabe et al. |

FOREIGN PATENT DOCUMENTS

| JP | A 6-265814   | 9/1994  |
| JP | A 6-319093   | 11/1994 |
| JP | A 11-326817  | 11/1999 |
| JP | A 2000-155286 | 6/2000 |
| JP | A 2004-191962 | 7/2004 |

*Primary Examiner*—Ricky L Mack
*Assistant Examiner*—Tuyen Q Tra
(74) *Attorney, Agent, or Firm*—Oliff & Berridge, PLC

(57) ABSTRACT

A retinal scanning display device is disclosed which is configured to include: a light source emitting a light beam; a scanner scanning onto a viewer's retina the light beam emitted from the light source; a light exit at which the light beam scanned by the scanner exits the retinal scanning display device; and a pupil expanding element operable to expand an exit pupil of the retinal scanning display device. The pupil expanding element may be disposed at a position which is offset from an intermediate image plane occurring between the light source and the light exit, along and within an optical path defined between the light source and the light exit.

23 Claims, 33 Drawing Sheets

RETINAL SCANNING DISPLAY WITH EXIT PUPIL EXPANDED BY OPTICS OFFSET FROM INTERMEDIATE IMAGE PLANE

CROSS-REFERENCE TO RELATED APPLICATIONS

This application is based on Japanese Patent Applications No. 2004-282932 filed Sep. 29, 2004, No. 2005-065130 filed Mar. 9, 2005 and No. 2005-065132 filed Mar. 9, 2005, and International Application No. PCT/JP2005/017680 filed Sep. 27, 2005, the contents of which are incorporated hereinto by reference.

This application is a continuation-in-part application of International Application No. PCT/JP2005/017680 filed Sep. 27, 2005, now pending, which was published in Japanese under PCT Article 21(2).

BACKGROUND OF THE INVENTION

1. Field of the Invention

The invention relates to retinal scanning display devices configured to allow a light beam to be projected directly onto a retina of a viewer, and allow the projected light beam to be scanned onto the retina, to thereby display an image onto the retina. The invention relates more particularly to techniques of expanding an exit pupil of such retinal scanning display devices.

2. Description of the Related Art

There are known retinal scanning display devices which are configured to allow a light beam to be projected directly onto a retina of a viewer, and allow the projected light beam to be scanned onto the retina, to thereby display an image onto the retina.

Such retinal scanning display devices are, in general, configured to include: (a) a light source emitting a light beam; (b) a scanner scanning onto a retina the light beam emitted from the light source; and (c) a light exit at which the light beam scanned by the scanner exits the retinal scanning display devices.

For enabling a viewer to continue viewing a displayed image in a desirable manner through such a retinal scanning display device, there is a need to maintain alignment between a viewer's eye pupil and an exit pupil defined by the retinal scanning display device.

However, it is typical that a viewer's eye moves more or less while viewing a displayed image, inviting movement of a viewer's eye pupil. For this reason, when the exit pupil of the retinal scanning display device is smaller in size than the viewer's eye pupil, a viewer may possibly lose alignment with the exit pupil.

In other words, if the exit pupil of a retinal scanning display device is smaller than a viewer's eye pupil, light exiting the retinal scanning display device may possibly fail to enter the viewer's eye pupil adequately, resulting in an incapability of desirably focusing a display image onto the viewer's retina.

A conventional technique pertaining to a retinal scanning display device having a light source and a light exit is disclosed in U.S. Pat. No. 5,701,132 which is incorporated herein by reference in its entirety.

By this conventional technique, there is positioned between the light source and the light exit a pupil expanding element (e.g., a diffractive element, a diffraction grating, a diffuser) for expanding an exit pupil of the retinal scanning display device, at the location where an intermediate image plane is to occur, in an optical path between the light source and the light exit.

BRIEF SUMMARY OF THE INVENTION

This conventional technique, however, when implemented, may possibly suffer from degradation in quality of a displayed image in exchange of advantageous enlargement in diameter of the exit pupil. The reasons will be described below more specifically by way of an example in which the pupil expanding element is in the form of a diffraction grating.

Diffraction gratings are categorized into transmissive gratings and reflective gratings. While the transmissive gratings have alternating light-transmissive portions (e.g., slits) and non-light-transmissive portions, the reflective gratings have alternating light-reflective portions (e.g., blazed reflective-surfaces) and non-light-reflective portions.

In either type, typically, diffraction gratings have a periodic pattern of a plurality of light-transmissive or light-reflective portions with a predetermined pitch (hereinafter, referred to as "grating pitch").

For a diffraction grating having periodically repeated light-transmissive or light-reflective portions, there are enhanced both constructive interference of wavelets emanating from source points on those repeated portions of the diffraction grating, and diffraction efficiency of the diffraction grating for incident light thereon at an increasing level with an increase in number of concurrently-illuminated ones of those repeated portions with the incident light.

Further, concurrently-illuminated ones of those repeated portions with incident light on the diffraction grating increase in number with an increase in diameter of an incident beam on the diffraction grating.

Therefore, it is important to adequately optimize a dimensional relationship between the grating pitch and the incident-beam diameter, for achieving high efficiency with which the incident beam is diffracted at the diffraction grating.

In addition, a retinal scanning display device, when operated, allows a beam to emanate from the light source toward the light exit, and intermediately define its beam waist when passing through an intermediate image plane occurring between the light source and the light exit.

For this reason, this retinal scanning display device, when operated to implement the aforementioned conventional technique with a diffraction grating being disposed at the same position as that of the intermediate image plane, causes a beam emanating from the light source to impinge on the diffraction grating with a minimum beam-diameter.

Concurrently-illuminated ones of the repeated light-transmissive or light-reflective portions of the diffraction grating with a incident beam thereon reduces in number with a reduction in diameter of the incident beam.

For those reasons, the aforementioned conventional technique, when implemented without any modifications, causes a reduction in the number of concurrently-illuminated ones of repeated light-transmissive or light-reflective portions of the diffraction grating with a single incident beam thereon, resulting in degraded efficiency with which the incident beam is diffracted.

In other words, the aforementioned conventional technique, when implemented without any modifications, increases a tendency that the incident beam passes through the diffraction grating with scattering, resulting in an increased percentage of the incident beam which is lost without being converted into diffracted light.

Further, the incident beam, when scanned onto a light entrance plane of the diffraction grating with a beam diameter smaller than the grating pitch, causes periodic variations in a pattern of concurrently-illuminated ones of repeated light-transmissive or light-reflective portions of the diffraction grating (e.g., the number of ones of those repeated portions which are present within an illumination area of the incident beam formed at each instant of time). This results in additional periodic variations in a pattern and a brightness of diffracted light beams.

In an exemplary situation, a diffraction grating is light-transmissive, with an array of alternating light-transmissive and non-light-transmissive portions, and an incident beam on the diffraction grating, while being scanned on the grating, illuminates only one light-transmissive portion at a point of time, and illuminates only one non-light-transmissive portion at a different point of time.

In this exemplary situation, an area of the grating which is illuminated by the incident beam at a time changes between a light-transmissive portion and a non light-transmissive portion alternately.

In this exemplary situation, as a result, the possibility arises that periodic variations are caused in a pattern and a brightness of diffracted light beams, and a displayed image exhibits image noises in the form of a periodic array of multiple line pictures.

Further, this conventional technique, when implemented with dust deposited on the surface of the diffraction grating, or with defects introduced during fabrication of the diffraction grating, easily allows those dust and defects to make noises that could adversely affect diffracted light.

As will be apparent from the foregoing description, this conventional technique, when implemented, although can offer advantages of expanding the diameter of the exit pupil, offers the possibility that a displayed image is degraded in quality because of inadequate optimization of the dimensional relationship between the grating pitch and the diameter of the incident beam.

Although the shortcomings of this conventional technique have been described above by way of an example where the pupil expanding element is in the form of a diffraction grating, the possibility exits that a displayed image is degraded in quality when this conventional technique is implemented with the pupil expanding element being of an alternative configuration.

Under the circumstances described above, there is a need of expanding an exit pupil of a retinal scanning display device, while reducing or eliminating degradation in quality of a displayed image.

General Overview of the Invention

According to illustrative embodiments of the invention, a retinal scanning display device is provided which comprises: a light source emitting a light beam; a scanner scanning onto a viewer's retina the light beam emitted from the light source; a light exit at which the light beam scanned by the scanner exits the retinal scanning display device; and a pupil expanding element operable to expand an exit pupil of-the retinal scanning display device.

According to a first aspect of those illustrative embodiments, the pupil expanding element is disposed at a position which is offset from an intermediate image plane occurring between the light source and the light exit, along and within an optical path defined between the light source and the light-exit.

According to a second aspect of those illustrative embodiments, a position adjuster is arranged to adjust a position of the pupil expanding element along the optical path.

According to a third aspect of those illustrative embodiments, a wavefront-curvature modulator is arranged to modulate a wavefront curvature (i.e., the curvature of wavefront) of the light beam emitted from the light source, in response to a depth signal, and a position adjuster is arranged to adjust a position of the pupil expanding element along the optical path, in response to a drive signal reflecting the depth signal.

According to a fourth aspect of those illustrative embodiments, the light source emits a composite light beam having a plurality of different wavelengths, the pupil expanding element is structured to divide the composite light beam incident thereon into a plurality of wavelength components, and to separate each of the wavelength components into a plurality of diffracted beams in different diffraction orders and different propagation directions, the diffracted beams include a zeroth-order diffracted beam and at least one higher-order diffracted beam, on a per-wavelength-component basis, the wavelength components are each separated, at the pupil expanding element, into the zeroth-order diffracted beam and the at least one higher-order diffracted beam, in respective separation ratios, and the pupil expanding element is configured to include an equalizer structured to equalize the separation ratios for the plurality of wavelength components, to each other or one another.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
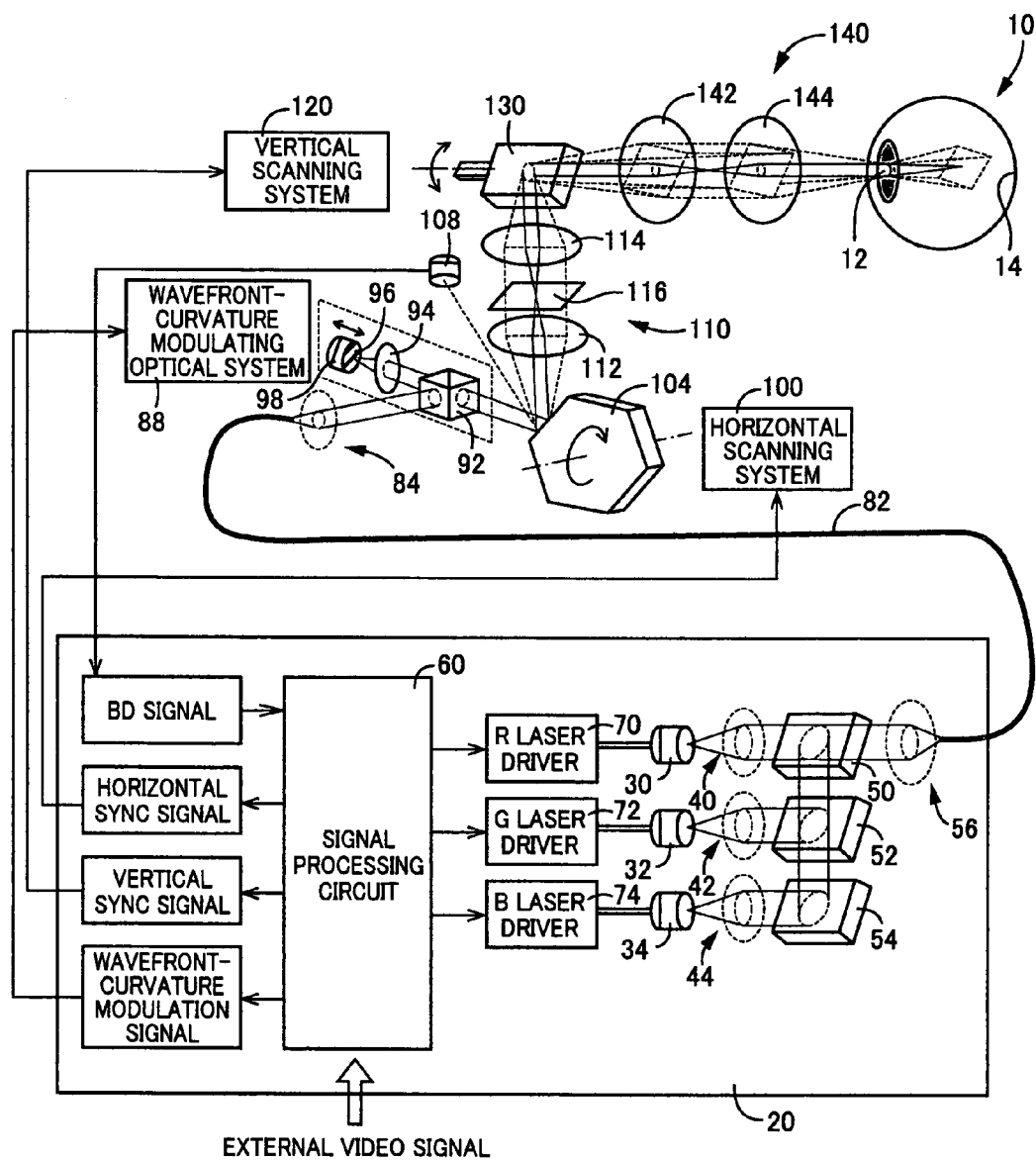
FIG. 1 is a schematic diagram illustrating a retinal scanning display device constructed according to a first illustrative embodiment of the present invention.

The object mentioned above may be achieved according to any one of the following modes of this invention.

These modes will be stated below so as to be sectioned and numbered, and so as to depend upon the other mode or modes, where appropriate. This is for a better understanding of some of a plurality of technical features and a plurality of combinations thereof disclosed in this description, and does not mean that the scope of these features and combinations is interpreted to be limited to the scope of the following modes of this invention.

That is to say, it should be interpreted that it is allowable to select the technical features which are stated in this description but which are not stated in the following modes, as the technical features of this invention.

Furthermore, stating each one of the modes of the invention in such a dependent form as to depend from the other mode or modes does not exclude the possibility that the technical features set forth in a dependent-form mode become independent of those set forth in the corresponding depended mode or modes and to be removed therefrom. It should be interpreted that the technical features set forth in a dependent-form mode are allowed to become independent, where appropriate.

(1) A retinal scanning display device for projecting a light beam directly onto a retina of a viewer, and scanning the projected light beam on the retina, to thereby display an image onto the retina, the retinal scanning display device comprising:

a light source emitting the light beam;

a scanner scanning onto the retina the light beam emitted from the light source;

a light exit at which the light beam scanned by the scanner exits the retinal scanning display device; and a pupil expanding element operable to expand an exit pupil of the retinal scanning display device, the pupil expanding element being disposed at a position which is offset from an intermediate image plane occurring between the light source and the light exit, along and within an optical path defined between the light source and the light exit.

This retinal scanning display device is configured to include a pupil expanding element operable to expand an exit pupil defined by this display device through which a user views an image. The pupil expanding element is disposed at a position offset from an intermediate image plane occurring between a light source and a light exit, along and within an optical path defined between the light source and the light exit.

Because of this configuration, the exit pupil of this retinal scanning display device is larger than when such a pupil expanding element is not employed.

In addition, a light beam travels in this retinal scanning display device, such that the light beam is most converged to define a minimum diameter of beam, at the intermediate image plane occurring between the light source and the light exit, while the light beam is diverged from the most converged state to define a diameter of beam larger than the minimum diameter, at a position remote or deviated from the intermediate image plane.

This retinal scanning display device, therefore, would allow a light beam impinging on the pupil expanding element (i.e., an incident beam thereon) to become larger in diameter than when the pupil expanding element is disposed at the same position as that of the intermediate image plane.

This makes it easier to allow a light beam to be expanded by the pupil expanding element with enhanced efficiency (e.g., diffraction efficiency in the case of a diffraction grating used as the pupil expanding element), and to allow incident light, while being scanned onto the pupil expanding element, to be converted into expanded exit light (e.g., diffracted light in the case of a diffraction grating used as the pupil expanding element), with a pattern or shape and a brightness of the expanded exit light being stable in status.

This retinal scanning display device, therefore, would make it easier to expand its exit pupil while reducing or eliminating degradation in quality of a displayed image.

In a comparative example where the pupil expanding element is disposed at the same position as that of the intermediate position, enlargement in diameter of an incident beam on the pupil expanding element can be achieved by enlargement in diameter of a beam traveling through the intermediate image plane.

The enlargement in diameter of the traveling light beam through the intermediate image plane, however, unexpectedly invites a reduction in number of pixels present within a unit area in a displayed image (i.e., a pixel density), and is inductive to degradation in image resolution.

In contrast, the retinal scanning display device according to the present mode, because of its capability of enlarging the diameter of an incident beam on the pupil expanding element without enlarging the diameter of a beam traveling via the intermediate image plane, would generate an expanded exit pupil without degradation in image resolution.

It is added that the term "intermediate image plane" used herein has been selected, as a result of specially considering that the instant image plane is an image plane located between an ultimate image plane (i.e., an image plane on a viewer's retina) and the light source, and for the purpose of making a terminological distinction between the instant image plane and the ultimate image plane. The term "intermediate image plane," therefore, is used herein not to always mean an image plane which is just centrally disposed of the optical path between the light source and the light exit.

It is also added that the expression "exit pupil is expanded" is used herein not to limitedly mean that, provided that there is only one exit light beam from the retinal scanning display device, the exit light beam is enlarged in diameter, but also to mean that the number of exit light beams is increased as a result of the addition of the pupil expanding element, irrespective of whether or not each exit light beam is enlarged in diameter.

In other words, the term "exit pupil" is used herein to mean one original exit-light in some cases, and to mean a group of original exit-light beams which are superimposed into one observed exit-light in other cases.

The "pupil expanding element" set forth in the present mode may be formed so as to include, for example, a diffraction grating, an. optical scattering element (e.g., scattering plate), or a micro-lens array.

(2) The retinal scanning display device according to mode (1), wherein the position of the pupil expanding element is offset from the intermediate image plane along the optical path toward the light exit.

This retinal scanning display device would allow an area of the total optical-path (mode of light propagation expressed in optical ray diagram, for example) which is to be modified from the original due to the addition of the pupil expanding element, to be limited to a narrow local region disposed downstream from the pupil expanding element, which does not span the intermediate image plane.

On the other hand, the pupil expanding element, when disposed at an alternative position offset from the intermediate image plane toward the opposite side to that of the light exit, would require an area of the total optical-path to be modified from the original due to the addition of the pupil expanding element, within a broader local region disposed downstream from the pupil expanding element, which spans the intermediate image plane.

The retinal scanning display device according to the present mode, therefore, would make it easier to add the pupil expanding element with minimized modifications to the original optical path.

(3) The retinal scanning display device according to mode (1) or (2), wherein the pupil expanding element is operable to spread two-dimensionally an incident light beam thereon and outputs the spread light beam.

The retinal scanning display device according to the previous mode (1) or (2) may be practiced such that the pupil expanding element operates to spread only in one dimension an incident light beam thereon and then emit. This arrangement allows the design of the pupil expanding element to be simplified with greater ease, provided that the exit pupil is expanded only in one dimension.

In contrast, the retinal scanning display device according to the present mode (3) would allow an incident light beam on the pupil expanding element to be spread thereat two-dimensionally and then exit the pupil expanding element, enabling the exit pupil also to be expanded two-dimensionally.

As a result, this retinal scanning display device would reduce the possibility that a viewer's eye pupil, while viewing a displayed image, moves and loses alignment with the exit pupil completely, to be at a lower level than when the exit pupil is expanded only in one dimension.

(4) The retinal scanning display device according to mode (3), wherein the pupil expanding element is configured to include two one-dimensional diffraction gratings at each of which an incident light beam thereon is diffracted in one dimension and both of which are transversely oriented relative to each other so as to define different directions of orientation.

(5) The retinal scanning display device according to mode (3), wherein the pupil expanding element is configured to include one two-dimensional diffraction grating at which an incident light beam thereon is diffracted in two dimensions.

(6) The retinal scanning display device according to any one of modes (1)-(5), further comprising a relay optical system configured to have a pair of optical elements arrayed along the optical path, wherein the intermediate image plane occurs between the pair of optical elements, and the offset position of the pupil expanding element is located between the pair of optical elements, within the relay optical system.

(7) The retinal scanning display device according to any one of modes (1)-(6), wherein the intermediate image plane occurs between the scanner and the light exit, and the offset position of the pupil expanding element is located between the scanner and the light exit.

Typically, a scanner is configured to convert time-series imaging light (input imaging light) impinging on the scanner at a fixed point thereon, into spatially-varying imaging light (output imaging light). Due to this configuration, dust or dirt deposited on or defects introduced into optics disposed upstream of the scanner, if any, would completely block input imaging light from entering the scanner, resulting in failure of the scanner to correctly emit output imaging light.

In other words, adverse effects of dust or the like existing in optics disposed upstream of the scanner, upon magnification by the scanner, propagate to optics disposed downstream of the scanner.

In contrast, dust or dirt deposited on or defects introduced into optics disposed downstream of the scanner, if any, although could interfere with the scanner while outputting light, have adverse effects only locally on a displayed image, without globally affecting the displayed image.

The retinal scanning display device according to the present mode is configured such that the pupil expanding element is disposed downstream of the scanner. The thus-configured retinal scanning display device, even if there are dust or dirt deposited on or defects introduced into the pupil expanding element, does not have adverse effects on an entire displayed image, resulting in reduced or eliminated degradation in quality of the displayed image due to those dust and the like.

(8) The retinal scanning display device according to any one of modes (1)-(7), wherein the intermediate image plane includes a plurality of intermediate image planes occurring between the scanner and the light exit, and the pupil expanding element is disposed between the light exit and a proximal one of the plurality of intermediate image planes to the light exit.

This retinal scanning display device would allow a portion thereof which is required to be modified from the original due to the addition of the pupil expanding element, to become smaller than when the pupil expanding element is disposed at any other position.

(9) The retinal scanning display device according to any one of modes (1)-(8), wherein the scanner is configured to include a primary scanning subsystem scanning an incident light beam thereon in a primary scan direction, and a secondary scanning subsystem scanning a light beam incoming from the primary scanning subsystem in a secondary scan direction non-parallel to the primary scan direction, the intermediate image plane occurs between the primary and secondary scanning subsystems, and the offset position of the pupil expanding element is located between the primary and secondary scanning subsystems.

In this retinal scanning display device, the primary scanning subsystem converts time-series imaging light (input imaging light) impinging on the primary scanning subsystem at a fixed point thereon, into imaging light (output imaging light) spatially varying in a linear region.

Upon conversion of imaging light by the primary scanning subsystem, the secondary scanning subsystem converts imaging light input from the primary scanning subsystem, into output imaging light spatially varying in a planar region.

Scanned light by the primary scanning subsystem is present in the linear region, while scanned light by the secondary scanning subsystem is present in the planar region.

As a result, the pupil expanding element, when disposed between the primary and secondary scanning subsystems, can be designed to receive imaging light in a narrower area than when the pupil expanding element is disposed downstream of the secondary scanning subsystem.

In other words, an area of the pupil expanding element on which a light beam is incident and which allows the incident light beam to undergo a light-beam spreading operation (e.g., diffraction) with greater efficiency can become narrower in the former case than in the latter case. As a result, to reduce in size and weight the pupil expanding element is easier in the former case than in the latter case.

In view of the above findings, in the retinal scanning display device according to the present mode, the pupil expanding element is disposed at a position offset from the intermediate image plane along the optical path, which-is located between the primary and secondary scanning subsystems.

(10) The retinal scanning display device according to any one of modes (1)-(8), wherein the scanner is configured to include a primary scanning subsystem scanning an incident light beam thereon in a primary scan direction, and a secondary scanning subsystem scanning a light beam incoming from the primary scanning subsystem in a secondary scan direction non-parallel to the primary scan direction, the intermediate image plane occurs between the secondary scanning subsystem and the light exit, and the offset position of the pupil expanding element is located between the secondary scanning subsystem and the light exit.

Similarly with the retinal scanning display device according to the previous mode (9), in this retinal scanning display device according to the present mode, the primary scanning subsystem converts time-series imaging light (input imaging light) impinging on the primary scanning subsystem at a fixed point thereon, into imaging light (output imaging light) spatially varying in a linear scan-region.

Upon conversion of imaging light by the primary scanning subsystem, the secondary scanning subsystem converts imaging light input from the primary scanning subsystem, into output imaging light spatially varying in a planar scan-region.

In the situation where the pupil expanding element is disposed between the primary and secondary scanning subsystems, dust or dirt deposited on or defects introduced into the pupil expanding element, if any, would make point-shaped image noises in a local area of the linear scan-region for the primary scanning subsystem.

Upon reception of that noise-added scanned light as input imaging light, the secondary scanning subsystem, if, nevertheless scans the input imaging light, magnifies the point-shaped image noises embedded in the input imaging light, into line-shaped image noises embedded in output imaging light.

In contrast, in the situation where the pupil expanding element is disposed downstream of the secondary scanning subsystem, dust or dirt deposited on or defects introduced into the pupil expanding element, if any, would make only point-shaped image noises in a local area of the linear scan-region for the primary scanning subsystem, without magnifying and introducing those image noises into an ultimate displayed image.

In view of the above findings, in the retinal scanning display device according to the present mode, the pupil expanding element is disposed at a position offset from the intermediate image plane along the optical path, which is located between the secondary scanning subsystem and the light exit.

(11) The retinal scanning display device according to any one of modes (1)-(10), further comprising:

a wavefront-curvature modulator modulating a wavefront curvature of the light beam emitted from the light source; and a position adjuster adjusting a position of the pupil expanding element along the optical path, wherein the scanner scans onto the retina the light beam emitted from the wavefront-curvature modulator, and the light exit is in the form of a portion of the retinal scanning display device at which the light beam scanned by the scanner exits the retinal scanning display device.

This retinal scanning display device, as will be described later on in more detail at the description of mode (13), would provide, for example, the capability of adjusting the position of the pupil expanding element as a function of the position of the intermediate image plane movably located between the light source and the light exit.

This retinal scanning display device, therefore, would, for example, reduce or eliminate multiple images unexpectedly displayed due to changes in position of the intermediate image plane responsive to modulation of a wavefront curvature of light traveling in this display device.

(12) The retinal scanning display device according to any one of modes (1)-(11), wherein the light source emits a composite light beam having a plurality of different wavelengths, the scanner scans onto the retina the composite light beam emitted from the light source, the light exit is in the form of a portion of the retinal scanning display device at which the composite light beam scanned by the scanner exits the retinal scanning display device, the pupil expanding element is structured to divide the composite light beam incident thereon into a plurality of wavelength components, and to separate each of the wavelength components into a plurality of diffracted beams in different diffraction orders and in different propagation directions, the diffracted beams include a zeroth-order diffracted beam and at least one higher-order diffracted beam, on a per-wavelength-component basis, the wavelength components are each separated, at the pupil expanding element, into the zeroth-order diffracted beam and the at least one higher-order diffracted beam, in respective separation ratios, and the pupil expanding element is configured to include an equalizer structured to equalize the separation ratios for the plurality of wavelength components, to each other or one another.

This retinal scanning display device, as will be described later on in more detail at the description of mode (25), would allow the separation ratios in which the different wavelength components are separated, at the pupil expanding element, into zeroth-order diffracted beams and at least one higher-order diffracted beams, to become closer to each other or one another between the different wavelength components, than when an element not having such an equalizer as set forth in the present mode is employed for expanding the exit pupil defined by this retinal scanning display device.

This retinal scanning display device, therefore, would make it easier to reduce or eliminate unexpected changes in colors of a displayed image due to changes in position of a viewer's eye pupil.

(13) A retinal scanning display device for projecting a light beam directly onto a retina of a viewer, and scanning the projected light beam on the retina, to thereby display an image onto the retina, the retinal scanning display device comprising:

a light source emitting the light beam;

a wavefront-curvature modulator modulating a wavefront curvature of the light beam emitted from the light source;

a scanner scanning onto the retina the light beam emitted from the wavefront-curvature modulator;

a light exit at which the light beam scanned by the scanner exits the retinal scanning display device;

a pupil expanding element operable to expand an exit pupil of the retinal scanning display device, the pupil expanding element being disposed in an optical path defined between the light source and the light exit; and a position adjuster adjusting a position of the pupil expanding element along the optical path.

In general, there exist various types of retinal scanning display devices, one of which provides a function of allowing a user to adjust a focus position of a display image.

This type of retinal scanning display device is typically configured to include, in addition to the aforementioned light source, scanner and light exit, a wavefront-curvature modulator modulating a wavefront curvature of the light beam emitted from the light source. This type of retinal scanning display device is also configured to allow the scanner to scan onto a viewer's retina the light beam emitted from the wavefront curvature modulator.

The thus-configured retinal scanning display device would allow a user to conduct the above-described focus adjustment, for depth adjustment to change the position of a display image, that is to say, a depth position at which a user-viewer perceives a display image (i.e., a virtual image), to a near position or a far position, and would also allow the user to conduct the focus adjustment, for diopter adjustment to apply a correction to an optical system in this retinal scanning display device, so as to match with a viewer's vision.

A diffraction grating, when used in a need for expanding the exit pupil of this type of retinal scanning display device, may be disposed in an optical path defined between the light source and the light exit.

More specifically, the diffraction grating may be disposed at the same position as that of an intermediate image plane occurring between the light source and the light exit, or alternatively, at a position offset from the intermediate image plane along the optical path by such a distance that achieves a predetermined relative geometry with respect to the intermediate image plane.

However, in this type of retinal scanning display device, once a light beam is wavefront-curvature-modulated and emitted by the aforementioned wavefront curvature modulator, the position of the intermediate image plane varies accordingly.

For this reason, when the pupil expanding element is nevertheless fixedly disposed, wavefront curvature modulation causes the pupil expanding element to undesirably deviate relative to the desired position, that is to say, the same position as the intermediate image plane, or alternatively the position offset from the intermediate image plane to maintain the predetermined relative geometry with the intermediate image plane.

When the pupil expanding element is coincident in position with the intermediate image plane, a light beam incident on the pupil expanding element is conceptually equivalent to one incident ray of light. For this reason, in this instance, all that exits the pupil expanding element is only a family of diffracted beams into which the one incident ray of light has been separated by the pupil expanding element.

In contrast, when the pupil expanding element is remote from the intermediate image plane, a light beam incident on the pupil expanding element is conceptually equivalent to multiple incident rays of light. These multiple incident rays of light impinge on the pupil expanding element at different positions spaced apart from each other in a grating direction of the pupil expanding element (i.e., a direction of orientation of a diffraction grating).

For this reason, in this instance, all that exits the pupil expanding element is multiple families of diffracted beams. Each of the multiple families consists of diffracted beams into which each of generally-laterally-offset multiple incident rays of light has been separated by the pupil expanding element.

Thus, the pupil expanding element, when is remote from the intermediate image plane, emits multiple families of diffracted beams, resulting in the possibility that multiple display-images occur with increasing ease with an increase in the deviation of the pupil expanding element from the intermediate image plane.

It is added that there is a tendency that multiple display-images occur with greater ease, irrespective of whether or not the pupil expanding element is positioned at its regular position, when the pupil expanding element is configured to have its regular position offset from the intermediate image plane, than when the pupil expanding element is configured to have its regular position coincident with the intermediate image plane.

However, when the pupil expanding element is configured to have its regular position offset from that of the intermediate image plane by a distance approximate to zero, a tendency of multiple display-images occurring is so small as not to cause any practical problems.

Therefore, multiple display-images can be practically suppressed even if the pupil expanding element is configured to have its regular position not coincident with the intermediate image plane.

Although a risk that multiple display-images occur due to wavefront curvature modulation has been described above by way of an example in which the pupil expanding element is in the form of a diffraction grating, a similar problem is caused also when the pupil expanding element is in the form of an optical element other than a diffraction grating.

In view of the above-described circumstances, the retinal scanning display device according to the present mode has been developed for the purpose of expanding the exit pupil of this display device while suppressing multiple display-images resulting from wavefront curvature modulation.

In this retinal scanning display device, a light beam emitted from a light source is capable of being wavefront-curvature-modulated, and a pupil expanding element which is operable to expand an exit pupil of this display device is disposed in an optical path defined between the light source and a light exit at which the light beam exits this display device. A position of the pupil expanding element movable in the optical path is adjustable by a position adjuster.

This retinal scanning display device, therefore, would become capable of, for example, adjusting the position of the pupil expanding element as a function of the position of the intermediate image plane, provided that the pupil expanding element is disposed in geometrical association with the intermediate image plane occurring between the light source and the light exit.

As a result, this retinal scanning display device would allow, for example, suppression of multiple display-images occurring due to changes in position of the intermediate image plane during wavefront curvature modulation.

The "position adjuster" set forth in the present mode may be configured so as to, for example, allow the pupil expanding element to be adjusted in position manually or automatically, and/or mechanically or electrically.

Further, the "position adjuster" may be implemented in a fashion that allows the position of the pupil expanding element to be adjusted so as to become coincident with that of an intermediate image plane occurring at a variable position between the light source and the light exit, or so as to become coincident with a position which is offset from the intermediate image plane by a distance achieving a predetermined relative geometry with the intermediate image plane.

The "pupil expanding element" set forth in the present mode may be formed so as to include, for example, a diffraction grating, an optical scattering element (e.g., scattering plate), or a micro-lens array.

(14) The retinal scanning display device according to mode (13), wherein the position adjuster is configured to include a mechanical displacement mechanism which is mechanically operable in response to a user manipulation, to displace the pupil expanding element along the optical path.

This retinal scanning display device would allow the pupil expanding element to be displaced manually and mechanically.

(15) The retinal scanning display device according to mode (13) or (14), wherein the position adjuster is configured to include an actuator which is operable in response to a drive signal, to displace the pupil expanding element along the optical path.

This retinal scanning display device would allow the pupil expanding element to be displaced manually or automatically and electrically.

(16) The retinal scanning display device according to mode (15), wherein the drive signal is indicative of a user-issued command.

This retinal scanning display device would allow the pupil expanding element to be displaced manually and electrically.

(17) The retinal scanning display device according to mode (15), wherein the drive signal is indicative of a position of the intermediate image plane in the optical path between the light source and the light exit.

This retinal scanning display device would allow the pupil expanding element to be displaced automatically and electrically.

(18) The retinal scanning display device according to mode (15) or (17), wherein the wavefront-curvature modulator modulates the wavefront curvature in response to a depth signal indicative of depth information of the image, and the drive signal is responsive to the depth signal.

This retinal scanning display device would allow the pupil expanding element to be displaced automatically and electrically, in response to a drive signal produced so as to reflect a depth signal which is to enter the aforementioned wavefront curvature modulator for modulating the wavefront curvature thereby adjusting the depth of a display image.

(19) The retinal scanning display device according to mode (13) or (14), wherein the image is defined to include a plurality of depth-controllable minimum sub-images having individual depths and individual wavefront curvatures, respectively, the wavefront-curvature modulator modulates the individual wavefront curvatures in response to a depth signal indicative of the individual depths, on a per-depth-controllable-minimum-sub-image basis, the position adjuster is configured to include an actuator operable in response to a drive signal, to displace the pupil expanding element along the optical path, the image is defined to include a plurality of actuator-controllable minimum sub-areas of the image each of which has a size larger than that of each of the depth-controllable minimum sub-images of the image, the position adjuster is configured to further include a controller controlling the actuator depending on the depth signal, on a per-actuator-controllable-minimum-sub-area basis, the controller is configured to generate the drive signal based on the depth signal, the drive signal allowing the actuator to be unchanged in status over a same one of the actuator-controllable minimum sub-areas of the image, the controller being further configured to supply the generated drive signal to the actuator.

In this retinal scanning display device, the wavefront curvature of a traveling light beam is modulated, in response to a depth signal indicative of individual depth values of depth-controllable minimum sub-images of a display image, on a per-depth-controllable-minimum-sub-image basis.

Further, in this retinal scanning display device, a plurality of actuator-controllable minimum sub-areas of a display image are defined, each of which has a size larger than that of each of the depth-controllable minimum sub-images of the same display image.

Still further, an actuator operable to displace or move the pupil expanding element is controlled depending on the depth signal on a per-actuator-controllable-minimum-sub-area basis. The actuator is controlled so as to be unchanged in status over the same one of the actuator-controllable minimum sub-areas.

In an example, each depth-controllable minimum sub-image is defined as one pixel, and each actuator-controllable minimum sub-area is defined as one of successive frames of a display image. In this example, the wavefront curvature of a traveling light beam is modulated pixel by pixel, while the actuator is controlled frame by frame.

This retinal scanning display device, therefore, would allow the required response speed of the actuator to be reduced to a lower level, and allow the position adjuster including the actuator to be designed with greater ease, than when the actuator is required to be controlled on a per-actuator-controllable minimum sub-area, provided that each actuator-controllable minimum sub-area is defined as an image display area having a size equal to or smaller than that of each depth-controllable minimum sub-image.

The "depth-controllable minimum sub-image" set forth in the present mode may be defined as, for example, one of a plurality of pixels making up an image, adjacent ones of the plurality of pixels, one of a plurality of successive frames making up an image, or a sub-plurality of successive ones of the plurality of successive frames.

(20) The retinal scanning display device according to mode (19), wherein the depth signal is made up of a plurality of portions which correspond to the plurality of actuator-controllable minimum sub-areas of the image,-respectively, each of the plurality of portions represents a plurality of individual depth values, on a per-depth-controllable-minimum-sub-image basis, the controller is configured to include:

an obtainer obtaining a representative depth value in common to the plurality of individual depth values, on a per-actuator-controllable-minimum-sub-area basis; and a generator generating the drive signal based on the obtained representative depth value.

In this retinal scanning display device, a depth signal is made up of a plurality of portions which correspond to a plurality of actuator-controllable minimum sub-areas of an image, respectively. Each of the plurality of portions represents a plurality of individual depth values, on a per-depth-controllable-minimum-sub-image basis.

Further, a representative depth value in common to the plurality of individual depth values is obtained, on a per-actuator-controllable-minimum-sub-area basis.

In an example where each depth-controllable minimum sub-image is defined as one of a plurality of pixels of a display image, and where each actuator-controllable minimum sub-area is defined as one of a plurality of successive frames of the display image, a representative value of a plurality of individual depth values which have been assigned to a plurality of pixels making up one frame, is obtained in association with the one frame. The actuator is controlled based on the obtained representative value, in association with the one frame.

This retinal scanning display device, therefore, would allow, for example, discrete control of the actuator per each area larger than one depth-controllable minimum sub-image, while allowing for a plurality of individual depth values to be achieved for the respective depth-controllable minimum sub-images all of which belong to a corresponding one of the plurality of actuator-controllable minimum sub-areas.

(21) The retinal scanning display device according to mode (20), wherein each of the plurality of actuator-controllable-minimum--sub-areas is selected from the group including:

a group of adjacent ones of a plurality of pixels collectively making up the image;

one of a plurality of successive scan-lines for the image;

a selected local portion of a frame of the image;

an entire frame of the image; and a group of a successive frames of the image.

The "selected local portion of a frame" set forth in the present mode may be defined as, for example, a spatially-fixed center portion of a frame of an image. The center portion is an empirical portion to which a user typically pays special attention, that is to say, a portion which is easily observed by the user as to whether its image quality is good or bad.

Alternatively, the "selected local portion of a frame" may be defined as a spatially-variable portion to which the user has actually paid special attention.

(22) The retinal scanning display device according to mode (20) or (21), wherein the obtainer obtains the representative depth value by averaging a total or fraction of the plurality of individual depth values, or by selecting one of the plurality of individual depth values.

This retinal scanning display device, when implemented to average a fraction of the plurality of individual depth values, and also, not to mention, when implemented to select one of the plurality of individual depth values for obtaining the representative depth value, requires selection of at least one of the plurality of individual depth values.

The required selection may be made by specifying a position-on-image of a target one of the depth-controllable minimum sub-images which corresponds to the ultimately-selected at least one individual depth value.

More specifically, the target sub-image may be selected as, for example, a spatially-fixed center sub-image of a frame of an image. The center sub-image is an empirical sub-image to which a user typically pays special attention, that is to say, a sub-image which is easily observed by the user as to whether its image quality is good or bad.

Alternatively, the target sub-image may be selected as a spatially-variable sub-image to which the user has actually paid special attention.

(23) The retinal scanning display device according to any one of modes (13)-(22), wherein the position adjuster is configured to have a function of adjusting the position of the pupil expanding element in the optical path, in response to a user-issued command, the retinal scanning display device further comprising a support-picture displaying section displaying onto the retina a support picture which is configured to visually support a user during a position adjustment work for the user to adjust the position of the pupil expanding element in the optical path, using the position adjuster.

This retinal scanning display device would visually support a user, via a support picture displayed onto a user's retina, in conducting a position adjustment work for adjusting the position of the pupil expanding element using the position adjuster. This enables the user to efficiently conduct the position adjustment work.

The "support picture" set forth in the present mode may be defined as, for example, a picture which is spatially multiplexed to a varying extent as a function of a degree to which a display image is spatially multiplexed due to the modulation of curvature of wavefront of an associated light beam.

In this instance, the "support picture" may be in the format of, for example, graphics (e.g., lines) or text, so that the user can easily visually perceive a degree to which a display image is spatially multiplexed.

The exemplified configurations of the "support picture" allow an easier and more correct determination as to, for example, whether or not a display image has been multiplexed, whether or not there is a need of adjusting the position of the pupil expanding element, or a degree to which a display image is undesirably multiplexed, that is to say, an amount by which the position of the pupil expanding element is required to be adjusted.

(24) The retinal scanning display device according to mode (23), further comprising a focus adjuster adjusting a focus position of the image displayed on the retina, in response to a user-issued command, wherein the support picture is configured to visually support the user not only during the position adjustment work but also during a focus adjustment work for the user to adjust the focus position of the image using the focus adjuster.

This retinal scanning display device allows the same support picture to be used for supporting both a user work to adjust, the position of the pupil expanding element for eliminating spatial multiplex of a display image, and a user work to adjust the focus position of the display image.

This retinal scanning display device, therefore, requires only one support-picture for supporting both a user work for eliminating spatial multiplex of a display image, and a user work to adjust the focus position of the display image.

Additionally, this retinal scanning display device, because of only one support-picture being used as a whole, allows the user to conduct those two different user works without interruption while the same support-picture is being displayed, without requiring the user to conduct those two different user works separately with time.

This retinal scanning display device, therefore, would allow individual efficiency of each of a user work for eliminating spatial multiplex of a display image and a user work for adjusting the focus position of the display image, to be enhanced relative to the individual efficiency when there is no support image used. This retinal scanning display device would further allows global efficiency of two user works to be enhanced relative to the global efficiency when there are unique support-images used for those two user works, respectively.

(25) A retinal scanning display device for projecting a light beam directly onto a retina of a viewer, and scanning the projected light beam on the retina, to thereby display an image onto the retina, the retinal scanning display device comprising:

a light source emitting a composite light beam having a plurality of wavelength components;

a scanner scanning onto the retina the composite light beam emitted from the light source;

a light exit at which the composite light beam scanned by the scanner exits the retinal scanning display device; and a pupil expanding element operable to expand an exit pupil of the retinal scanning display device, the pupil expanding element being disposed at one of a first position which is coincident with an intermediate image plane occurring between the light source and the light exit, in an optical path defined between the light source and the light exit, and a second position which is offset from the intermediate image plane along and within the optical path, wherein the pupil expanding element is structured to divide the composite light beam incident thereon into a plurality of wavelength components, and to separate each of the wavelength components into a plurality of diffracted beams in different diffraction orders and in different propagation directions, the diffracted beams include a zeroth-order diffracted beam and at least one higher-order diffracted beam, on a per-wavelength-component basis, the wavelength components are each separated, at the pupil expanding element, into the zeroth-order diffracted beam and the at least one higher-order diffracted beam, in respective separation ratios, and the pupil expanding element is configured to include an equalizer structured to equalize the separation ratios for the plurality of wavelength components, to each other or one another.

In general, a diffraction grating causes a composite light beam incident on the diffraction grating to be divided into different wavelength components. Concurrently, the diffraction grating also causes optical power (expressed in. Watt [W]) or energy of each wavelength component to be separated into a worth of a zeroth-order of diffracted beam and a worth of a higher-order of diffracted beam.

Thus, one composite light beam results in angularly-dispersed diffracted beams, and these diffracted beams define respective exit pupils. Therefore, a diffraction grating would expand the entire of exit pupils.

However, in the absence of any special feature applied to a conventional diffraction grating, there is inadequate coincidence between the wavelength components with respect to a separation ratio in which each wavelength component is separated into a zeroth-order of diffracted beam and a higher-order of diffracted beam. That is to say, each separation ratio is wavelength-dependent.

The existence of inadequate coincidence between the wavelength components with respect to the separation ratio means the existence of inadequate coincidence between the plurality of exit pupils with respect to a ratio or intensity balance (will be described below in more detail) between diffracted beams collectively making up each pupil. Each diffracted beam results from a corresponding one of the wavelength components.

In this regard, each exit pupil is defined by a group of diffracted beams having the same diffraction orders. However, diffracted beams belonging to the same group originate from different wavelength-components having different wavelengths and colors, respectively. In addition, the above-mentioned ratio or intensity balance is defined for indicating the relationship between diffracted beams (i.e., fractions of the wavelength components) belonging to the same group with respect to the luminance or intensity of each diffracted beam (i.e., a fraction of each wavelength component).

As a result, the existence of inadequate coincidence between the plurality of exit pupils with respect to the intensity balance means the existence of inadequate coincidence between the plurality of exit pupils with respect to the observed color (mixed color).

In addition, a viewer may possibly move the eye pupil while viewing a display image, and if the eye pupil moves, then there occurs movement of one of the plurality of exit pupils which the user is viewing for perceiving the display image.

For these reasons, a retinal scanning display device, when configured to include a diffraction grating having the characteristic mentioned above and dispose the diffraction grating at a position coincident with or offset from the aforementioned intermediate image plane, causes the user to suffer from undesirable perception of a display image with a color (should not be time-varying, inherently) varying with changes in position of the spontaneously-observed exit-pupil due to movement of the eye pupil.

In view of the circumstances described above, the retinal scanning display device according to the present mode has been developed for expanding the observed exit pupil, while suppressing unexpected changes in color of a display image due to movement of a viewer's eye pupil.

In the retinal scanning display device according to the present mode, a pupil expanding element is disposed at a position coincident with or offset from an intermediate image plane occurring between a light source and a light exit, in an optical path defined between the light source and the light exit.

The pupil expanding element is configured to include an equalizer structured to equalize separation ratios in which the plurality of wavelength components are separated into zeroth-order diffracted beams and higher-order diffracted beams, between the plurality of wavelength components.

This retinal scanning display device, therefore, would allow the separation ratios in which the wavelength components are separated into zeroth-order diffracted beams and higher-order diffracted beams, to be equalized between the plurality of wavelength components, to a higher extent, than when a pupil expanding element not having such an equalizer is used for expanding the observed exit pupil.

Thus, this retinal scanning display device would make it easier to suppress unexpected-changes in color of a display image with movement of a viewer's eye pupil.

(26) The retinal scanning display device according to mode (25), wherein the plurality of wavelength components include a pre-selected reference wavelength-component, and at least one pre-selected target wavelength-component to be compared with the reference wavelength-component, the separation ratios include a reference-wavelength-component separation ratio in which the pre-selected reference wavelength-component is separated, at the pupil expanding element, into the zeroth-order diffracted beam and the at least one higher-order diffracted beam, and a target-wavelength-component separation ratio in which the pre-selected at least one target wavelength-component is separated, at the pupil expanding element, into the zeroth-order diffracted beam and the at least one higher-order diffracted beam, and the equalizer is configured to have a structure allowing a deviation between the target-wavelength-component separation ratio and the reference-wavelength-component separation ratio, to become less than a first set-value.

This retinal scanning display device provides an embodied example of the equalizer, which is configured to include a structure allowing a deviation between a target-wavelength-component separation ratio and a reference-wavelength-component separation ratio, to become less than a first set-value.

In this regard, the plurality of wavelength components consist of a reference wavelength-component and one or more target wavelength-components.

The reference wavelength-component is separated into a zeroth-order diffracted beam and a higher-order diffracted beam at the pupil expanding element, in the aforementioned reference-wavelength-component separation ratio. On the other hand, each target wavelength-component, which is other than the reference wavelength component, is separated into a zeroth-order diffracted beam and a higher-order diffracted beam at the pupil expanding element, in the aforementioned target-wavelength-component separation ratio.

(27) The retinal scanning display device according to mode (26), wherein the reference-wavelength-component separation ratio is defined as a ratio A/B of an input-output ratio A to an input-output ratio B, for the reference wavelength-component, provided that the input-output ratio A denotes a ratio of output optical power of the at least one higher-order diffracted beam, to optical power of incident light on the pupil expanding element, and that the input-output ratio B denotes a ratio of output optical power of the zeroth-order diffracted beam, to optical power of incident light on the pupil expanding element, and the target-wavelength-component separation ratio is defined as a ratio C/D of an input-output ratio C to an input-output ratio D, for each of the at least one target wavelength-component, provided that the input-output ratio C denotes a ratio of output optical power of the at least one higher-order diffracted beam, to optical power of incident light on the pupil expanding element, and that the input-output ratio D denotes a ratio of output optical power of the zeroth-order diffracted beam, to optical power of incident light on the pupil expanding element.

(28) The retinal scanning display device according to mode (27), wherein the deviation for each of the at least one target wavelength-component is defined as a value obtained by dividing a difference between the target-wavelength-component separation ratio C/D and the reference-wavelength-component separation ratio A/B, by the reference-wavelength-component separation ratio A/B.

(29) The retinal scanning display device according to mode (28), wherein the first set-value is equal to or greater than about 0.2.

This retinal scanning display device allows the "first set-value" set forth in the previous mode (26) to be optimized under the definitions set forth in the previous modes (27) and (28), thereby better suppressing unexpected changes in color of a display image due to movement of a viewer's eye pupil.

(30) The retinal scanning display device according to any one of modes (27)-(29), wherein the input-output ratios A, B, C and D are all greater than a second set-value.

A retinal scanning display device constructed according to one of the previous modes (27)-(29), when implemented with at least one of the input-output ratios A, B, C and D being lower than a allowable limit, possibly causes shortage of light amount of a diffracted beam (identified by the kind of the associated wavelength component and the diffraction order of the instant diffracted beam) having its input-output ratio lower than the allowable limit.

The occurrence of such shortage of light amount incurs a risk of non-uniformity between light amounts of a plurality of diffracted beams or exit pupils.

In contrast, the retinal scanning display device according to the present mode, because of every one of the input-output ratios A, B, C and D being set to a level higher than a second set-value, reduces a tendency that at least one of those input-output ratios A, B, C and D fails to reach the allowable limit.

This retinal scanning display device, therefore, makes it easier to expand the observed exit pupil, while suppressing both unexpected changes in color and changes in light-amount of a display image due to changes in position of a viewer-observed area of an exit pupil or a viewer-observed one of exit pupils, wherein the changes result from movement of the viewer's eye pupil.

It is added that the technique of configuring the pupil expanding element (which is disposed coincident with or remote from the intermediate image plane within a retinal scanning display device), so as to include the structure for equalizing the input-output ratios A, B, C and D, that is to say, the structure allowing input-output ratios of the optical power of diffracted beams to the optical power of an incident light beam on the pupil expanding element, to be equalized between the diffracted beams or exit pupils, may be practiced independently, that is to say, separately from the technical features set forth in the previous modes (25)-(30).

(31) The retinal scanning display device according to mode (30), wherein the second set-value is equal to or greater than about 0.1.

This retinal scanning display device allows the "second set-value" set forth in the previous mode (30) to be optimized, thereby better suppressing unexpected changes in amount of light of a display image due to changes in position of the observed exit pupil, wherein the changes result from movement of a viewer's eye pupil.

(32) The retinal scanning display device according to any one of modes (26)-(31), wherein the plurality of wavelength components include red-, green- and blue-colored monochromatic light beams, the reference wavelength-component is selected as the green-colored monochromatic light beam, and the at least one target wavelength-component is selected as at least one of the red- and blue-colored monochromatic light beams.

(33) The retinal scanning display device according to any one of modes (25)-(32), wherein the pupil expanding element is configured to include a diffraction grating of a periodic structure having alternating raised portions and recessed portions arrayed in a predetermined direction non-parallel to a direction in which the composite light beam is incident on the pupil expanding element, and each recessed portion is structured to have a depth dimension allowing a phase difference between a portion of the composite light beam propagating in each recessed portion and a portion of the composite light beam propagating in each raised portion, to be substantially coincident with one-half a representative wavelength of the plurality of wavelength components.

In this retinal scanning display device, the pupil expanding element is structured to have a plurality of raised portions and a plurality of recessed portions, with each recessed portion being optimally defined in terms of its depth dimension, thereby allowing the phase difference between a portion of the composite light beam propagating in each recessed portion and a portion of the composite light beam propagating in each raised portion, to be substantially coincident with one-half a representative wavelength of the plurality of wavelength components.

As will be described later on in more detail, the above-described structure, as a result of causing a plurality of zeroth-order diffracted beams to be mutually cancelled within the pupil expanding element, allows the energy of incident light on the pupil expanding element to be distributed to a plurality of diffracted beams, in a manner that the output energy is distributed more intensively at higher-order diffracted light than at zeroth-order diffracted light.

This enables the energy distribution of the higher-order diffracted beams to show an extreme value (generally flat gradient range) with respect to wavelength, resulting in relaxed wavelength-dependent characteristic of the energy of the higher-order diffracted beams.

The "representative wavelength" set forth in the present mode may be determined as, for example, a wavelength having a generally meddle value between a lowest one and a highest one of a plurality of frequencies of the plurality of wavelength components, or a wavelength of one of the plurality of frequencies which is located centrally when those frequencies are sequenced in an ascending or descending order of magnitude of frequency.

(34) The retinal scanning display device according to mode (33), wherein each raised portion is structured to have a width dimension substantially coincident with twice or one-half a width dimension of each recessed portion.

In this retinal scanning display device, the pupil expanding element is configured, such that each raised portion is structured to have a width dimension substantially coincident with twice or one-half a width dimension of each recessed portion.

As will be described later on in more detail, the above-described structure equalizes the width dimension of a portion of the pupil expanding element which a zeroth-order diffracted beam exits, and the width dimension-of a portion of the pupil expanding element which a higher-order diffracted beam exits.

This retinal scanning display device, as a result, relaxes the wavelength-dependency of higher-order diffracted beams, thereby equalizing the aforementioned separation ratios between the plurality of wavelength components, resulting in equalized amounts of light of a display image between a plurality of diffracted beams, that is to say, a plurality of exit pupils.

Several presently preferred embodiments of the invention will be described in more detail by reference to the drawings in which like numerals are used to indicate like elements throughout.

FIRST EMBODIMENT

Referring now to FIG. 1, there is schematically illustrated a retinal scanning display device (hereinafter, abbreviated to "RSD") constructed according to a first illustrative embodiment of the present invention. This RSD is designed to project a laser beam as a light beam directly onto a retina 14 through an eye pupil 12 of a viewer's eye 10 and scan the projected light beam on the retina 14, to thereby display an image.

Throughout the description, the expression "project a laser beam directly onto the retina 14" means not only an arrangement in which light exiting the RSD enters the eye pupil 12 without passing through any separate optics, but also an arrangement in which light exiting the RSD enters the eye pupil 12 through separate optics (e.g., a mirror, a lens, etc.) for causing an optical action (e.g., reflection, refraction, etc.) without visualization by physical display screen.

As illustrated in FIG. 1, the RSD includes a light source unit 20. The light source unit 20 includes three lasers 30, 32, and 34, three collimator lenses 40, 42, and 44, three dichroic mirrors 50, 52, and 54, and a combining optical system 56.

The three lasers 30, 32, and 34 consist of the R laser 30 emitting a red-colored laser beam, the G laser 32 emitting a green-colored laser beam, and the B laser 34 emitting a blue-colored laser beam. Any of these lasers 30, 32, and 34 may be constructed as a semiconductor laser, for example.

The three collimator lenses 40, 42, and 44 are lenses which collimate the three colored laser beams emitted from the three lasers 30, 32, and 34, respectively. For the three colored laser beams emitted from the respective three collimator lenses 40, 42, and 44 to be combined, the three dichroic mirrors 50, 52, and 54 perform transmission and reflection of the three colored laser beams in a wavelength-selective manner.

The three colored laser beams are combined at a representative one of the three dichroic mirrors 50, 52, and 54. In the present embodiment, the dichroic mirror 50 is selected as the representative dichroic mirror. Upon combined at the dichroic mirror 50, the laser beams in the form of a composite laser beam enter the combining optical system 56 to be combined thereat.

As illustrated in FIG. 1, the light source unit 20 further includes a signal processing circuit 60. To the signal processing circuit 60, an external video signal is supplied. The video signal includes: luminance signals corresponding to the respective R, G, and B lasers 30, 32, and 34 (i.e., an R luminance signal, a G luminance signal, and a B luminance signal); sync signals used as reference signals for a horizontal scan and a vertical scan, both of which will be described later on; and a depth signal indicative of depth of an image. The video signal includes the depth signal in association with the luminance signals.

The signal processing circuit 60 is electrically coupled to the three lasers 30, 32, and 34 through three laser drivers 70, 72, and 74, respectively. In response to the aforementioned luminance signals (i.e., the R, G, and B luminance signals), the signal processing circuit 60 modulates the intensity of the laser beams emitted from the respective lasers 30, 32, and 34 through the corresponding respective laser drivers 70, 72, and 74.

As illustrated in FIG. 1, a laser beam emerging from the combining optical system 56 is transmitted to a collimator lens 84 through an optical fiber 82 functioning as a light transmitting medium. Upon collimated at the collimator lens 84, the laser beam leaves the collimator lens 84 to enter a wavefront-curvature modulating optical system 88.

For modulating the curvature of wavefront of a laser beam coming from the light source unit 20, the wavefront-curvature modulating optical system 88 includes a beam splitter 92, a converging lens 94, and a reflecting mirror 96 in a linear array along the common optical path.

The beam splitter 92 reflects a laser beam which comes from the collimator lens 84 in a direction perpendicular to the aforementioned optical axis, at a right angle into the converging lens 94. The converging lens 94 causes an incident laser beam thereon to be converged and enter the reflecting mirror 96.

The wavefront-curvature modulating optical system 88 further includes an actuator 98 for moving the reflecting mirror 96 along the aforementioned optical axis. The actuator 98 may be formed principally with, for example, a piezoelectric element. The actuator 98 is driven in response to a wavefront-curvature modulation signal which is supplied from the signal processing circuit 60 and which is indicative of the aforementioned depth signal.

The reflecting mirror 96 which has been located by the actuator 98, upon reception of converging incoming-light from the converging lens 94, reflects the incoming light back into the converging lens 94. Then, the converging lens 94 causes the laser beam re-entered in that manner, to be converged and enter the beam splitter 92.

When a lens-mirror distance, which is a distance between the reflecting mirror 96 and the converging lens 94, is equal to a focal length of the converging lens 94, a laser beam entering the beam splitter 92 from the converging lens 94 is transformed into parallel light again. On the other hand, when the lens-mirror distance is not equal to the focal length, the laser beam entering the beam splitter 92 from the converging lens 94 is transformed into diverging light.

The curvature of wavefront of the diverging light depends on the lens-mirror distance, while the lens-mirror distance indicates the aforementioned wavefront-curvature modulation signal. It follows that the curvature of wavefront of the laser beam leaving the beam splitter 92 and traveling toward an optical downstream side thereof indicates the wavefront-curvature modulation signal.

The thus-wavefront-curvature-modulated laser beam enters a horizontal scanning system 100. The horizontal scanning system 100 horizontally scans a laser beam incident thereon in response to a horizontal sync signal supplied from the signal processing circuit 60. The horizontal scanning system 100, although formed principally with a polygon mirror in the present embodiment, may be formed in an alternative type (e.g., a galvanometer mirror).

As illustrated in FIG. 1, for detection of the angle of a polygon mirror 104, the RSD includes a beam detector 108 which detects light reflected from the polygon mirror 104 or scanning light at a stationary position. The beam detector 108 delivers as a BD signal a signal indicative of whether or not light has been received, to the signal processing circuit 60. The signal processing circuit 60 is designed to deliver a horizontal sync signal to the horizontal scanning system 100 at a suitable timing determined based on the delivered BD signal.

Scanning light by the horizontal scanning system 100 enters a first relay optical system 110. In the first relay optical system 110, a pair of lenses 112 and 114 are arrayed along the optical axis. As will be described later on with reference to FIGS. 4 and 6, an intermediate image plane IP1 occurs between these lenses 112 and 114.

Between these lenses 112 and 114, a diffractive device 116 is disposed at a position which is offset from the intermediate image plane IP1 along the optical path toward the lens 114. The diffractive device 116 will be described later on in more detail.

A laser beam emerging from the first relay optical system 110 enters a vertical scanning system 120. The vertical scanning system 120 scans vertically a laser beam which has been previously horizontally scanned by the horizontal scanning system 100, in response to a vertical sync signal supplied from the signal processing circuit 60. The vertical scanning system 120, although formed principally with a galvanometer mirror 130 in the present embodiment, may be formed in an alternative type (e.g., a polygon mirror).

Scanning light by the vertical scanning system 120 enters a second relay optical system 140. In the second relay optical system 140, a pair of lenses 142 and 144 are arrayed along the optical axis. As will be described later on with reference to FIGS. 4 and 6, an intermediate image plane IP2 occurs between these lenses 142 and 144.

This RSD emits scanning light generated by the above-described two-dimensional scan, at the lens 144 (i.e., last-stage lens) of the second relay optical system 140, wherein the scanning light has been previously intensity-modulated and wavefront-curvature-modulated in the above manner. The emitted scanning light generated by the two-dimensional scan is projected directly onto the retina 14 through the eye pupil 12.

Figure 2:
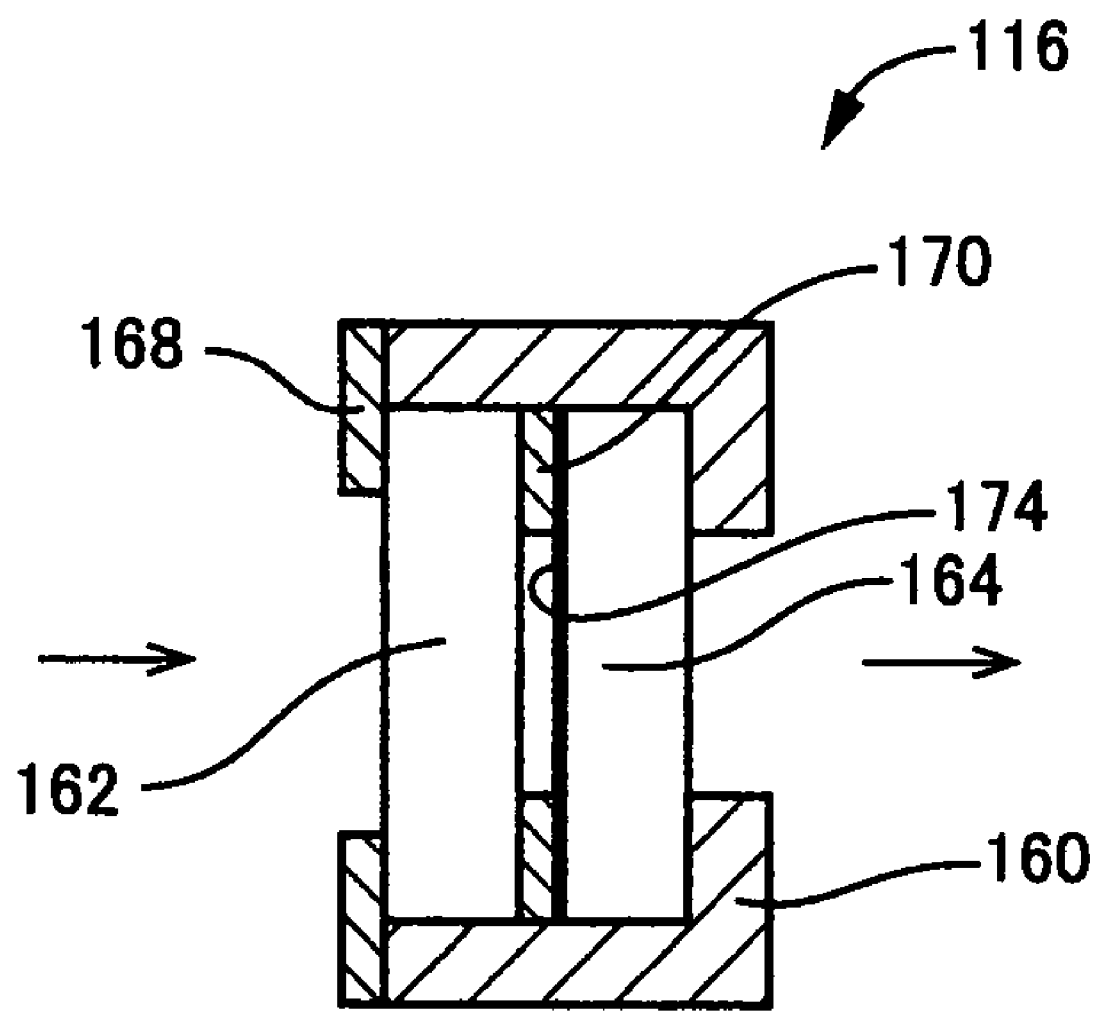
FIG. 2 is a cross-sectional side view illustrating a diffractive device depicted in FIG. 1.

In FIG. 2, there is illustrated in sectional view the diffractive device 116 in enlargement. The diffractive device 116 is structured such that a sealing block 160 functioning as a housing accommodates both a glass plate 162 and a diffraction grating 164 disposed in a superimposed array. A faster 168 prevents the glass plate 162 and the diffraction grating 164 from being separated from the sealing block 160.

The glass plate 162 and the diffraction grating 164, which are disposed away from each other in a thicknesswise direction of the glass plate 162 and the diffraction grating 164 an interposing spacer 170, are sealed with the sealing block 160 to prevent foreign matters such as dust or dirt from entering a space defined between the glass plate 162 and the diffraction grating 164.

Figure 3:
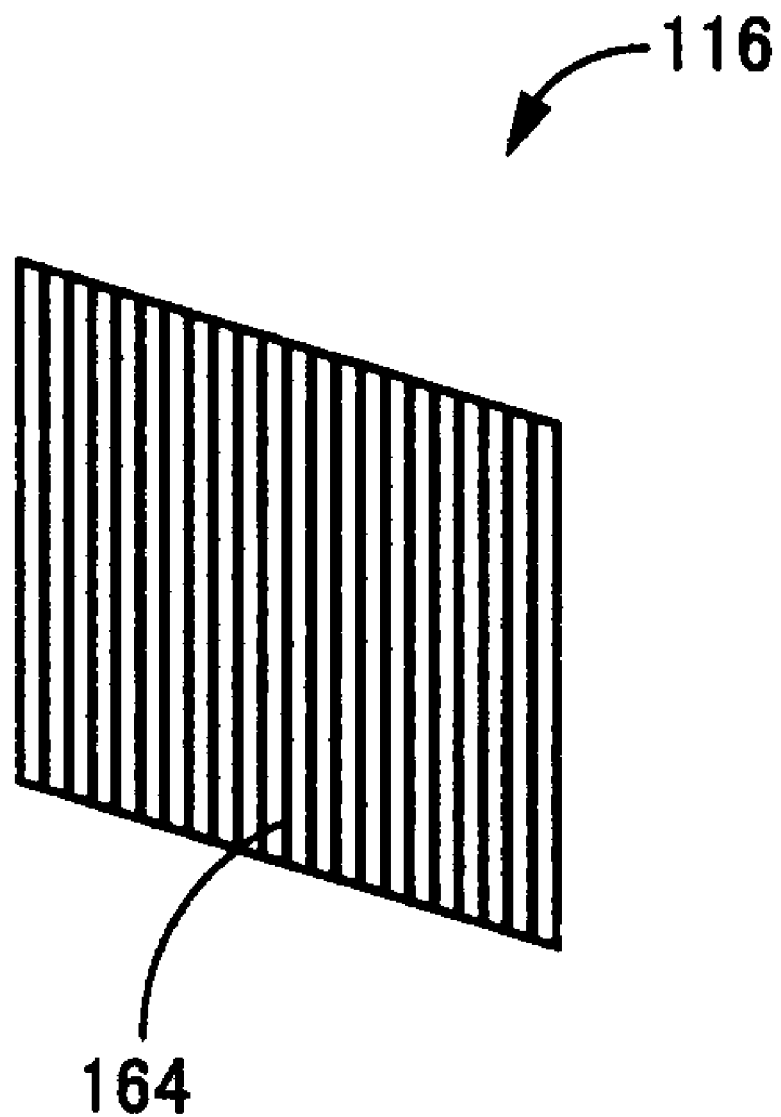
FIG. 3 is a perspective view illustrating a diffraction grating depicted in FIG. 2.

As illustrated in FIG. 3 in perspective view, in the present embodiment, the diffraction grating 164 is in the form of a one-dimensional diffraction grating comprised of a rectilinear array of alternating grooves (light-transmissive portions) and ridges (non-light-transmissive portions). In an example illustrated in FIG. 3, incident light on a diffraction plane or a surface (see FIG. 2) of the diffraction grating 164 is diffracted horizontally at the diffraction grating 164 (see FIG. 7).

Further, in the present embodiment, an effective region on the diffractive device 116, that is to say, an area on the diffractive device 116 on which a beam is incident and which allows the incident beam to undergo efficient diffraction, is defined so as to be broader than a linear scan-region which is cumulatively illuminated with scanning light generated by the horizontal scanning system 100 and being entered therefrom into the diffractive device 116.

Figure 4:
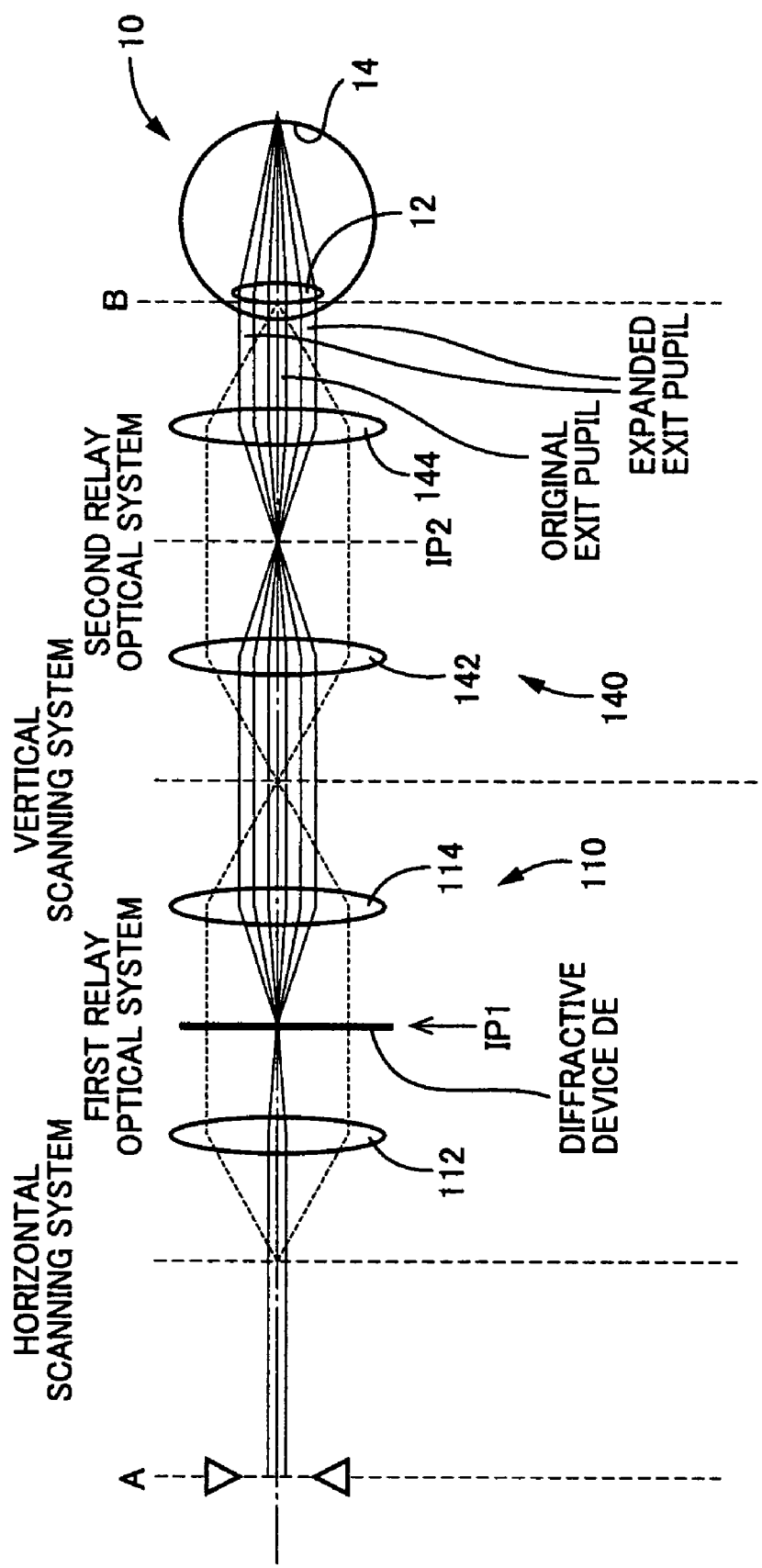
FIG. 4 is an optical path diagram for explanation of an optical configuration of a comparative example of the retinal scanning display device according to the first embodiment.
Figure 6:
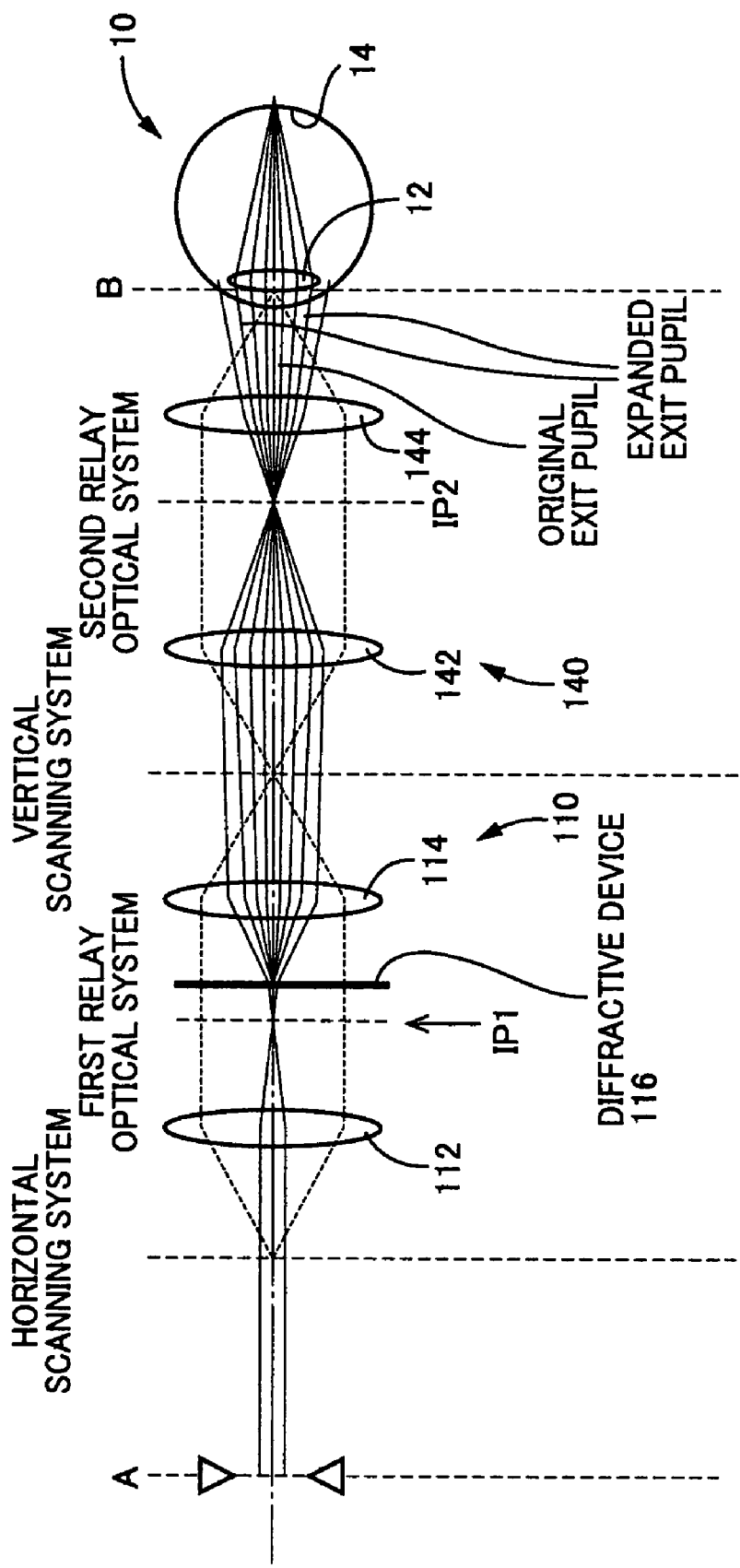
FIG. 6 is an optical path diagram for explanation of an optical configuration of the retinal scanning display device according to the first embodiment.

In both FIGS. 4 and 6, there is illustrated in an abbreviated manner the optical path of the RSD depicted in FIG. 1.

More specifically, between the horizontal scanning system 100 and the vertical scanning system 120 there exists the first relay optical system 110 in which the lenses 112 and 114 are arrayed along a common optical axis. The intermediate image plane IP1 occurs between the lenses 112 and 114.

Between the vertical scanning system 120 and the eye 10, there exists the second relay optical system 140 in which the lenses 142 and 144 are arrayed along a common optical axis. The intermediate image plane IP2 occurs between the lenses 142 and 144.

In FIG. 4, a comparative example of the present embodiment is illustrated. In this comparative example, the diffractive device 116 is disposed within the first relay optical element 110. In this regard, the comparative example is common to the present embodiment, as illustrated in FIG. 1.

In the comparative example illustrated in FIG. 4, however, the diffractive device 116 is disposed at the same position as that of the intermediate image plane IP1. In this regard, the comparative example is different from the present embodiment in which the diffractive device 116 is disposed at a position which is offset from the intermediate image plane IP1, which is to say, a position which is offset along the optical path toward the lens 114 (i.e., a light-exiting side of this RSD), as illustrated in FIG. 6 in more detail.

As illustrated in FIG. 4, when the comparative example is implemented, an exit pupil is expanded owing to the diffractive device or element 116 (denoted by "DE" to make a terminological distinction from the diffractive device 116 in the present embodiment). Therefore, this comparative example eliminates or reduces a risk that even slight movement of the eye pupil 12 can completely lose alignment with an exit pupil, resulting in a stabilized display-image.

Figure 5:
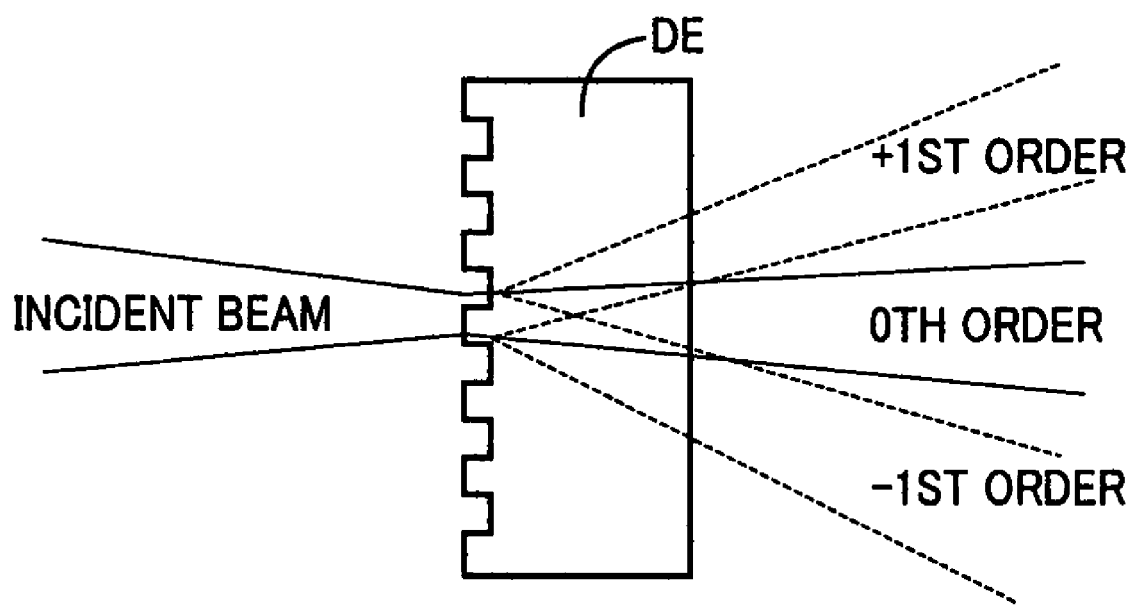
FIG. 5 is an optical path diagram for explanation of diffraction by the diffractive device depicted in FIG. 4.

As illustrated in FIG. 5, in this comparative example, however, an incident beam coming from the lens 112 and entering the diffractive device or element DE enters the diffractive device DE so as to define a beam waist at the diffractive device DE. For this reason, the possibility exits that the incident beam has a beam diameter smaller than the grating pitch of the diffractive device DE.

A smaller diameter of the incident beam than the grating pitch offers the possibility that the incident beam is not diffracted as desired, due to losses of the incident beam at the diffractive device DE by scattering, resulting in degradation of diffraction efficiency.

Further, when an incident beam having a beam diameter smaller than the grating pitch is scanned on the diffraction plane of the diffractive device DE, a portion of the diffractive device DE which is spontaneously and concurrently illuminated with the incident beam is variable in status over time like that the concurrently-illuminated portion is only one of the light-transmissive portions (i.e., the grooves) at an instant of time, and is only one of the non-light-transmissive portions (i.e., the ridges) at another instant of time.

For this reason, periodic variations occur in a spontaneous brightness of diffracted light during scan on the diffractive device DE. As a result, a periodic pattern of point-shaped noises are made in scanning light of the horizontal scanning system 100.

In addition, in this comparative example, the arrangement of the diffractive device DE between the horizontal and vertical scanning systems 100 and 120 transforms such point-shaped noises into line-shaped noises, as a result of vertical scan of the vertical scanning system 120. For this reason, a periodic pattern of a plurality of black lines (i.e., noises having line pictures) is created in an ultimate display-image, due to the periodic variations in brightness of the diffracted light.

In contrast in the present embodiment, as illustrated in FIG. 6, the diffractive device 116 is disposed at a position offset from the intermediate image plane IP1 along the optical path toward the lens 114.

Figure 7:
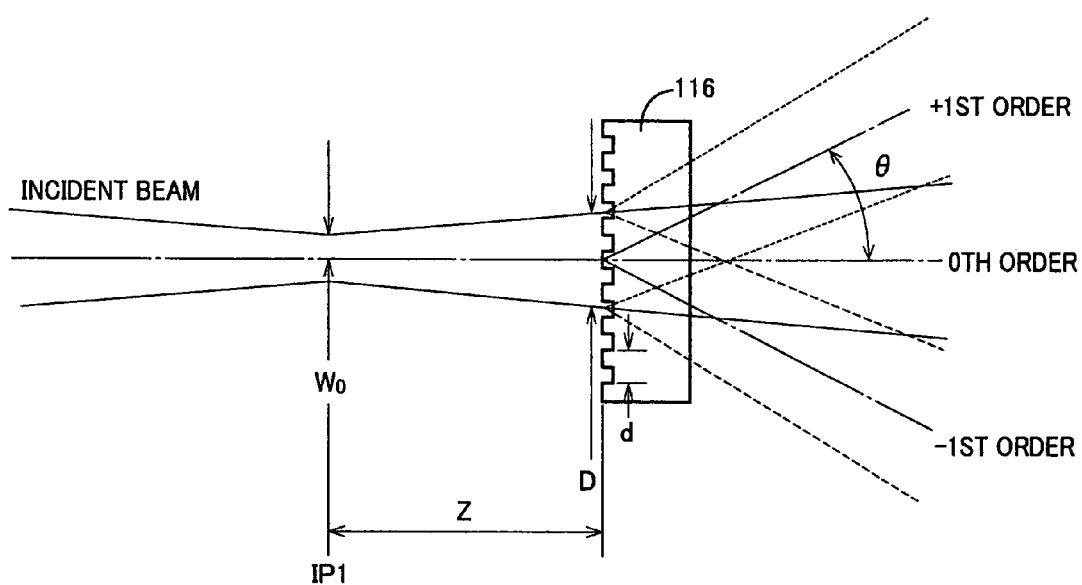
FIG. 7 is an optical path diagram for explanation of diffraction by the diffractive device depicted in FIG. 6.

Therefore, in the present embodiment, as illustrated in FIG. 7, an incident beam enters the diffractive device 116 in a manner that a local portion of the incident beam which has been diverged relative to its beam waist passes through the diffractive device 116.

As a result, a beam diameter D of the incident beam (i.e., the diameter of a portion of the incident beam located on the diffractive device 116) becomes larger than a beam-waist diameter $W_0$ (i.e., the diameter of a portion of the incident beam located on the intermediate image plane IP1), and also become larger in size than the grating pitch d the diffractive device 116. In this regard, the beam-waist diameter $W_0$ is equal in size to the beam diameter D measured in the aforementioned comparative example.

Therefore, in the present embodiment, the diffraction efficiency of the diffractive device 116 becomes more evenly distributed thereover, resulting in greater ease with which the exit pupil can expanded without degradation in quality of a displayed image.

Now, there will be described below with reference to FIG. 7 the setting of an offset z indicative of an amount by which the diffraction plane 174 of the diffractive device 116 is offset from the intermediate image plane IP1 along the optical path.

For preventing an image quality from being degraded even when the exit pupil is expanded by the diffractive device 116, the incident beam diameter D is preferably set to be a value which is any one of integer multiples of the grating pitch d, and more preferably, a value which is equal to or greater than three times the grating pitch d. This will be expressed by the following equation:

$D >= 3d$.

Further, a relationship established between the incident beam diameter D, the beam-waist diameter $W_o$, a wavelength $\lambda$ of an incident beam, and the offset z is expressed by the following equation:

$D = 2W_0(1 + (\lambda z/\Pi W_0^2)^2)^{1/2}$.

In addition, a relationship established between the grating pitch d, a diffraction angle $\theta$, and the wavelength $\lambda$ of an incident beam is expressed by the following equation:

$d = \sin \theta / \lambda$.

Therefore, once the beam-waist diameter $W_0$, the wavelength $\lambda$ of the incident beam, and the diffraction angle $\theta$ are given, the lower limit of the offset z can be calculated using the relationships described above.

Figure 8:
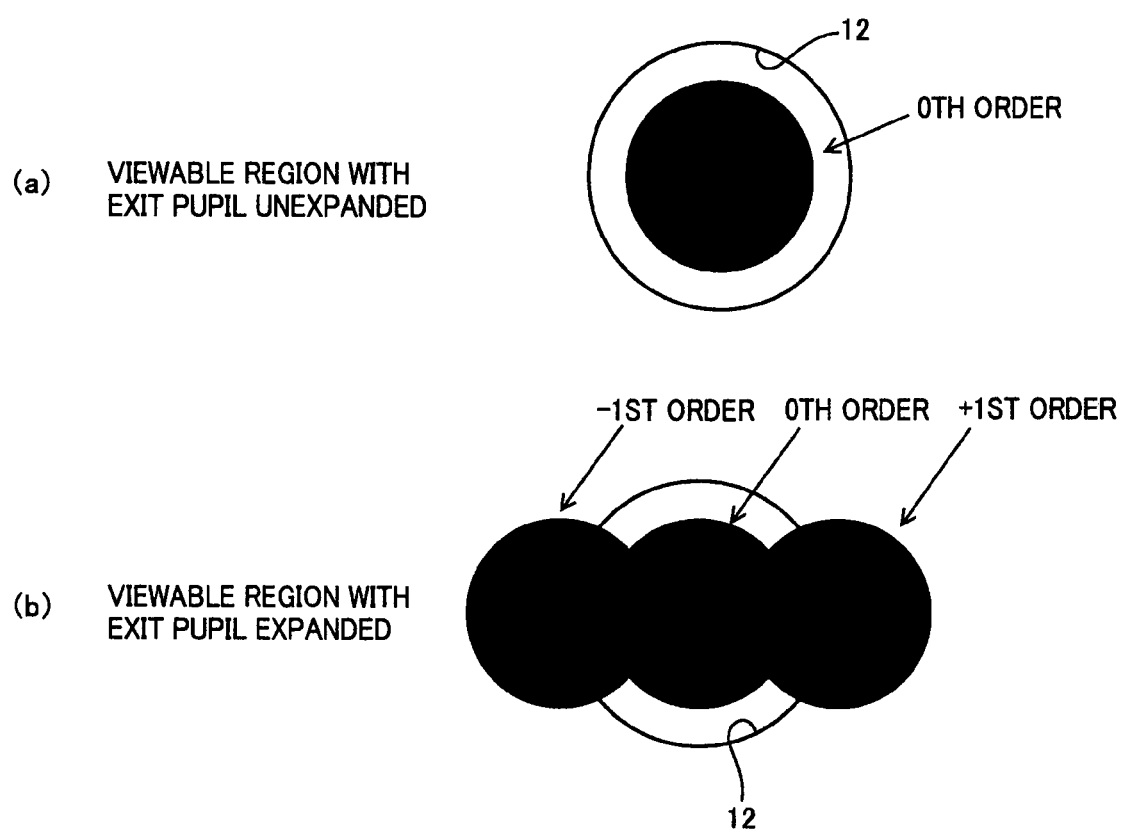
FIG. 8(a) is a front view for explanation of a conventional exit pupil.
FIG. 8(b) is a front view for explanation of an exit pupil expanded by the diffractive device depicted in FIG. 6, in comparison with the conventional exit pupil.

In FIG. 8(a), the eye pupil 12 and the exit pupil are illustrated in front view, with the pupil exit being not expanded not by using the diffractive device 116, wherein the exit pupil is illustrated as a user-viewable region.

In FIG. 8(b), the eye pupil 12 and the exit pupil are illustrated in front view, with the pupil exit being expanded using the diffractive device 116, wherein the exit pupil is illustrated as a user-viewable region.

Figure 9:
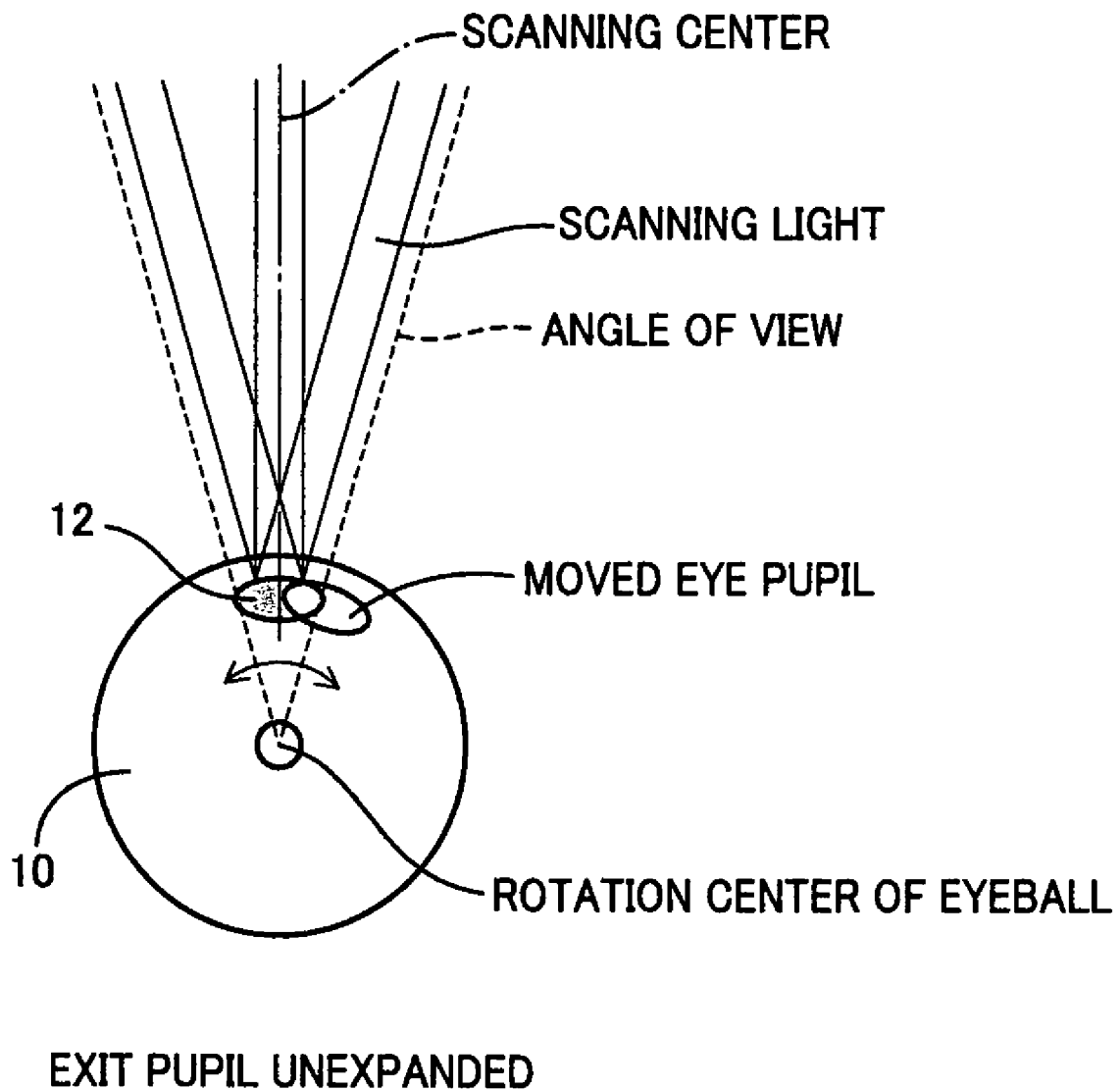
FIG. 9 is an optical path diagram for explanation of a relative geometry between the conventional exit pupil depicted in FIG. 8(a) and a viewer's eye pupil.
Figure 10:
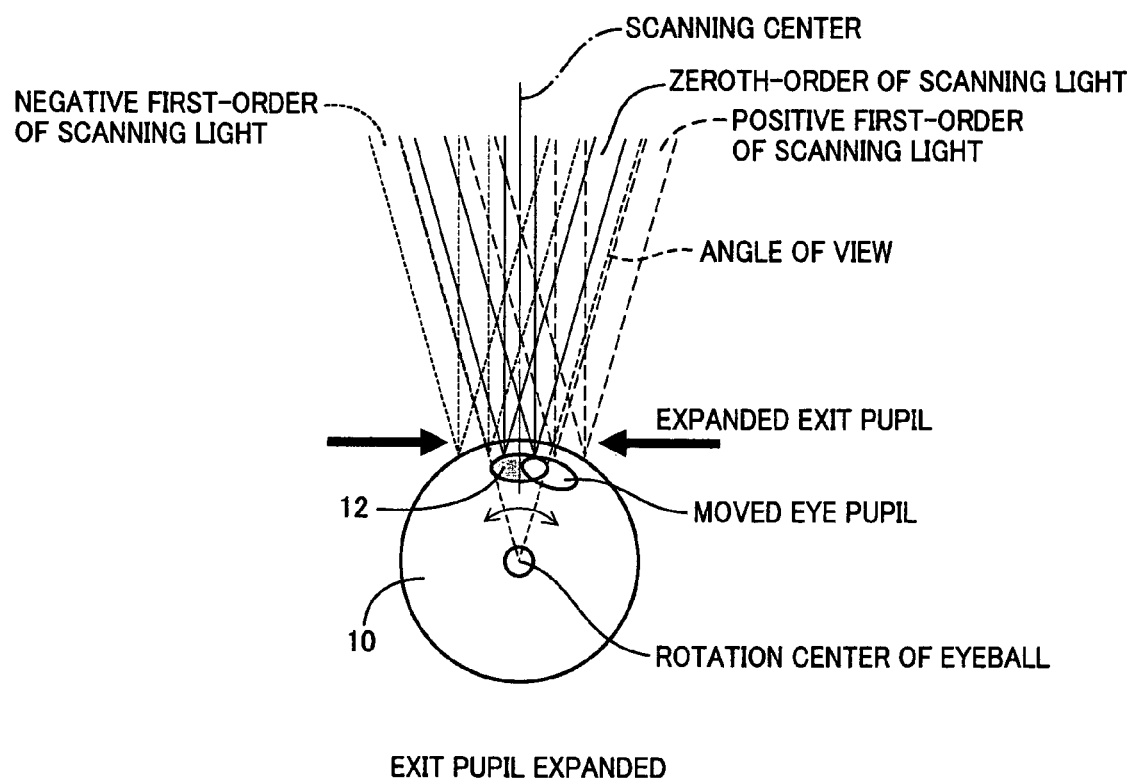
FIG. 10 is an optical path diagram for explanation of a relative geometry between the expanded exit pupil depicted in FIG. 8(b) and a viewer's eye pupil.

In FIG. 9, scanning light incident on the eye 10 through the exit pupil depicted in FIG. 8(a) is illustrated in side view. In FIG. 10, scanning light incident on the eye 10 through the exit pupil depicted in FIG. 8(b) is illustrated in side view.

When the diffractive device 116 is not disposed in the optical path of the RSD, only one exit pupil of the RSD occurs, as illustrated in FIG. 8(a) in front view. The one exit pupil has a diameter smaller than the eye pupil 12. The eye pupil 12 has an average diameter of approximately 3 mm, while the exit pupil has a diameter of, for example, approximately 1.5 mm.

For this reason, as illustrated in FIG. 9 in side view, movement of the eye pupil 12 from its initial position due to rotational movement of the eye 10 may lose alignment of the eye pupil 12 with the exit pupil almost completely.

In contrast, when the diffractive device 116 is disposed in the optical path of the RSD as illustrated in FIG. 1, the total number of major exit pupils of the RSD increases from one to three, as illustrated in front view in FIG. 8(b).

Because the diffractive device 116 is formed principally with a one-dimensional diffraction grating, a rectilinear array of three exit pupils is defined in this RSD, provided that only zeroth-order and positive and negative first-orders of diffracted beams are considered as dominant ones of all diffracted beams.

When the aforementioned offset z is equal to zero, which is to say, the diffractive element 116 is disposed at the location where the intermediate image plane IP1 is to occur, light beams output from the diffractive device 116 after angular separation are ultimately focused onto the retina 14 so as to define the corresponding respective image-points (i.e., focal points) on the retina 14 at close positions. However, as the offset z increases, a tendency increases that the angularly-separated light beams are focused onto the retina 14 so as to define the corresponding respective image-points on the retina 14 at dispersed positions.

On the other hand, the greater a tendency that a viewer views light beams passing through those three exit pupils, as image points on the retina 14 at dispersed positions, the greater a tendency that the viewer perceives a displayed image as a multiplexed image conductive to a fuzzy and out-of-focus image.

In view of the above, in the present embodiment, the offset z is set to a value allowing the image points on the retina 14 to be disposed adequately close to each other, wherein the image points are defined by light beams passing through those three exit pupils, respectively. That is to say, the offset z is set so that three virtual images, which are perceived by the viewer through the respective three exit pupils, can be almost completely superimposed with one another at generally the same positions.

Further, the diffraction angle $\theta$ is set to a value allowing a maximum length of a superimposed and merged exit pupil (conceptually, commensurate with the diameter of the observed exit pupil) to become larger than the diameter of the eye pupil 12.

In other words, in the present embodiment, an upper limit of the offset z is set to a value allowing a user-perceived image to be prevented from being multiplexed, and allowing the scanning light to enter the eye pupil 12 with an adequate light-amount, even when the eye pupil 12 slightly moves from its initial position, as illustrated in FIG. 10.

The offset z is set to a value not greater than 0.45 mm, for example. The offset z is preferably set to, for example, a value ranging from approximately 0.05 mm to approximately 0.25 mm, a value ranging from 0.1 mm to 0.2 mm, or a value of approximately 0.15 mm.

As will be evident from the above explanation, in the present embodiment, the three lasers 30, 32, and 34 together constitute an example of the "light source" set forth in the above mode (1), the horizontal scanning system 100 and the vertical scanning system 120 together constitute an example of the "scanner" set forth in the same mode, the lens 144 constitutes an example of the "light exit" set forth in the same mode, the diffractive device 116 constitutes an example of the "pupil expanding element" set forth in the same mode, and the intermediate image plane IP1 constitutes an example of the "intermediate image plane" set forth in the same mode.

Further, in the present embodiment, the diffractive device 116 constitutes an example of the "pupil expanding element" set forth in each of the above modes (2) and (6), the lenses 112 and 114 together constitute an example of the "pair of optical elements" set forth in the above mode (6), and the intermediate image plane IP1 constitutes an example of the "intermediate image plane" set forth in the same mode.

Still further, in the present embodiment, the horizontal scanning system 100 constitutes an example of the "primary scanning subsystem" set forth in the above mode (9), and the vertical scanning system 120 constitutes an example of the "secondary scanning subsystem" set forth in the same mode, and the intermediate image plane IP1 constitutes an example of the "intermediate image plane" set forth in the same mode.

SECOND EMBODIMENT

Next, a second illustrative embodiment of the present invention will be described below.

The present embodiment is different from the first embodiment only with respect to the configuration of the diffractive device, and is common to the first embodiment with respect to the remaining elements.

Therefore, only the different elements of the present embodiment from those of the first embodiment will be described below in greater detail, while the common elements of the present embodiment to those of the first embodiment will be omitted in the description using the identical reference numerals or names for reference.

Figure 11:
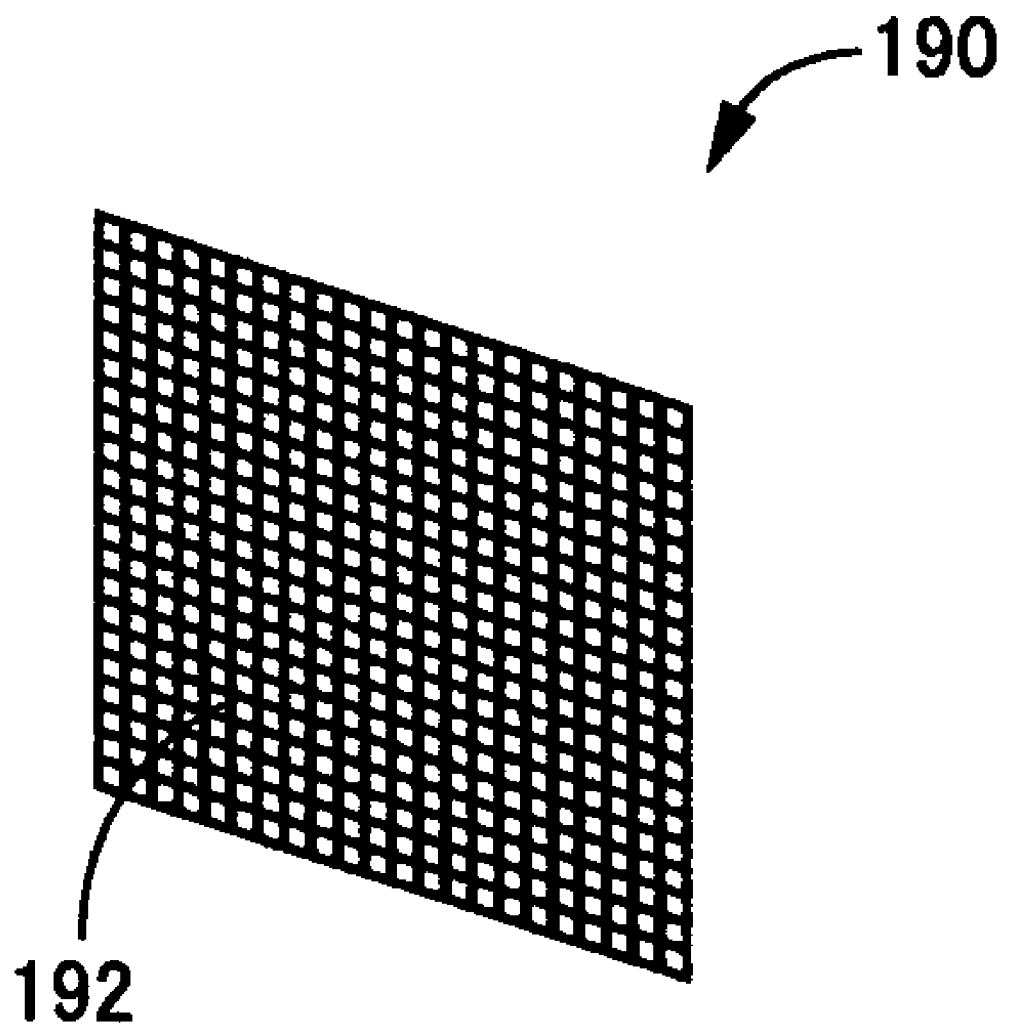
FIG. 11 is a perspective view illustrating one two-dimensional diffraction grating employed in a diffractive device included in a retinal scanning display device constructed according to a second illustrative embodiment of the present invention.

In the first embodiment, the diffractive device 116 is configured such that incident light thereon is diffracted only in one dimension. In contrast, in the present embodiment, as illustrated in FIG. 11, a diffractive device or element 190 is formed principally with a two-dimensional diffraction grating 192 operable to diffract incident light thereon in two dimensions.

The diffractive device 190 has a configuration which is so similar to that of the diffractive device 116 illustrated in FIG. 2, that it can be reached by replacement of the one-dimensional diffraction grating 164 of the diffractive device 116 with the two-dimensional diffraction grating 192.

As will be evident from the above explanation, in the present embodiment, the diffractive device 190 constitutes an example of the "pupil expanding element" set forth in the above mode (3), and the two-dimensional diffraction grating 192 constitutes an example of the "two-dimensional diffraction grating" set forth in the above mode (5).

THIRD EMBODIMENT

Next, a third illustrative embodiment of the present invention will be described below.

The present embodiment is different from the second embodiment only with respect to the configuration of the diffractive device, and is common to the second embodiment with respect to the remaining elements.

Therefore, only the different elements of the present embodiment from those of the second embodiment will be described below in greater detail, while the common elements of the present embodiment to those of the second embodiment will be omitted in the description using the identical reference numerals or names for reference.

Figure 12:
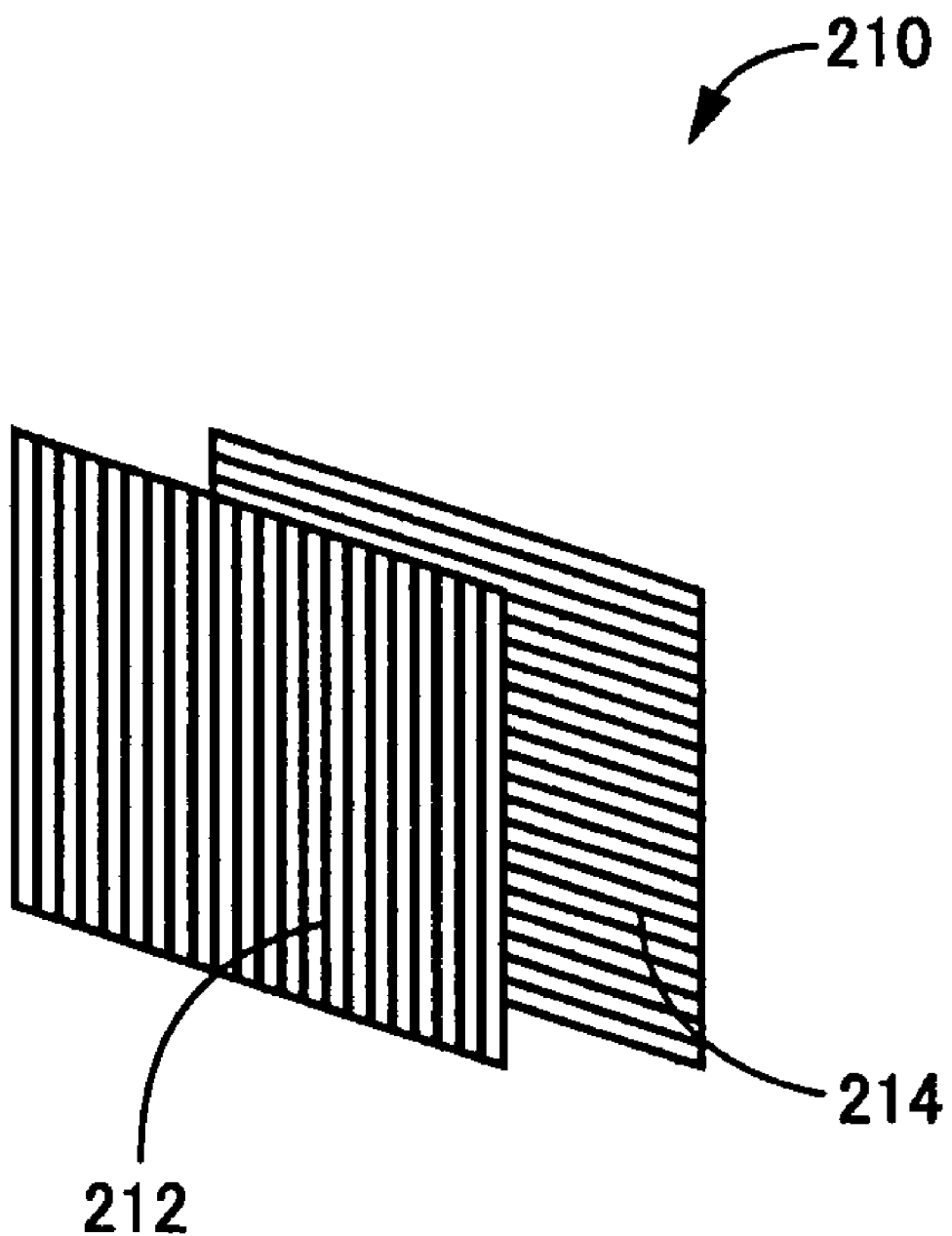
FIG. 12 is a perspective view illustrating two one-dimensional diffraction gratings employed in a diffractive device included in a retinal scanning display device constructed according to a third illustrative embodiment of the present invention.

In the second embodiment, incident light on the one two-dimensional diffraction grating 192 is diffracted in two dimensions. On the other hand, in the present embodiment, as illustrated in FIG. 12, a diffractive device 210 is configured to include two one-dimensional diffraction gratings 212 and 214 at each of which incident light thereon is diffracted in one dimension, and both of which are transversely oriented relative to each other so as to define different directions of orientation.

The diffractive device 210 has a configuration which is so similar to that of the diffractive device 116 illustrated in FIG. 2, that it can be reached by both replacement of the glass plate 162 of the diffractive device 116 with the one-dimensional diffraction grating 212, and replacement of the one-dimensional diffraction grating 164 of the diffractive device 116 with the one-dimensional diffraction grating 214.

As will be evident from the above explanation, in the present embodiment, the diffractive device 210 constitutes an example of the "pupil expanding element" set forth in the above mode (3), and the two one-dimensional diffraction gratings 212 and 214 constitute an example of the "two one-dimensional diffraction gratings" set forth in the above mode (4).

FOURTH EMBODIMENT

Next, a fourth illustrative embodiment of the present invention will be described below.

The present embodiment is different from the first embodiment only with respect to the allocation of the diffractive device, and is common to the first embodiment with respect to the remaining elements.

Therefore, only the different elements of the present embodiment from those of the first embodiment will be described below in greater detail, while the common elements of the present embodiment to those of the first embodiment will be omitted in the description using the identical reference numerals or names for reference.

In the first embodiment, the diffractive device 116 is disposed between the horizontal scanning system 100 and the vertical scanning system 120. On the other hand, in the present embodiment, a diffractive device 230 is disposed between the vertical scanning system 120 and the lens 144 (i.e., an ultimate light-exit of the RSD), as illustrated in FIG. 13.

Figure 13:
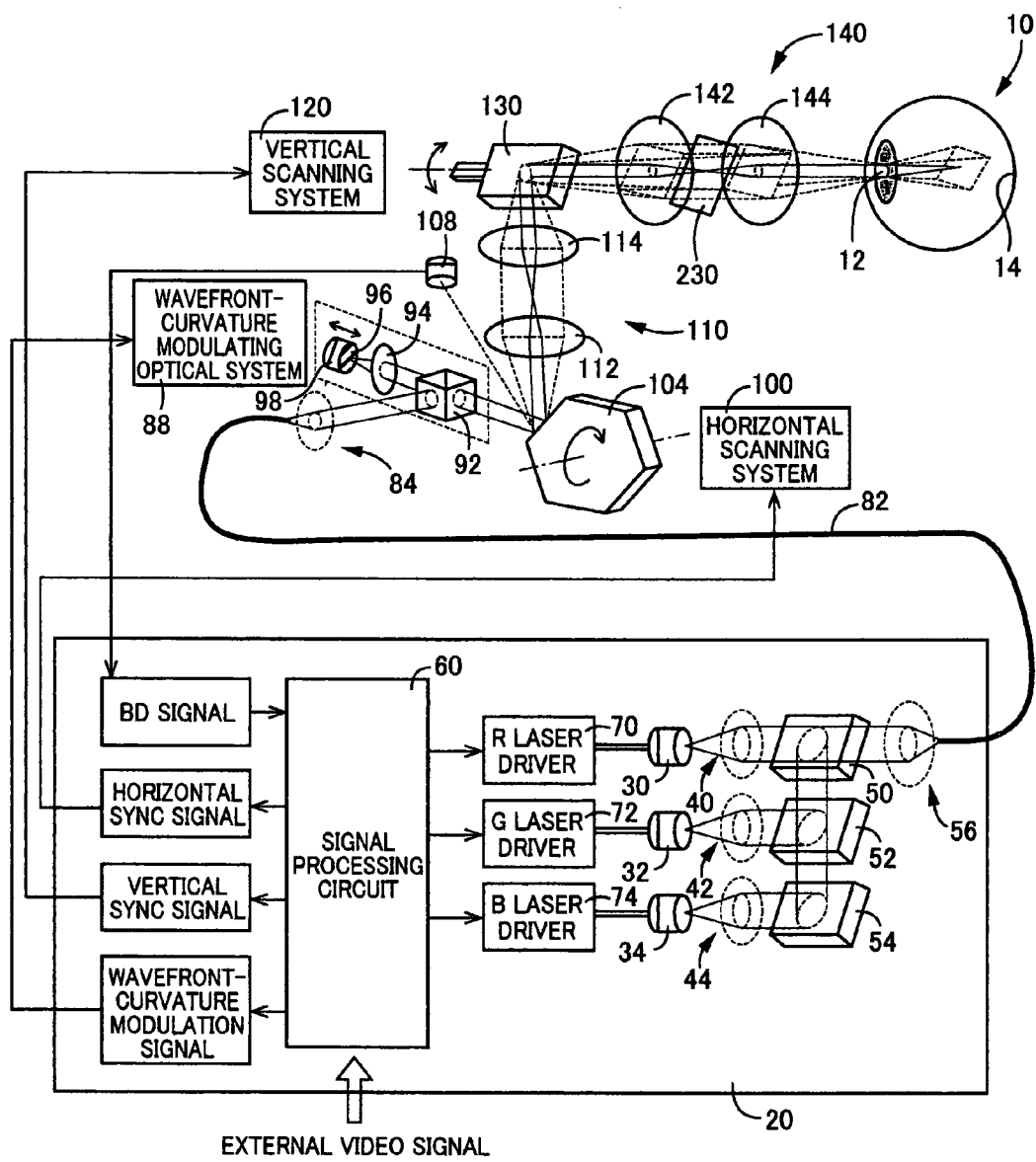
FIG. 13 is a schematic diagram illustrating a retinal scanning display device constructed according to a fourth illustrative embodiment of the present invention.

More specifically, as illustrated in FIG. 13, the diffractive device 230 is disposed between the lenses 142 and 144. Still more specifically, in the present embodiment, the diffractive device 230 is disposed at a position offset from the intermediate image plane IP2 illustrated in FIG. 6 along the optical path toward the lens 144.

The diffractive device 230, although similar in configuration to the diffractive device 116, has a light-beam entrance region enabling efficient diffraction with an area larger than that of the diffractive device 116. It is because the diffractive device 230, differently from the diffractive device 116, is configured to receive light scanned by the vertical scanning system 120 for diffraction.

In the present embodiment, differently from the first embodiment, the diffractive device 230 is not disposed upstream from the vertical scanning system 120, allowing scanning light of the horizontal scanning system 100 to enter the vertical scanning system 120 without diffraction.

For this reason, differently from the first embodiment, the area of a light-entrance region (e.g., a mirror surface of the galvanometer mirror 130) of the vertical scanning system 120 can be determined independently of the design of the diffractive device 230. That is to say, the setting of the diffractive device 230 does not require an increase in area of the light-entrance region or an increase in size of the vertical scanning system 120.

As will be evident from the above explanation, in the present embodiment, the lenses 142 and 144 together constitute an example of the "pair of optical elements" set forth in the above mode (6), and the intermediate image plane IP2 constitutes an example of the "intermediate image plane" set forth in the same mode.

Further, in the present embodiment, the intermediate image plane IP2 constitutes an example of the "intermediate image plane" set forth in each of the above modes (7) and (8), and the diffractive device 230 constitutes an example of the "pupil expanding element" set forth in each of the above modes (7) and (8).

Still further, in the present embodiment, the intermediate image plane IP2 constitutes an example of the "intermediate image plane" set forth in the above mode (10), and the diffractive device 230 constitutes an example of the "pupil expanding element" set forth in the same mode.

FIFTH EMBODIMENT

Next, a fifth illustrative embodiment of the present invention will be described below.

The present embodiment is common to the first embodiment with respect to many elements. Therefore, only the different elements of the present embodiment from those of the first embodiment will be described below in greater detail, while the common elements of the present embodiment to those of the first embodiment will be omitted in the description using the identical reference numerals or names for reference.

Figure 14:
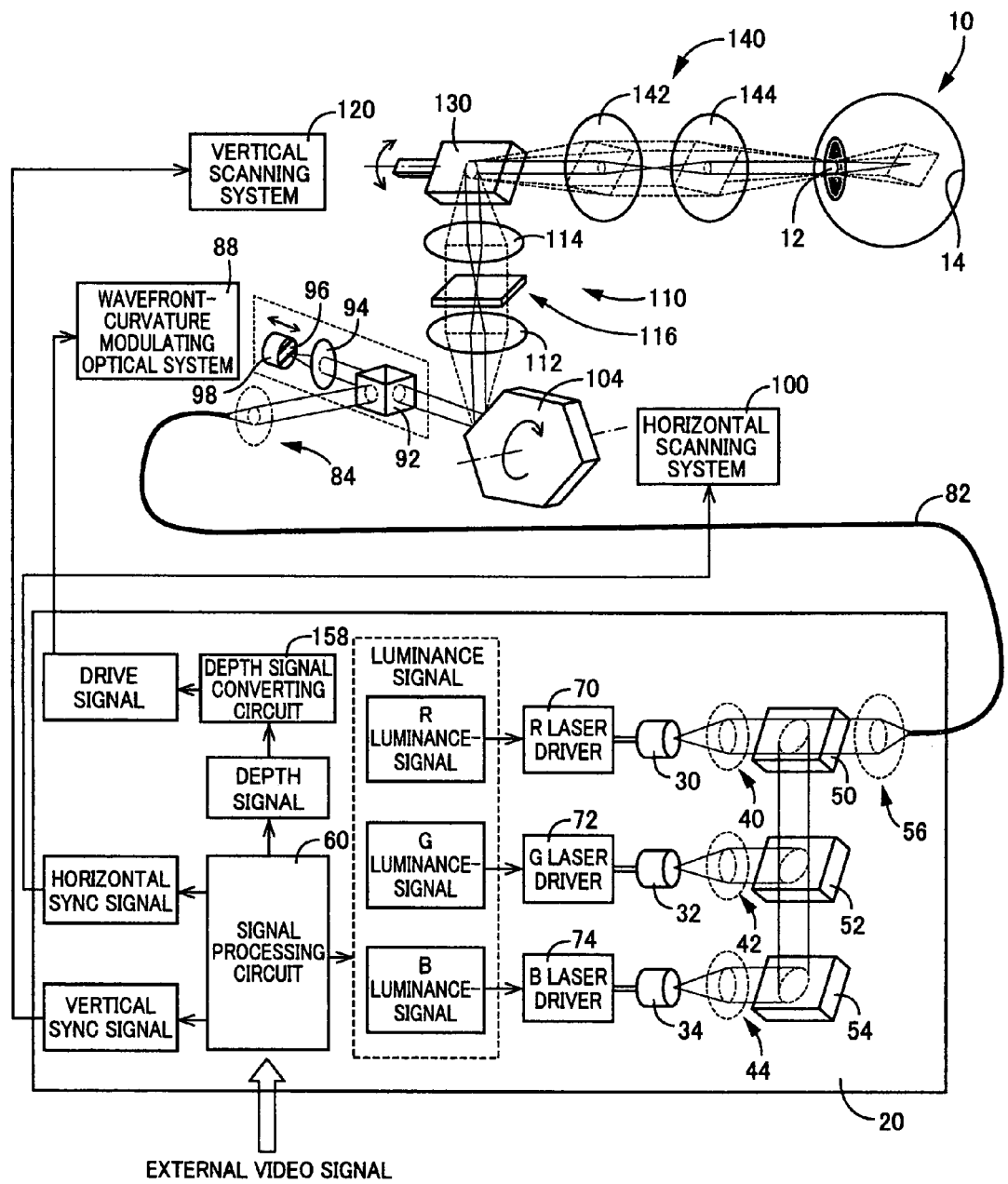
FIG. 14 is a schematic diagram illustrating a retinal scanning display device constructed according to a fifth illustrative embodiment of the present invention.

As illustrated in FIG. 14, an RSD in accordance with the present embodiment, similarly with the first embodiment depicted in FIG. 1, is configured to include: the light source unit 20 having the signal processing circuit 60; the wavefront-curvature modulating optical system 88; the horizontal scanning system 100; the first relay optical system 110; the vertical scanning system 120; the second relay optical system 140; and the diffractive device 116.

As illustrated in FIG. 14, in the present embodiment, a video signal is externally supplied to the signal processing circuit 60, and a user-viewer is capable of adjusting a depth of a display image formed based on the supplied video signal, relative to the position of the viewer. The depth is defined as a distance of the position of the image which the viewer perceives, from the position of the viewer.

A set-value of the depth is specified according to a user manipulation to this RSD. For this reason, in the present embodiment, it is inessential to prepare the original video signal so as to have an embedded depth-signal indicative of a set-value of the depth.

The present invention, however, may be practiced in an alternative arrangement in which the original video signal is prepared so as to include therein a depth signal, and based on the depth signal, the depth of an image is adjusted. In this arrangement, typically, the video signal is formatted to include the depth signal in association with luminance signal(s).

As illustrated in FIG. 14, the actuator 98 is driven based on a drive signal which is supplied from the signal processing circuit 60, and which is indicative of a depth signal. This allows control of a lens-mirror distance (i.e., a distance between the reflecting mirror 96 and the converging lens 94).

There depends upon the lens-mirror distance, the curvature of wavefront of light which exits the converging lens 94 divergently and which then enters the beam splitter 92, and on the other hand, the lens-mirror distance is responsive to the aforementioned depth signal.

As a result, the curvature of wavefront of a laser beam emitted from the beam splitter 92 toward its downstream side is responsive to the depth signal.

Figure 17:
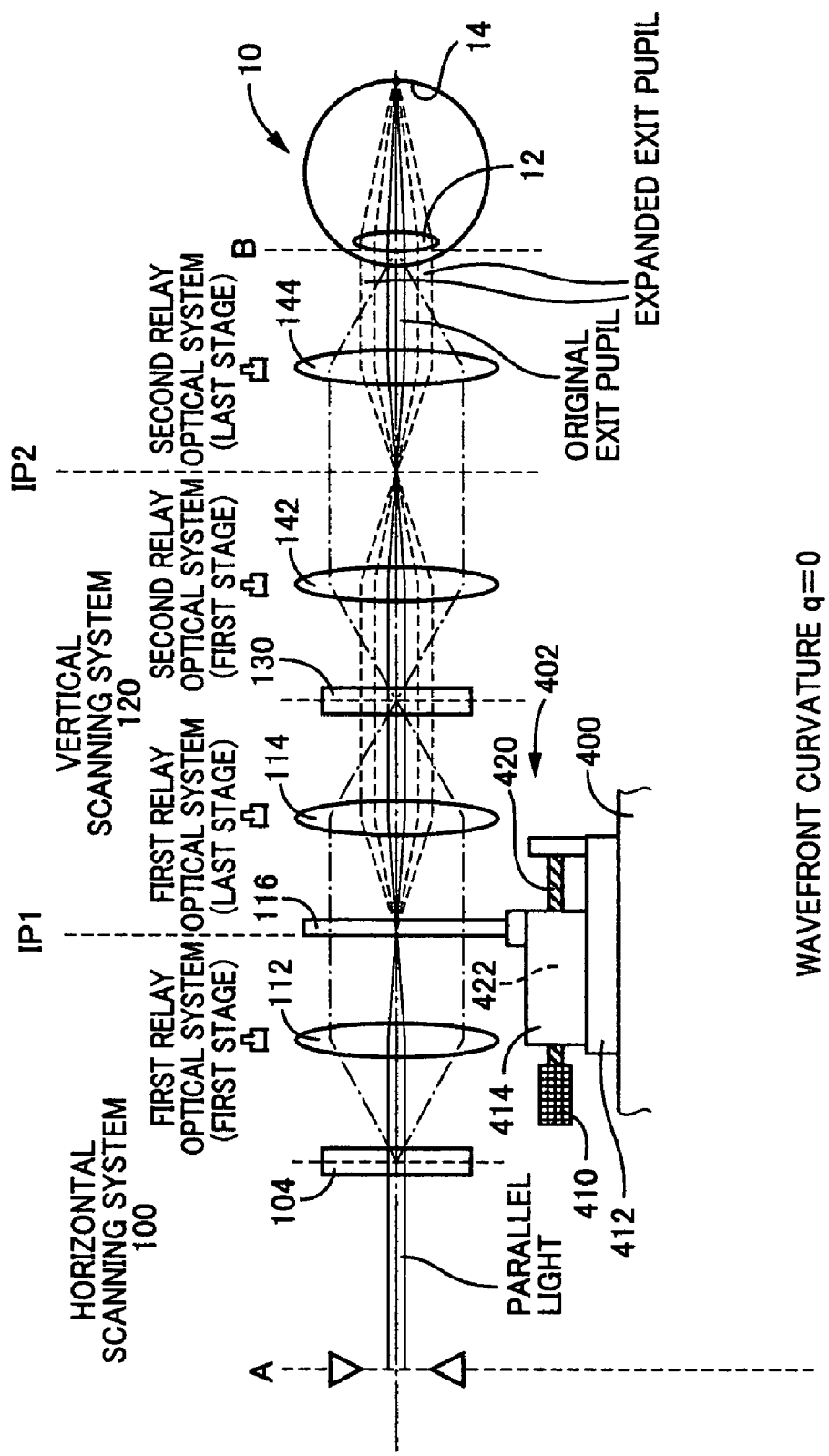
FIG. 17 is an optical path diagram illustrating a major part of an optical path defined in the retinal scanning display device depicted in FIG. 14 with incoming light having a wavefront curvature q of zero, for explanation of a major part of an optical configuration of the retinal scanning display device together with a mechanical displacement mechanism.

As illustrated in FIGS. 14 and 17, light which has been scanned by the horizontal scanning system 100 is incident on the first relay optical system 110.

In the first relay optical system 110, as illustrated in FIG. 17, there are arrayed in series in the optical axis along which a laser beam travels, both the first-stage lens group 112 located on a laser-beam-entrance side, and the last-stage lens group 114 located on a laser-beam exit side.

As illustrated in FIG. 17, the diffractive device 116 is disposed between those first-stage lens group 112 and last-stage lens group 114. This diffractive device 116 is formed with the diffraction grating 164, as illustrated in FIG. 4.

As illustrated in FIG. 5, the diffraction grating 164 is in the form of a single one-dimensional diffraction grating having a rectilinear array of alternating grooves or valleys (i.e., light-transmissive portions) and ridges (i.e., non-light-transmissive-portions). In an example illustrated in FIG. 5, the diffraction grating 164 operates to cause incident light on the diffraction plane 174 (see FIG. 19) to be diffracted horizontally (see FIGS. 8 and 9).

As illustrated in FIGS. 14 and 17, light which has been scanned by the vertical scanning system 120 is incident on the second relay optical system 140.

In the second relay optical system 140, as illustrated in FIG. 17, there are arrayed in series in the optical axis along which a laser beam travels, both the first-stage lens group 142 located on the laser-beam-entrance side, and the last-stage lens group 144 located on the laser-beam exit side.

This RSD emits scanning light generated by the above-described two-dimensional scan, at the last-stage lens group 144 of the second relay optical system 140, wherein the scanning light has been previously intensity-modulated and wavefront-curvature-modulated in the above manner. The emitted scanning light generated by the two-dimensional scan is projected directly onto the retina 14 through the eye pupil 12.

Figure 15:
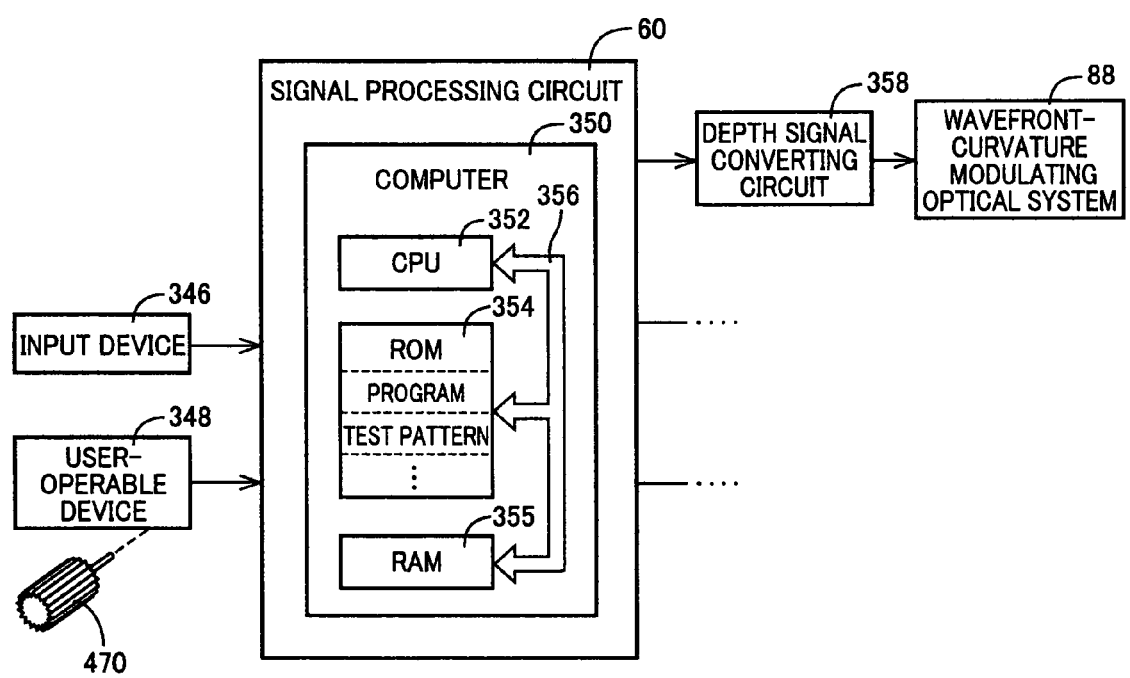
FIG. 15 is a schematic block diagram illustrating a signal processing circuit depicted in FIG. 14 together with its peripherals.

In FIG. 15, the configuration of the signal processing circuit 60 and the connection with its peripherals are conceptually illustrated in block diagram.

This signal processing circuit 60 is electrically connected to an input device 346 for inputting an external signal including a video signal, and a user-operable device 348 (e.g., button switches, dials, keys, a display panel, etc.) which is operated or manipulated by the user for entry of a command into this signal processing circuit 60.

As illustrated in FIG. 15, this signal processing circuit 60 is constructed using a computer 350 as a major component. The computer 350 is constructed by interconnecting a Central Processing Unit (CPU) 352, a Read Only Memory (ROM) 354 and a Random Access Memory (RAM) 355 via a bus 356.

In the ROM 354, there have been stored various programs beginning with a depth signal generation program to generate a depth signal in response to a user manipulation.

This signal processing circuit 60 is further connected electrically to a depth signal converting circuit 358. The depth signal converting circuit 358 is configured to convert a depth signal generated as a result of the execution of the above-mentioned depth signal generation program, into a drive signal, and output the drive signal to the wavefront-curvature modulating optical system 88.

Figure 16:
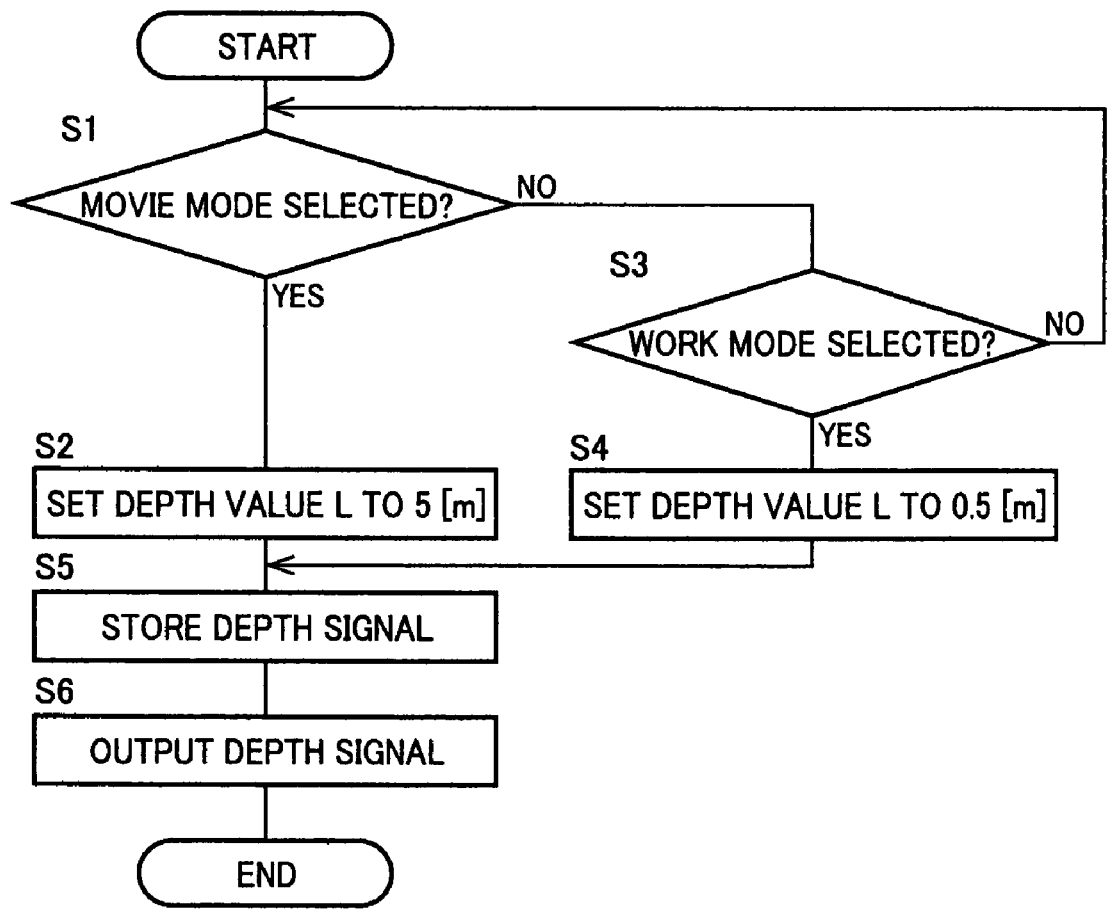
FIG. 16 is a flow chart conceptually illustrating a depth signal generation program executed by a computer depicted in FIG. 15.

In FIG. 16, the above-mentioned depth signal generation program is illustrated conceptually in flow chart. This depth signal generation program is repeatedly executed by the computer 350 while the computer 350 is being powered.

Each cycle of execution of this depth signal generation program starts with step S1 to make a determination as to whether or not a "movie mode" has been selected as a target operational-mode of the RSD, based on a user action (indicative of a user command or instruction) to the user-operable device 348. The movie mode is one of optional operational-modes of the RSD which is suitable for the user to view a moving picture such as movies for an elongated period of time.

If the user has selected the movie mode, then the determination of step S1 becomes "YES," and at a subsequent step S2, a depth value (set-value) L is set to a greater one (e.g., having a value of 5 [m]) of two optional set-values. Thereafter, operations progress to step S5.

If, however, the user has not selected the movie mode, then the determination of step S1 becomes "NO" and operations progress to step S3.

At step S3, a determination is made as to whether or not a "work mode" has been selected as a target operational-mode of the RSD, based on a user action (indicative of a user command or instruction) to the user-operable device 348. The work mode is one of optional operational-modes of the RSD which is suitable for the user, when using the RSD as a monitor screen of a personal computer, to enter data into the personal computer.

If the user has selected the work mode, then the determination of step S3 becomes "YES," and at a subsequent step S4, the depth value (set-value) L is set to a less one (e.g., having a value of 0.5 [m]) of the two optional set-values. Thereafter, operations progress to step S5.

If, however, the user has selected neither the movie mode nor the work mode, then the determinations of steps S1 and S3 both become "NO" and operations return to step S1.

After completion of any one of steps S2 and S4, step S5 is implemented to generate a depth signal indicative of the set value of the depth value L, and store the generated depth signal in the RAM 355.

Subsequently, at step S6, the generated depth signal is output to the depth signal converting circuit 358. As a result, the curvature of wavefront of a laser beam is modulated via the wavefront-curvature modulating optical system 88, so that an actual value of the depth value L of an image displayed onto the retina 14 by the RSD can reflect a user-issued command.

Then, one cycle of execution of this depth signal generation program is terminated.

Figure 18:
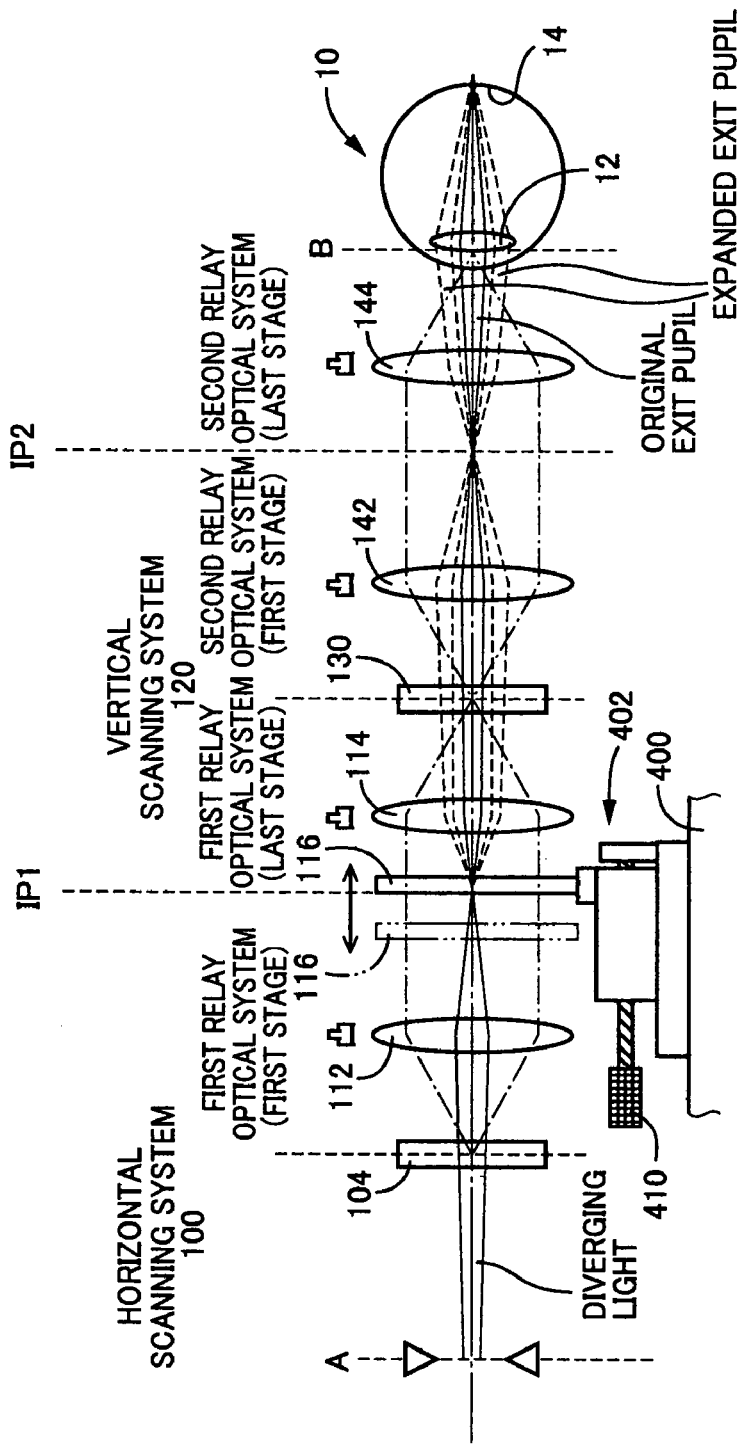
FIG. 18 is an optical path diagram illustrating the major part of the optical path defined in the retinal scanning display device depicted in FIG. 14 with the incoming light having a wavefront curvature q of non-zero, for explanation of the major part of the optical configuration of the retinal scanning display device together with the mechanical displacement mechanism.

In both FIGS. 17 and 18, the optical path defined in the RSD depicted in FIG. 14 is illustrated in an abbreviated manner.

More specifically, the first relay optical system 110 is located between the horizontal scanning system 100 and the vertical scanning system 120, and in this first relay optical system 110, the first-stage lens group 112 and the last-stage lens group 114 are arrayed along a common optical axis. The intermediate image plane IP1 is located between the first-stage lens group 112 and the last-stage lens group 114.

The second relay optical system 140 is located between the vertical scanning system 120 and the viewer's eye 10, and in this second relay optical system 140, the first-stage lens group 142 and the last-stage lens group 144 are arrayed along a common optical axis. The intermediate image plane IP2 is located between the first-stage lens group 142 and the last-stage lens group 144.

As illustrated in FIG. 17, in the present embodiment, the diffractive device 116 is disposed at the same position as the intermediate image plane IP1, and more specifically, the diffraction plane 174 is disposed coincident in position with the intermediate image plane IP1.

Figure 19:
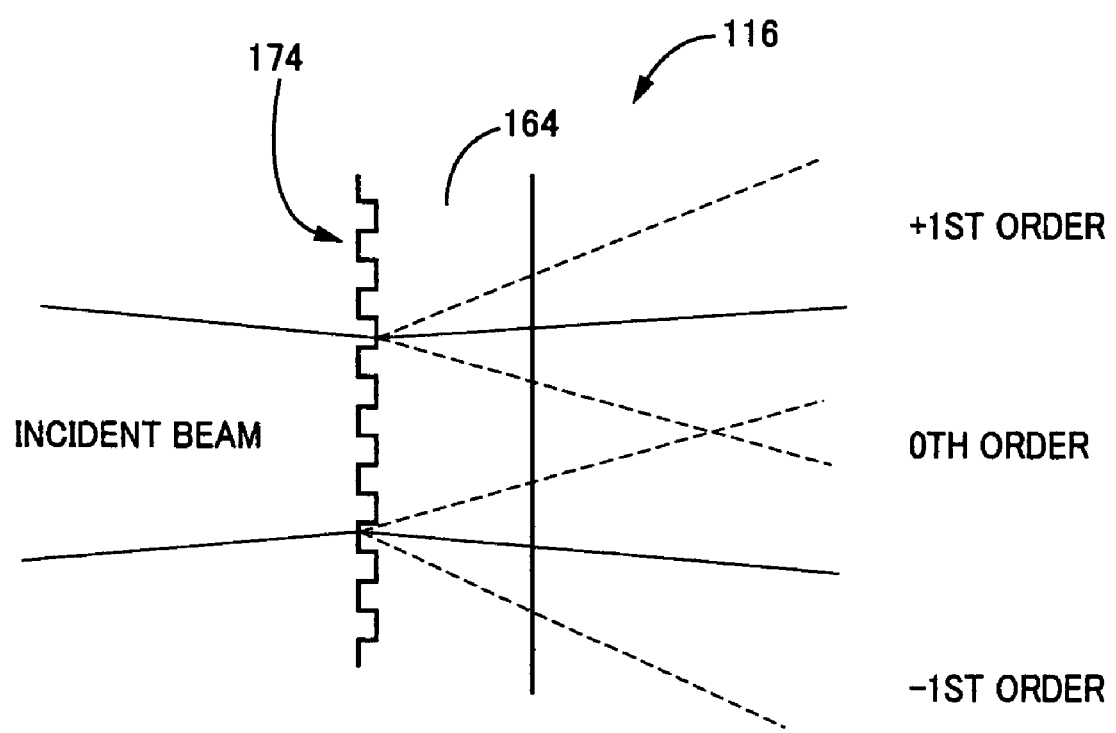
FIG. 19 is an optical path diagram for explanation of diffraction by a diffractive device depicted in FIG. 14.

As a result, in the present embodiment, when practiced, as illustrated in FIG. 19, an incident beam (in the form of one ray of light) on the diffractive device 116 is separated into a plurality of diffracted beams at least including a zeroth-order diffracted beam and positive and negative first-order diffracted beams.

The present embodiment, however, may be practiced in an alternative arrangement in which a regular or neutral position of the diffractive device 116 is set to a position a little offset from the intermediate image plane IP1 along the optical axis, and the diffractive device 116 is disposed at the regular position.

Even in this arrangement, as illustrated in FIG. 19, an incident beam on the diffractive device 116 is separated into a plurality of diffracted beams at least including a zeroth-order diffracted beam and positive and negative first-order diffracted beams.

Figure 20:
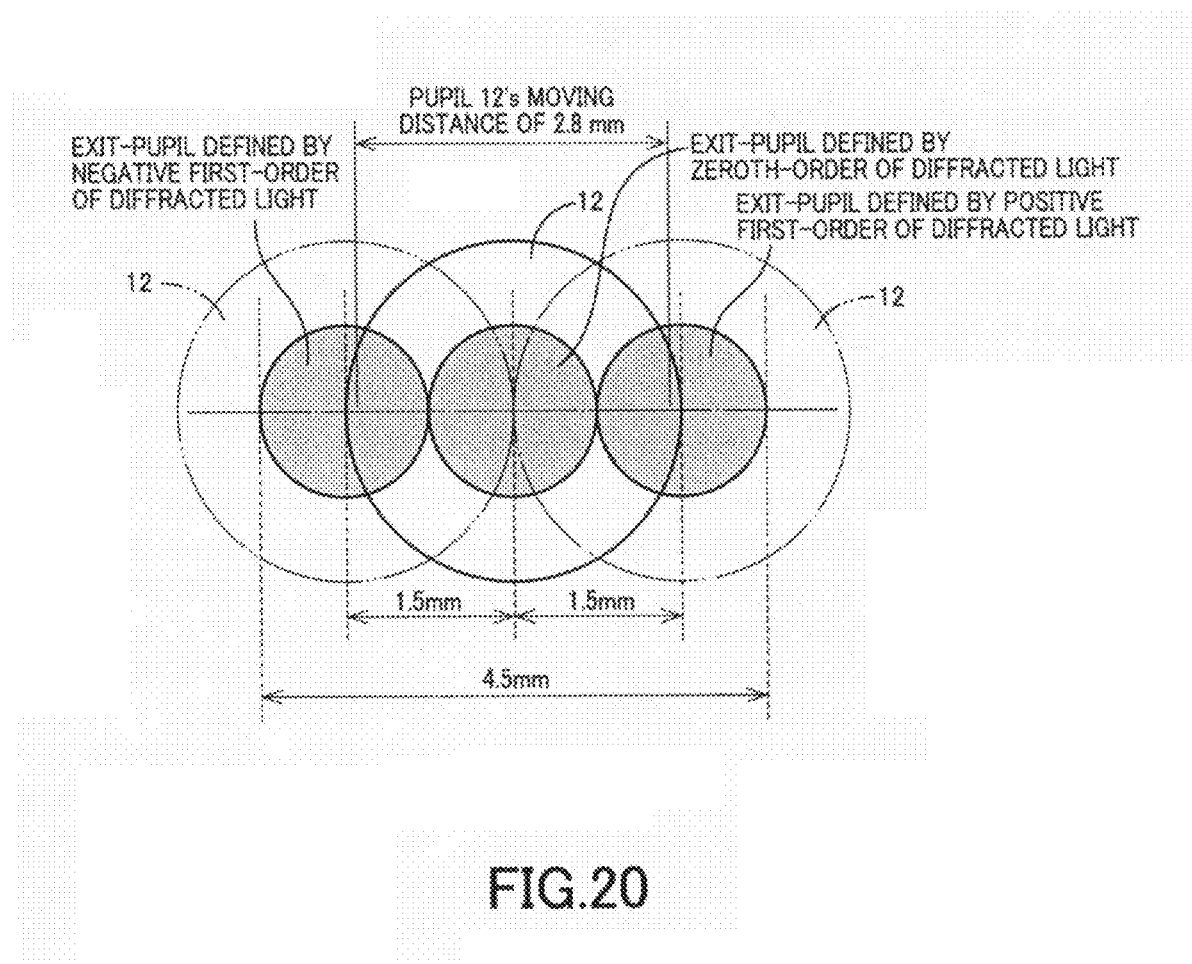
FIG. 20 is a front view for explanation of an exit pupil expanded by the diffractive device depicted in FIG. 19, in comparison with a viewer's eye pupil.

In FIG. 20, an entire exit pupil defined by this RSD is illustrated together with the viewer's eye pupil 12, in front view.

In FIG. 20, a rectilinear array of three positions of the eye pupil 12 are concurrently illustrated for better understanding of how the eye pupil 12 reciprocally moves with rotational movement of the eyeball of the eye 10.

In FIG. 20, a neutral one of the three positions of the eye pupil 12 is illustrated in solid line, while the remaining two extreme positions are each illustrated in phantom line.

The eye pupil 12 has an average or typical diameter of about 3 mm, and has a moving distance of about 2.8 mm.

In FIG. 20, a rectilinear array of three exit pupils is illustrated, with each exit pupil being depicted by a round hatched and encircled in solid line. This illustration is for better understanding of the fact that one ray of light traveling along a centerline of the range over which a light beam is scanned is separated into a zeroth-order diffracted beam and positive and negative first-order diffracted beams, and that the three diffracted beams define the three exit pupils, respectively. Each exit pupil has a diameter of about 1.5 mm.

In addition, in the present embodiment, the three exit pupils are rectilinearly arrayed with a pitch generally equal in length to the diameter of each exit pupil. That is to say, the three exit pupils are rectilinearly arrayed without gap or overlap therebetween, resulting in the three exit pupils having a cumulative or overall length of about 4.5 mm.

Therefore, in the present embodiment, the entire or collective exit pupil is expanded relative to that when there is no diffractive device 116 used. More specifically, the length of the entire exit pupil measured in a moving direction of the eye pupil 12 becomes about three times that of the original or conventional exit pupil, like that the entire length increases from about 1.5 mm to about 4.5 mm.

When the viewer moves the eye pupil 12 from the neutral position in a direction opposite to a direction in which a laser beam is scanned, a strong tendency is offered that the eye pupil 12 loses alignment with the center of the entire exit pupil.

However, the relative geometry between the eye pupil 12 and the entire exit pupil described above can reduce or eliminate a possibility that the eye pupil 12 can lose alignment with the entire exit pupil completely, even in the presence of the aforementioned strong tendency, resulting in the stabilized performance of image displaying.

In this RSD, as described above, the depth position of a display image is capable of being adjusted through modulation of the curvature of wavefront of a laser beam. For this reason, the intermediate image plane IP1 illustrated in FIG. 6 is not fixed in position, and rather, changes with a variable curvature of wavefront, that is to say, a variable depth position of a display image.

Accordingly, the diffractive device 116, when used at a fixed position nevertheless, can be deviated from the intermediate image plane IP1 while an image is being displayed.

When the diffractive device 116 is coincident in position with the intermediate image plane IP1, incident light on the diffractive device 116 is conceptualized as only one ray of light entering the diffractive device 116 at a single position, at each instant of time during the scanning of a laser beam.

In contrast, when the diffractive device 116 is remote from the intermediate image plane IP1, incident light on the diffractive device 116 is conceptualized as multiple rays of light entering the diffractive device 116 at positions spatially varying in the grating direction, at each instant of time during the scanning of a laser beam.

In this instance, a diffracted beam is generated at the diffractive device 116 on a per-ray-of-light basis, resulting in the unexpected generation of multiple diffracted beams and therefore multiple display-images.

For preventing such drawbacks, in the present embodiment, as illustrated in FIG. 17, the diffractive device 116 is configured so as to be disposed movably between the first-stage lens group 112 the last-stage lens group 114 of the first relay optical system 110, along the optical path.

The diffractive device 116 is attached to a housing 400 (stationary member) of the RSD by way of a mechanical displacement mechanism 402.

This mechanical displacement mechanism 402 is configured to mechanically operate in response to a user manipulation, to thereby cause the diffractive device 116 to move between the first-stage lens group 112 the last-stage lens group 114 along the optical path.

More specifically, this mechanical displacement mechanism 402 includes therein: a user-operable part 410 (e.g., a rotary handle) to be operated by the user; a stationary part 412 fixedly secured to the housing 400; and a rectilinearly movable part 414 which is supported rectilinearly movable relative to the stationary part 412.

This mechanical displacement mechanism 402 further includes therein: a rotary part 420 which is rotated by the user-operable part 410; and a motion converting mechanism 422 operable to convert rotational motion of the rotary part 420 into rectilinear motion of the rectilinearly movable part 414.

The motion converting mechanism 422 may be in the form of, for example, a screw mechanism having a female screw of the rectilinearly movable part 414 and a male screw of the rotary part 420 in screwed engagement with each other.

In addition, this mechanical displacement mechanism 402 may be of a design in common in structure to a conventional displacement mechanism employed in a well known micrometer.

Due to the above configuration, this mechanical displacement mechanism 402 allows the user to displace the diffractive device 116 in a desired direction by a desired amount, eventually allowing the user to move the diffractive device 116 so as to follow movement of the intermediate image plane IP1.

In FIG. 17, the diffractive device 116 and the mechanical displacement mechanism 402 are illustrated, with a laser beam in the form of parallel light entering the horizontal scanning system 100, that is to say, having a wavefront curvature q of zero.

In contrast, in FIG. 18, the diffractive device 116 and the mechanical displacement mechanism 402 are illustrated, with a laser beam in the form of diverging light entering the horizontal scanning system 100, that is to say, having a wavefront curvature q of a value greater than zero and equal to the reciprocal of the depth value L.

As will be evident from the above explanation, in the present embodiment, a manual operation of the mechanical displacement mechanism 402 by the user for position adjustment of the diffractive device 116 can prevent a display image from being multiplexed due to modulation of the wavefront-curvature q.

In the present embodiment, as described above, the wavefront curvature q is modulated for the goal of adjusting a depth position of a display image. The depth-position adjustment is in common to diopter adjustment for applying a correction to the optical system in the RSD, so as to match with a viewer's vision, in that a display image is adjusted in terms of its focus position.

Therefore, the present invention may be practiced in an alternative arrangement in which the wavefront curvature q is modulated for the goal of the dioper adjustment, instead of or in addition to the goal of depth-position adjustment.

Figure 21:
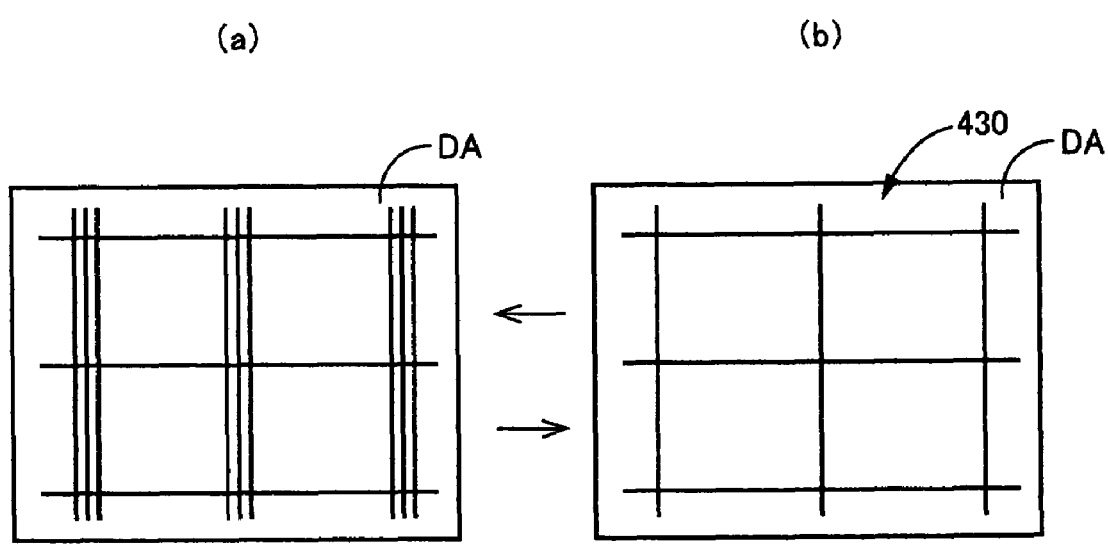
FIG. 21(a) is a front view illustrating a test pattern previously stored in a ROM depicted in FIG. 15 and displayed in a display region DA before completion of position adjustment for the diffractive device depicted in FIG. 14.
FIG. 21(b) is a front view illustrating the same test pattern displayed after completion of the position adjustment.

As illustrated in FIG. 21, in the present embodiment, a test pattern 430 as a support picture is displayed onto the retina 14, for supporting a user work to adjust the position of the diffractive device 116.

Figure 22:
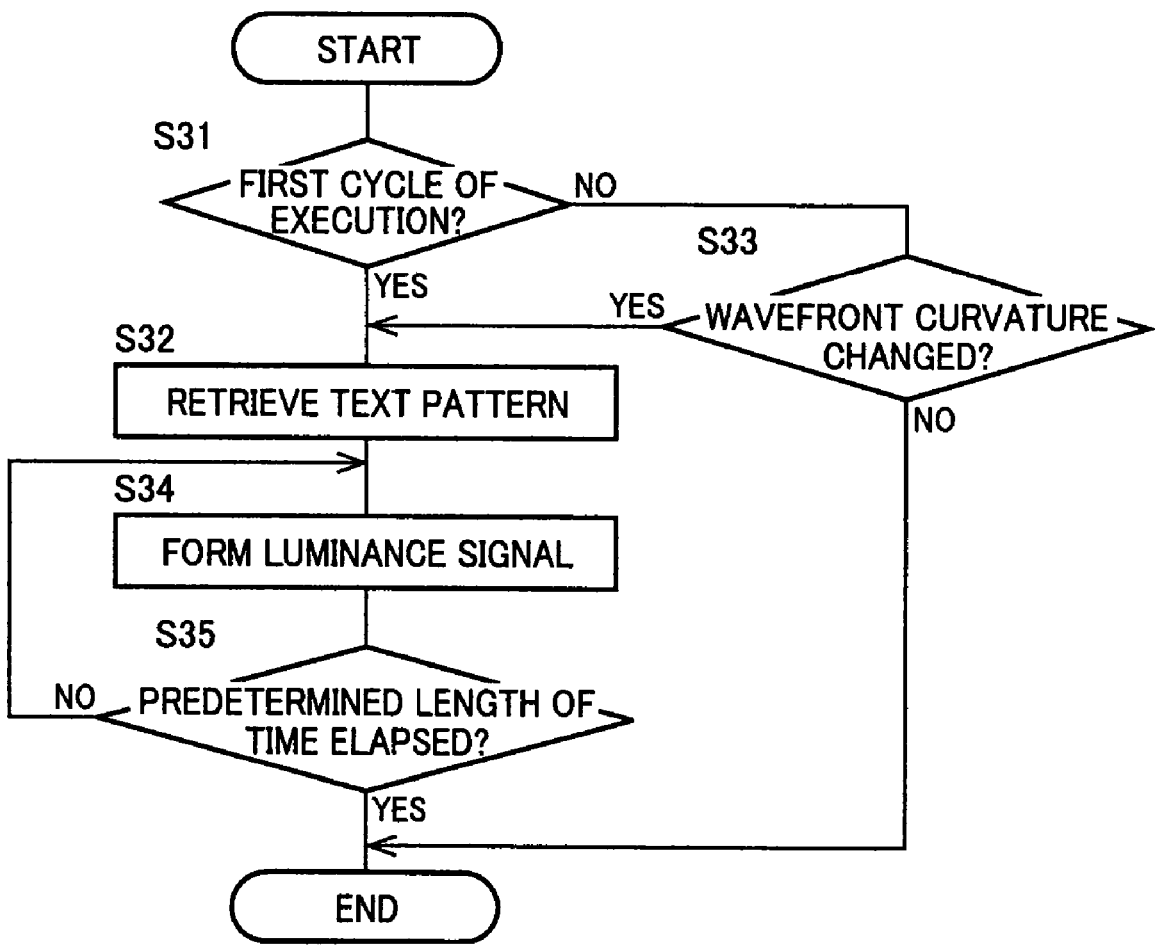
FIG. 22 is a flow chart conceptually illustrating a test pattern display program executed by a computer depicted in FIG. 15.

In FIG. 22, a test pattern display program which is executed by the computer 350 to display the test pattern 430 is illustrated conceptually in flow chart. This test pattern display program is repeatedly executed by the computer 350 while the computer 350 is being powered.

Each cycle of execution of this test pattern display program starts with step S31 to make a determination as to whether or not a current cycle of execution is a first cycle time since the computer 350 was lastly powered on. If so, then the determination becomes "YES" and operations progress to step S32.

If, however, the current cycle of execution is not the first cycle time, then the determination of step S31 becomes "NO" and subsequently, at step S33, a determination is made as to whether or not the wavefront curvature q was changed after the text pattern 430 was displayed by the previous cycle of execution of this program for displaying a current image.

If the wavefront curvature q was changed, then the determination of step S33 becomes "YES" and operations progress to step S32, and otherwise the determination becomes "NO" and this cycle of execution of this test pattern display program is terminated immediately.

At step S32, a luminance signal is retrieved from the ROM 354 to display the test pattern 430. Subsequently, at step S34, the retrieved luminance signal is transformed or embedded into a luminance signal based on a video signal which has been externally supplied to the signal processing circuit 60. The transformed luminance signal, when played back, allows the test pattern 430 to be displayed in superimposed relation with a display image (i.e., a regular display-image).

Thereafter, at step S35, a determination is made as to whether or not a predetermined length of time has lapsed since the start-of-time of execution of step S34. If it is before the predetermined length of time has lapsed, then the determination of step S35 becomes "NO" and operations return to step S34, resulting in continued transformation of luminance signal.

If the predetermined length of time has lapsed, the determination of step S35 becomes "YES" and one cycle of execution of this test pattern display program is terminated immediately. As a result, the transformation of luminance signal and therefore the display of the test pattern 430 are terminated.

In FIG. 21, the test pattern 430 is illustrated as an example of a support picture displayed in a display region DA in which an image is to be displayed by this RSD. The support picture may be formed principally with line pictures or texts, for the goal of supporting the user in determining, with the naked eye, whether or not the image has been undesirably multiplexed.

The test pattern 430 is illustrated in FIG. 21(*a*) with a shape to be taken before the position adjustment of the diffractive device 116 has been successfully completed, that is to say, when an image is undesirably multiplexed, while the same test pattern 430 is illustrated in FIG. 21(*b*) with a shape to be taken after the position adjustment of the diffractive device 116 has been successfully completed, that is to say, when an image is not undesirably multiplexed.

The above-described support picture can be a picture at least including one straight line extending in a direction intersecting with respect to the grating direction (i.e., a horizontal direction in the present embodiment) of the diffractive device 116 (having a one-dimensional diffraction grating structure).

In the present embodiment, the test pattern 430 is formed, as illustrated in FIG. 21, as a picture including a plurality of horizontal straight lines and a plurality of vertical straight lines which intersect with each other.

In the present embodiment, more specifically, the diffractive device 116 is characterized to cause an incident laser beam thereon to be diffracted in one dimension. For this reason, as illustrated in FIG. 21(*a*), a case can exist where the test pattern 430 is multiplexed only in the grating direction of the diffractive device 116 (i.e., a horizontal direction in the present embodiment) during display.

In this case, the viewer is capable of adjusting the position of the diffraction grating 116 within a period allowing the test pattern 430 to be displayed, resulting in elimination of multiplex of a display image.

As will be evident from the above explanation, in the present embodiment, the three lasers 30, 32, and 34 together constitute an example of the "light source" set forth in each of the above modes (11) and (13), the wavefront-curvature modulating optical system 88 constitutes an example of the "wavefront-curvature modulator" set forth in the same mode, the horizontal scanning system 100 and the vertical scanning system 120 together constitute an example of the "scanner" set forth in the same mode, the last-stage lens group 144 constitutes an example of the "light exit" set forth in the same mode, the diffractive device 116 constitutes an example of the "pupil expanding element" set forth in the same mode, and the mechanical displacement mechanism 402 constitutes an example of the "position adjuster" set forth in the same mode.

Further, in the present embodiment, the test pattern 430 constitutes an example of the "support picture" set forth in the above mode (23), and a portion of the computer 350 which is assigned to execute the test pattern display program illustrated in FIG. 22 and a portion of the ROM 354 which has stored therein the test pattern 430 together constitute an example of the "support-image displaying section" set forth in the same mode.

SIXTH EMBODIMENT

Next, a sixth illustrative embodiment of the present invention will be described below.

The present embodiment is different from the fifth embodiment only with respect to the configuration of the diffractive device, and is common to the fifth embodiment with respect to the remaining elements.

Therefore, only the different elements of the present embodiment from those of the fifth embodiment will be described below in greater detail, while the common elements of the present embodiment to those of the fifth embodiment will be omitted in the description using the identical reference numerals or names for reference.

Figure 23:
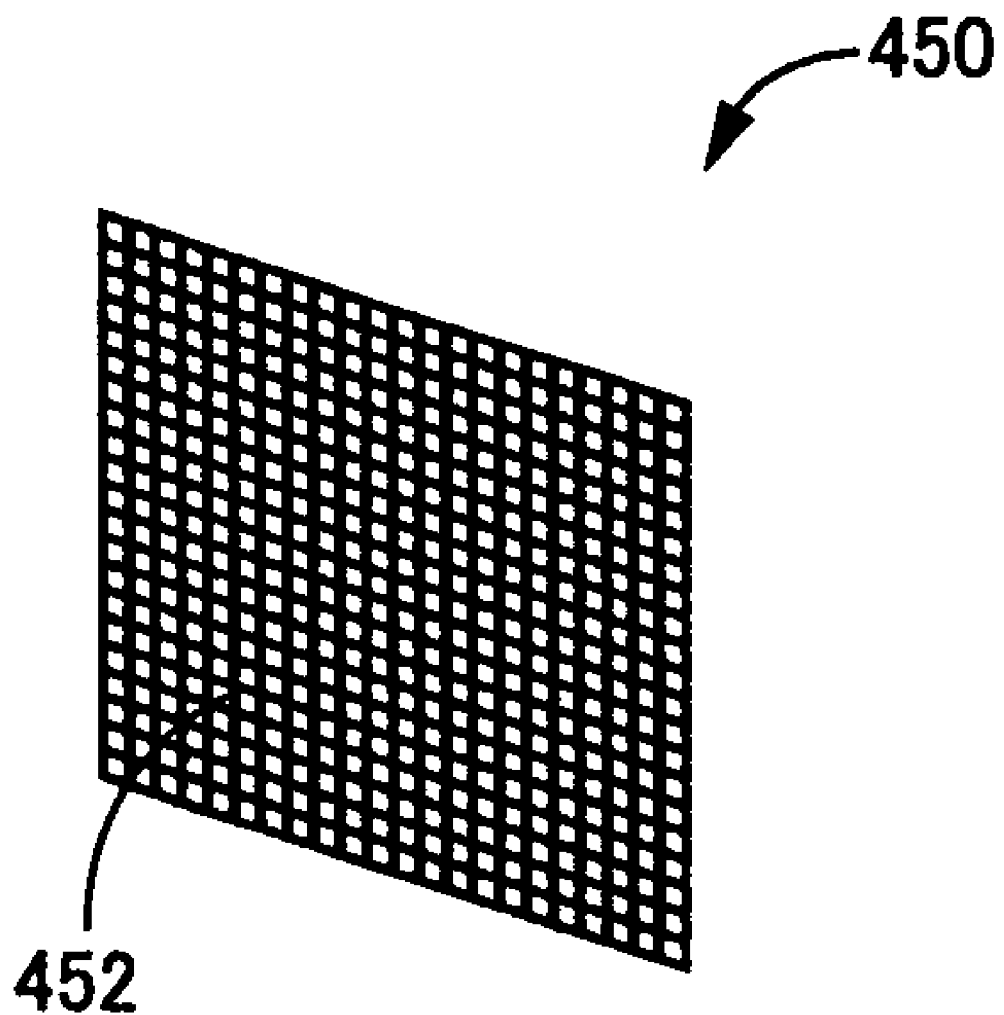
FIG. 23 is a perspective view illustrating one two-dimensional diffraction grating employed in a diffractive device included in a retinal scanning display device constructed according to a sixth illustrative embodiment of the present invention.

In the fifth embodiment, the diffractive device 116 is configured such that incident light thereon is diffracted only in one dimension. In contrast, in the present embodiment, as illustrated in FIG. 23, a diffractive device or element 450 is formed principally with a two-dimensional diffraction grating 452 operable to diffract incident light thereon in two dimensions.

The diffractive device 450 has a configuration which is so similar to that of the diffractive device 116 illustrated in FIG. 2, that it can be reached by replacement of the one-dimensional diffraction grating 164 of the diffractive device 116 with the two-dimensional diffraction grating 452.

Figure 24:
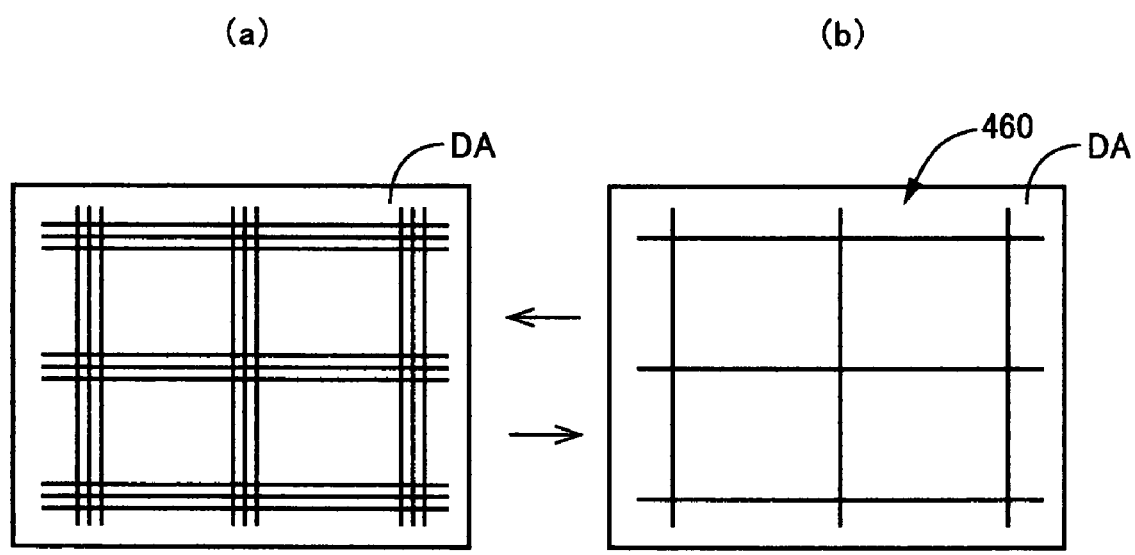
FIG. 24(a) is a front view illustrating a test pattern to be displayed for position adjustment for the diffractive device depicted in FIG. 23, the shape of which is taken before completion of the position adjustment.
FIG. 24(b) is a front view illustrating the same test pattern displayed after completion of the position adjustment.

In FIG. 24, a test pattern 460 is illustrated as an example of a support picture displayed in the display region DA in which an image is to be displayed by an RSD constructed according to the present embodiment.

The test pattern 460 is illustrated in FIG. 24(*a*) with a shape to be taken before the position adjustment of the diffractive device 450 has been successfully completed, that is to say, when an image is undesirably multiplexed, while the same test pattern 460 is illustrated in FIG. 24(*b*) with a shape to be taken,after the position adjustment of the diffractive device 450 has been successfully completed, that is to say, when an image is not undesirably multiplexed.

The above-described support picture can be a picture at least including one straight line extending in at least one direction (can be an oblique direction) intersecting with respect to two different grating directions (i.e., horizontal and vertical directions in the present embodiment) of the diffractive device 450.

In the present embodiment, more specifically, the test pattern 460 is defined, similarly with the test pattern 460 depicted in FIG. 21, as a picture including a plurality of horizontal straight lines and a plurality of vertical straight lines which intersect with each other.

In the present embodiment, the diffractive device 450 is characterized to cause an incident laser beam thereon to be diffracted in two dimensions. For this reason, as illustrated in FIG. 24(*a*), a case can exist where the test pattern 460 is multiplexed in the grating directions of the diffractive device 450 (i.e., both horizontal and vertical directions in the present embodiment) during display.

As will be evident from the above explanation, in the present embodiment, the test pattern 460 constitutes an example of the "support picture" set forth in the above mode (23), and a portion of the computer 350 which is assigned to execute the test pattern display program illustrated in FIG. 22 and a portion of the ROM 354 which has stored therein the test pattern 460 together constitute an example of the "support-image displaying section" set forth in the same mode.

SEVENTH EMBODIMENT

Next, a seventh illustrative embodiment of the present invention will be described below.

The present embodiment is different from the fifth embodiment only with respect to the configuration of the position adjustment mechanism for the diffractive device, and is common to the fifth embodiment with respect to the remaining elements.

Therefore, only the different elements of the present embodiment from those of the fifth embodiment will be described below in greater detail, while the common elements of the present embodiment to those of the fifth embodiment will be omitted in the description using the identical reference numerals or names for reference.

In the present embodiment, the user-operable device 348 illustrated in FIG. 15 is configured to include a user-operable part 470 which is operated by the user for adjusting the wavefront curvature q for the purpose of eliminating defocus of a display image (i.e., diopter adjustment). An exemplary version of the user-operable part 470 is a dial switch allowing the user to specify a continuous set-value, although not shown.

This user-operable part 470 allows the user to enter an adjustment amount Δq of the wavefront curvature q into the computer 350, through the user manipulation to the user-operable part 470.

Figure 25:
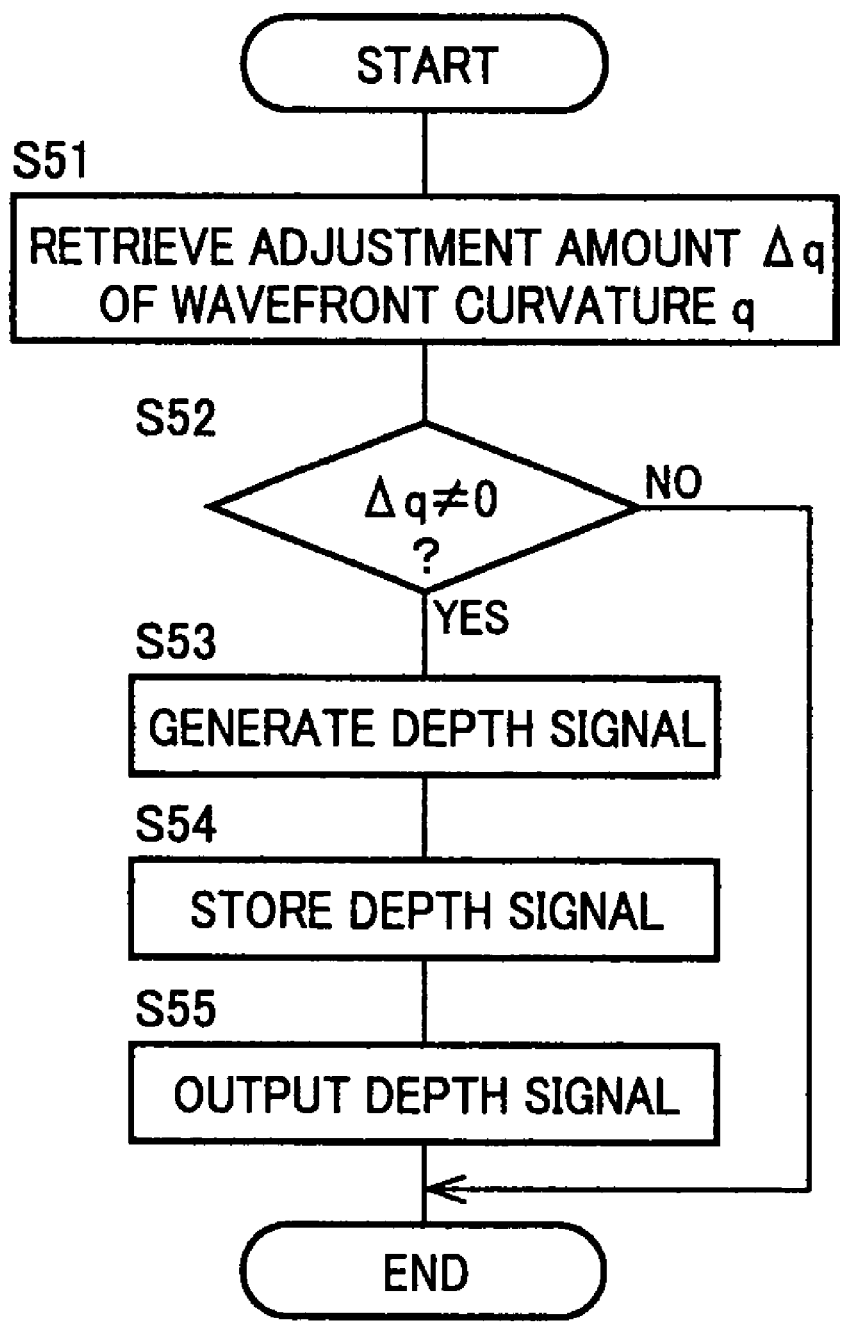
FIG. 25 is a flow chart conceptually illustrating a wavefront curvature adjustment program executed by a computer included in a retinal scanning display device constructed according to a seventh illustrative embodiment of the present invention.

In the ROM 354, there has been stored therein, in addition to the various programs used in the fifth embodiment, a wavefront curvature control program which is conceptually illustrated in flow chart in FIG. 25. This wavefront curvature control program is repeatedly executed by the computer 350 while the computer 350 is being powered.

Each cycle of execution of this wavefront curvature control program starts with step S51 to monitor the status of the user-operable part 470, thereby retrieving a user-issued command indicative of an adjustment amount Δq of the wavefront curvature q.

Next, at step S52, a determination is made as to whether or not the retrieved adjustment amount Δq is equal to non-zero, that is to say, whether or not the user has issued a command for adjusting the wavefront curvature q.

If the adjustment amount Δq is equal to zero, then the determination of step S52 becomes "NO" and this wavefront curvature control program is terminated immediately. If, however, the adjustment amount Δq is not equal to zero, then the determination of step S52 becomes "YES" and operations progress to step S53.

At step S53, the above-mentioned depth signal is generated (or updated) so as to reflect the adjustment amount Δq. Subsequently, at step S54, the generated depth signal is stored in the RAM 355. Thereafter, at step S55, the generated depth signal is output to the depth signal converting circuit 358. As a result, the wavefront curvature q is modulated according to the user manipulation to the user-operable part 470, thereby eliminating defocus of a display image.

Then, one cycle of execution of this wavefront curvature control program is terminated.

Once the wavefront curvature q has been modulated as a result of the execution of this wavefront curvature control program, the determination of step S33 in the test pattern display program illustrated in FIG. 22 becomes "YES," resulting in the display of the test pattern 430.

As will be evident from the above explanation, in the present embodiment, the test pattern 430 is displayed not only when there is a need of supporting a user work to adjust the position of the diffractive device 116 for the goal of eliminating multiplex of a display image, but also when there is a need of supporting a user work to adjust the wavefront curvature q for the goal of eliminating defocus of a display image (i.e., the dioper adjustment) through the wavefront-curvature modulating optical system 88.

As a result, in the present embodiment, there is required only one support-picture for supporting both a user work for eliminating spatial multiplex of a display image, and a user work to eliminate defocus of the display image.

Additionally, in the present embodiment, because of only one support-picture being used as a whole, the user is capable of conducting the above-mentioned two different user works without interruption while the same support-picture is being displayed, without requiring the user to conduct those two different user works separately with time.

Therefore, in the present embodiment, enhancement is achieved of individual efficiency of each of a user work for eliminating spatial multiplex of a display image and a user work for eliminating defocus of the display image, relative to the individual efficiency when there is no support image used, and additional enhancement is achieved of global efficiency of two user works, relative to the global efficiency when there are unique support-images used for those two user works, respectively.

As will be evident from the above explanation, in the present embodiment, a portion of the computer 350 which is assigned to execute the test pattern display program illustrated in FIG. 22 and a portion of the ROM 354 which has stored therein the test pattern 430 together constitute an example of the "support-image displaying section" set forth in the above mode (23).

Further, in the present embodiment, both the user-operable part 470 and a portion of the computer 350 which is assigned to execute the wavefront curvature control program illustrated in FIG. 15 together constitute an example of the "focus adjuster" set forth in the above mode (24), and the test pattern 430 constitutes an example of "support picture" set forth in the same mode.

EIGHTH EMBODIMENT

Next, an eighth illustrative embodiment of the present invention will be described below.

The present embodiment is different from the fifth embodiment only with respect to how to displace the diffractive device, and is common to the fifth embodiment with respect to the remaining elements.

Therefore, only the different elements of the present embodiment from those of the fifth embodiment will be described below in greater detail, while the common elements of the present embodiment to those of the fifth embodiment will be omitted in the description using the identical reference numerals or names for reference.

In the fifth embodiment, the diffractive device 116 is displaced manually by the user through the mechanical displacement mechanism 402. In contrast, in the present embodiment, the diffractive device 116 is displaced electrically, so as to automatically follow movement of the intermediate image plane IP1, based on the above-mentioned depth signal.

Figure 26:
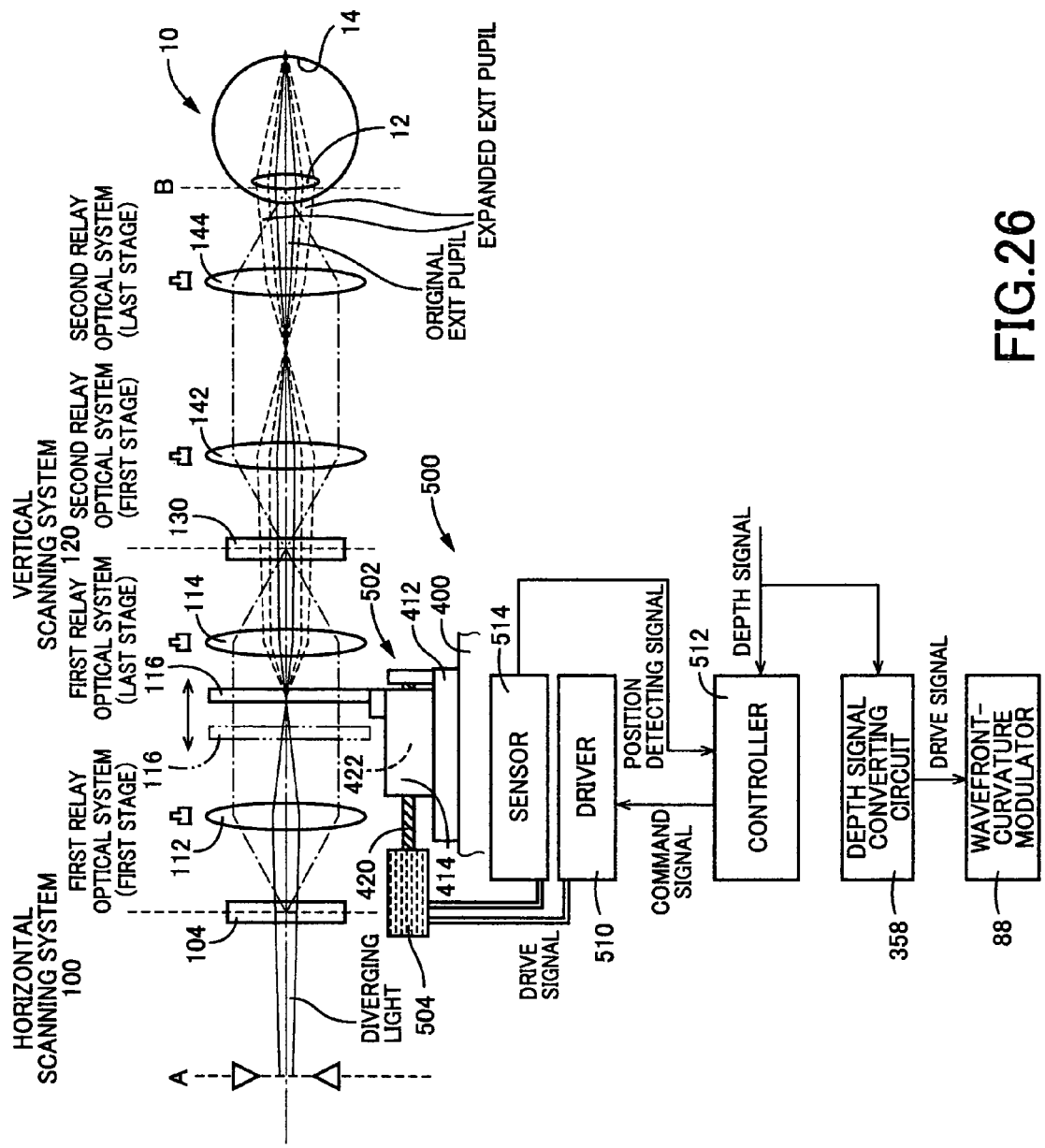
FIG. 26 is an optical path diagram illustrating a major part of an optical path defined in a retinal scanning display device constructed according to an eighth illustrative embodiment of the present invention, with incoming light having a wavefront curvature q of non-zero, for explanation of a major part of an optical configuration of the retinal scanning display device together with an electrical displacement mechanism.

In FIG. 26, a major part of the optical path defined in an RSD constructed according to the present embodiment is illustrated in an abbreviated manner for the illustrative purposes, similarly with FIGS. 17 and 18. In the present embodiment, the diffractive device 116 is attached to the housing 400 of this RSD via an electrical displacement device 500.

The electrical displacement device 500 is configured to include a motion converter 502 having a common structure to the mechanical displacement mechanism 402, and an actuator 504. The motion converter 502 is configured to convert a mechanical motion output from the actuator 504, into a rectilinear motion of the rectilinearly movable part 414, that is to say, a rectilinear motion of the diffractive device 116. More specifically, the actuator 504 is a motor for rotating the rotary part 420.

The electrical displacement device 500 further includes a driver 510 for outputting a drive signal to the actuator 504 for driving, a controller 512 outputting a command signal to the driver 510, and a sensor 514.

The sensor 514 is adapted to detect output (e.g., a current value, a voltage value, a displacement, etc.) of the actuator 504 as a physical quantity which indicates an actual position of the diffractive device 116, and output to the controller 512 a position sensing signal indicative of the result of the detection.

The controller 512 is adapted to generate a command signal for suitable use in feedback control of the actuator 504, based on both the depth signal output also to the wavefront-curvature modulating optical system 88, and the position sensing signal input from the sensor 514.

Figure 27:
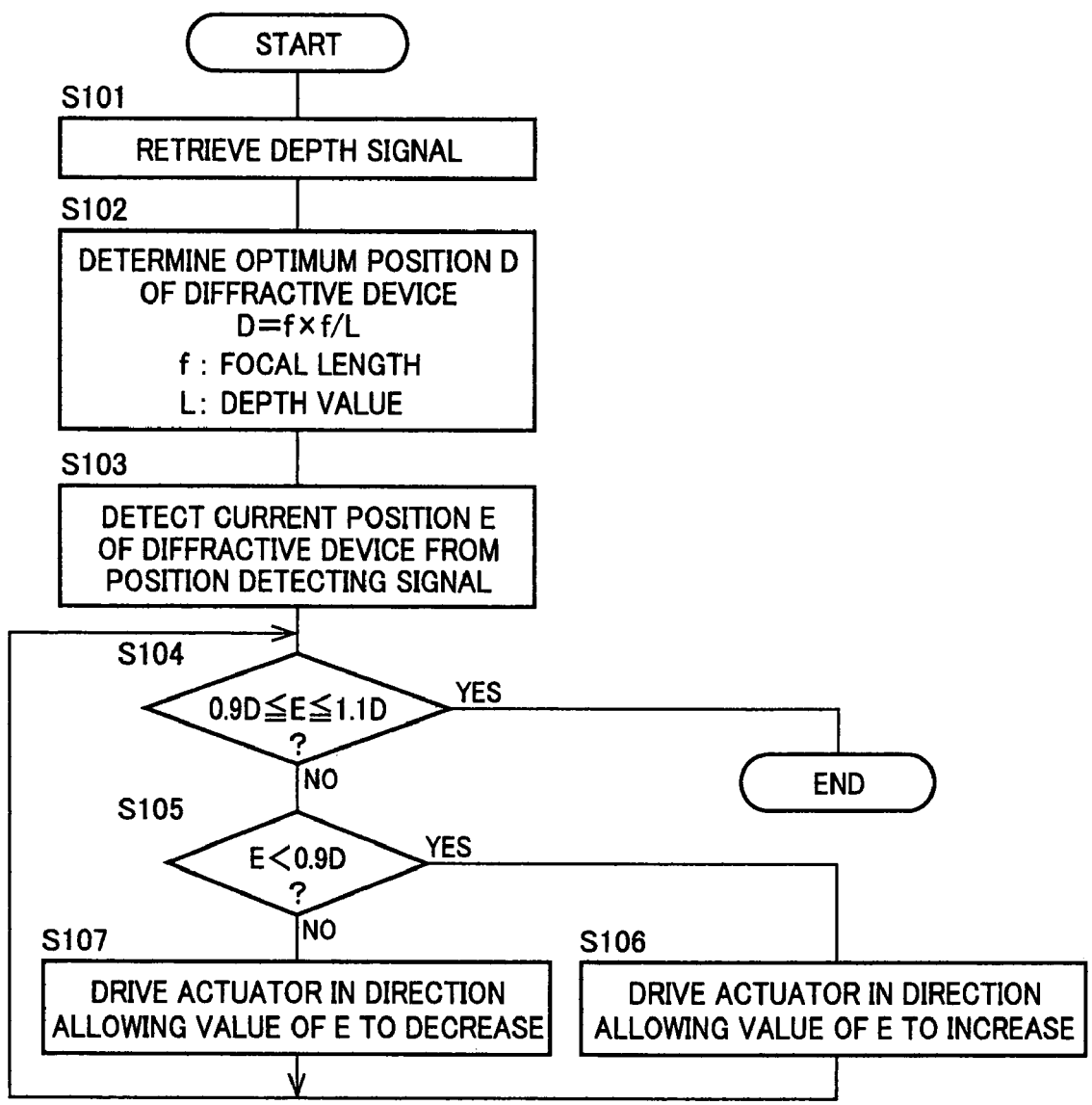
FIG. 27 is a flow chart conceptually illustrating a diffractive-device displacement control program executed by a computer included in the retinal scanning display device depicted in FIG. 26.

The controller 152 is comprised of a portion of the computer 350 which is assigned to execute a diffractive-device displacement control program conceptually illustrated in FIG. 27 in flow chart. The diffractive-device displacement control program has been stored in the ROM 354 together with the various programs used in the fifth embodiment.

This diffractive-device displacement control program is repeatedly executed by the computer 350 while the computer 350 is being powered, as well. Each cycle of execution of this diffractive-device displacement control program starts with step S101 to retrieve a newest depth signal from the RAM 355. This depth signal is in the form of, for example, a signal indicative of a depth value in common to a plurality of pixels making up each of a successive frames of an image, on a per-frame basis.

Next, at step S102, an optimum position D of the diffractive device 116 is calculated. A variable position of the diffractive device 116 is defined as a value which takes zero when a viewer-perceived display-image is at infinity, and which gradually increases as the viewer-perceived display-image moves toward the position of the viewer.

By this definition, a calculational position of the diffractive device 116 indicates a distance of an actual position of the diffractive device 116 from a theoretical position of the intermediate image plane IP1 which is taken when a laser beam is incident on the first-stage lens group 112 of the first relay optical system 110 as parallel light (i.e., when the wavefront curvature q=0).

The optimum position D is determined based on a depth value L represented by the retrieved depth signal. The depth value L is defined to mean a distance between the position of the viewer's eye 10 and the position of a viewer-perceived display-image (as a virtual image).

The optimum position D is determined as, for example, a value which increases as a function of the reciprocal of the depth value L.

More specifically, the optimum position D is calculated by entering the depth value L and a known focal length f of the first-stage lens group 112 into the following exemplary equation:

$$D = f \times f / L.$$

In this regard, the optimum position D, which is defined so as to take zero when the depth value L indicates optical infinity, changes as the depth value L decreases.

Subsequently, at step S103, a current position E of the diffractive device 116 is detected based on the position sensing signal supplied from the sensor 514.

Thereafter, at step S104, a determination is made as to whether or not the detected current position E falls within an allowable range defined relative to the optimum position D. More specifically, for example, a determination is made as to whether or not a value indicative of the detected current position E falls within a range from a lower limit. (=0.9×D) and an upper limit (=1.1×D).

If the current position E falls within the allowable range, then the determination of step S104 becomes "YES" and one cycle of execution of this diffractive-device displacement control program is terminated immediately. If, however, the current position E does not fall within the allowable range, then the determination of step S104 becomes "NO" and operations progress to step S105.

At step S105, a determination is made as to whether or not a value indicative of the detected current position E is lower than the lower limit (=0.9×D) of the allowable range. If so, then the determination becomes "YES" and subsequently, at step S106, a command signal is generated to drive the actuator 504 in a direction allowing the value indicative of the current position E to increase (i.e., a direction allowing the diffractive device 116 to move toward the viewer). The generated command signal is output to the driver 510.

If, however, the value indicative of the detected current position E is higher than the upper limit (=1.1×D) of the allowable range, then the determination of step S105 becomes "NO" and subsequently, at step S107, a command signal is generated to drive the actuator 504 in a direction allowing the value indicative of the current position E to decrease (i.e., a direction allowing the diffractive device 116 to move away from the viewer). The generated command signal is output to the driver 510.

In either case, thereafter, operations return to step S104. The implementation of steps S104-S107 is repeated until the determination of step S104 becomes "YES."

As a result, the current position E of the diffractive device 116 is automatically changed so as to follow a change in an actual position of the intermediate image plane IP1, thereby automatically preventing a display image from being undesirably multiplexed due to modulation of the wavefront curvature q in the presence of the diffractive device 116.

As will be apparent from the foregoing explanation, in the present embodiment, the electrical displacement device 500 constitutes an example of the "position adjuster" set forth in each of the above modes (11) and (13), the actuator 504 constitutes an example of the "actuator" in the above mode (15), and the drive signal constitutes an example of the "drive signal" set forth in each of the above modes (15), (17) and (18).

NINTH EMBODIMENT

Next, a ninth illustrative embodiment of the present invention will be described below.

The present embodiment is different from the eighth embodiment only with respect to how to displace the diffractive device, and is common to the fifth embodiment with respect to the remaining elements.

Therefore, only the different elements of the present embodiment from those of the eighth embodiment will be described below in greater detail, while the common elements of the present embodiment to those of the eighth embodiment will be omitted in the description using the identical reference numerals or names for reference.

In the present embodiment, similarly with the eighth embodiment, the diffractive device 116 is displaced electrically, so as to automatically follow movement of the intermediate image plane IP1, based on the above-mentioned depth signal.

In the present embodiment, however, differently from the eighth embodiment, a depth signal is formatted to indicate depth values of an image on a pixel-by-pixel basis. One pixel is an example of the aforementioned depth-controllable minimum sub-image.

In the present embodiment, further, the thus-formatted depth signal is supplied from the external to the signal processing circuit 60 as a portion of a video signal, as illustrated in FIG. 14. Based on the depth signal, an RSD constructed according to the present embodiment modulates the wavefront curvature of a laser beam on a pixel-by-pixel basis, to generate imaging light for entry into the viewer's eye 10.

Further, in the present embodiment, similarly with the eighth embodiment, a drive signal is generated based on the depth signal, and the actuator 504 is controlled based on the generated drive signal.

However, in the present embodiment, the actuator 504 is controlled on a frame-by-frame basis, based on the depth signal which indicates an image depth on a pixel-by-pixel basis, thereby controlling the position of the diffractive device 116. In this regard, each frame is larger in size than each pixel, and is an example of each one of the aforementioned actuator-controllable minimum sub-areas.

More specifically, the aforementioned drive signal is generated based on the pixel-by-pixel depth signal, so that the actuator 504 can be uniform in status over the same frame, and so that the diffractive device 116 can be unchanged in position over the same frame accordingly. The thus-generated drive signal is supplied to the actuator 504.

In other words, in the present embodiment, the wavefront curvature is modulated on a pixel-by-pixel basis, based on the depth signal indicating an image depth on a pixel-by-pixel basis, while the actuator 504, which operates to displace the diffractive device 116 so as to act as a pupil expanding element, is controlled on a frame-by-frame basis, based on the depth signal. Each frame is an image region larger in size than each pixel.

Figure 28:
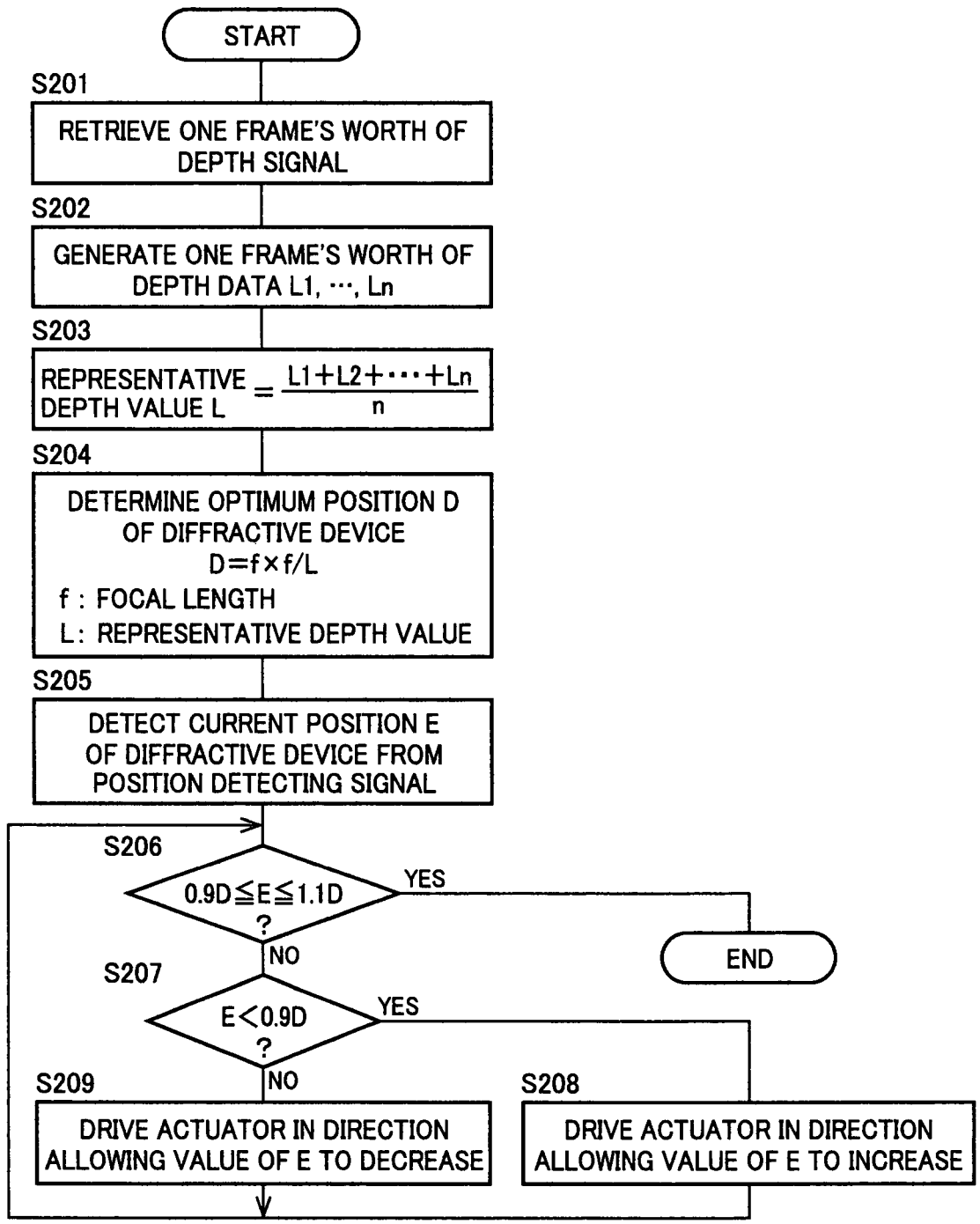
FIG. 28 is a flow chart conceptually illustrating a diffractive-device displacement control program executed by a computer included in a retinal scanning display device constructed according to a ninth illustrative embodiment of the present invention.

In FIG. 28, there is illustrated conceptually in flow chart the diffractive-device displacement control program executed by the controller 512 in the computer 350 in this RSD which is constructed in accordance with the present embodiment.

This diffractive-device displacement control program will be described below by referring to FIG. 28. However, this diffractive-device displacement control program has steps common to those in the diffractive-device displacement control program illustrated in FIG. 27, and therefore, the common steps will be described briefly, while only different steps will be described in greater detail.

The diffractive-device displacement control program illustrated in FIG. 28 is repeatedly executed on a frame-by-frame basis for an image. Each cycle of execution of this diffractive-device displacement control program starts with step S201 to retrieve a one-frame's worth of a depth signal from the external or a buffer (not shown) in the signal processing circuit 60.

Next, at step S202, based on the retrieved depth signal, a plurality of sets of depth data are generated which indicate a plurality of depth values Li which have been assigned to a plurality of pixels making up a current frame, respectively.

Subsequently, at step S203, there is calculated a representative depth value L of a plurality of individual depth values Li represented by the generated sets of depth data, respectively.

In the present embodiment, the representative depth value L is calculated as a simple mean value of the plurality of individual depth values Li of the plurality of pixels. More specifically, the representative depth value L is calculated by dividing the sum of the plurality of individual depth values Li, by the total number n (=total pixel number) of the individual depth values Li in one frame.

In an alternative, the representative depth value L may be calculated by weighting at least one of the plurality of pixels which is located on a central portion of one frame of an image more highly than pixels located at a peripheral portion of the same frame. In this regard, the centrally-located at least one pixel is more easily perceived by the viewer as to whether its image quality is good or bad, than other pixels on the same frame.

In this alternative, the representative depth value L may be calculated as a weighted mean value of the plurality of individual depth values Li. The weighted mean value may be calculated using weighting factors which increase as each position moves from the central portion toward the peripheral portion on an image.

In any case, thereafter, at step S204, the optimum position D of the diffractive device 116 is calculated by a calculation equation formulated similarly with that in step S102 depicted in FIG. 27, based on the calculated representative depth value L.

Subsequently, at step S205, similarly with step S103 depicted in FIG. 27, a current position E of the diffractive device 116 is detected based on the position sensing signal supplied from sensor 514.

Thereafter, at step S206, similarly with step S104 depicted in FIG. 27, a determination is made as to whether or not the detected current position E falls within the allowable range between the lower limit (=0.9×D) and the upper limit (=1.1×D).

If the current position E falls within the allowable range, then the determination of step S206 becomes "YES" and one cycle of execution of this diffractive-device displacement control program is terminated immediately. If, however, the current position E does not fall within the allowable range, then the determination of step S206 becomes "NO" and operations progress to step S207.

At step S207, similarly with step S105 depicted in FIG. 27, a determination is made as to whether or not a value indicative of the detected current position E is lower than the lower limit (=0.9×D) of the allowable range. If so, the determination becomes "YES" and subsequently, at step S208, similarly with step S106 depicted in FIG. 27, a command signal is generated to drive the actuator 504 in a direction allowing the value indicative of the current position E to increase (i.e., a direction allowing the diffractive device 116 to move toward the viewer). The generated command signal is output to the driver 510.

If, however, the value indicative of the detected current position E is higher than the upper limit (=1.1×D) of the allowable range, then the determination of step S207 becomes "NO" and subsequently, at step S209, similarly with step S107 depicted in FIG. 27, a command signal is generated to drive the actuator 504 in a direction allowing the value indicative of the current position E to decrease (i.e., a direction allowing the diffractive device 116 to move away from the viewer). The generated command signal is output to the driver 510.

In either case, thereafter, operations return to step S206. The implementation of steps S206-S209 is repeated until the determination of S206 becomes "YES."

As a result, the current position E of the diffractive device 116 is automatically changed so as to follow a change in an actual position of the intermediate image plane IP1, thereby automatically preventing a display image from being undesirably multiplexed due to modulation of the wavefront curvature q in the presence of the diffractive device 116.

As will be apparent from the foregoing explanation, in the present embodiment, the controller 512 constitutes an example of the "controller" set forth in the above mode (19), a portion of the controller 512 which is assigned to implement steps S201-S203 depicted in FIG. 28 constitutes an example of the "obtainer" set forth in each of the above modes (20) and (22), and a portion of the controller 512 which is assigned to implement steps S204-S209 depicted in FIG. 28 constitutes an example of the "generator" set forth in the above mode (20).

TENTH EMBODIMENT

Next, a tenth illustrative embodiment of the present invention will be described below.

The present embodiment is common to the fifth embodiment with respect to many elements. Therefore, only the different elements of the present embodiment from those of the fifth embodiment will be described below in greater detail, while the common elements of the present embodiment to those of the fifth embodiment will be omitted in the description using the identical reference numerals or names for reference.

An RSD constructed in accordance with the present embodiment is configured to include the signal processing circuit 60 illustrated in FIG. 15. The signal processing circuit 60 is configured to include the computer 350 incorporating the ROM 354 which has stored therein various programs beginning with the depth signal generation program illustrated in FIG. 16, for generation of a depth signal in response to a user action (indicative a user command or instruction).

As illustrated in FIG. 15, the signal processing circuit 60 is electrically connected to the depth signal converting circuit 358. The depth signal converting circuit 358 is adapted to convert the depth signal generated as a result of the execution of the depth signal generation program, into a drive signal, and output the drive signal to the wavefront-curvature modulating optical system 88.

Figure 29:
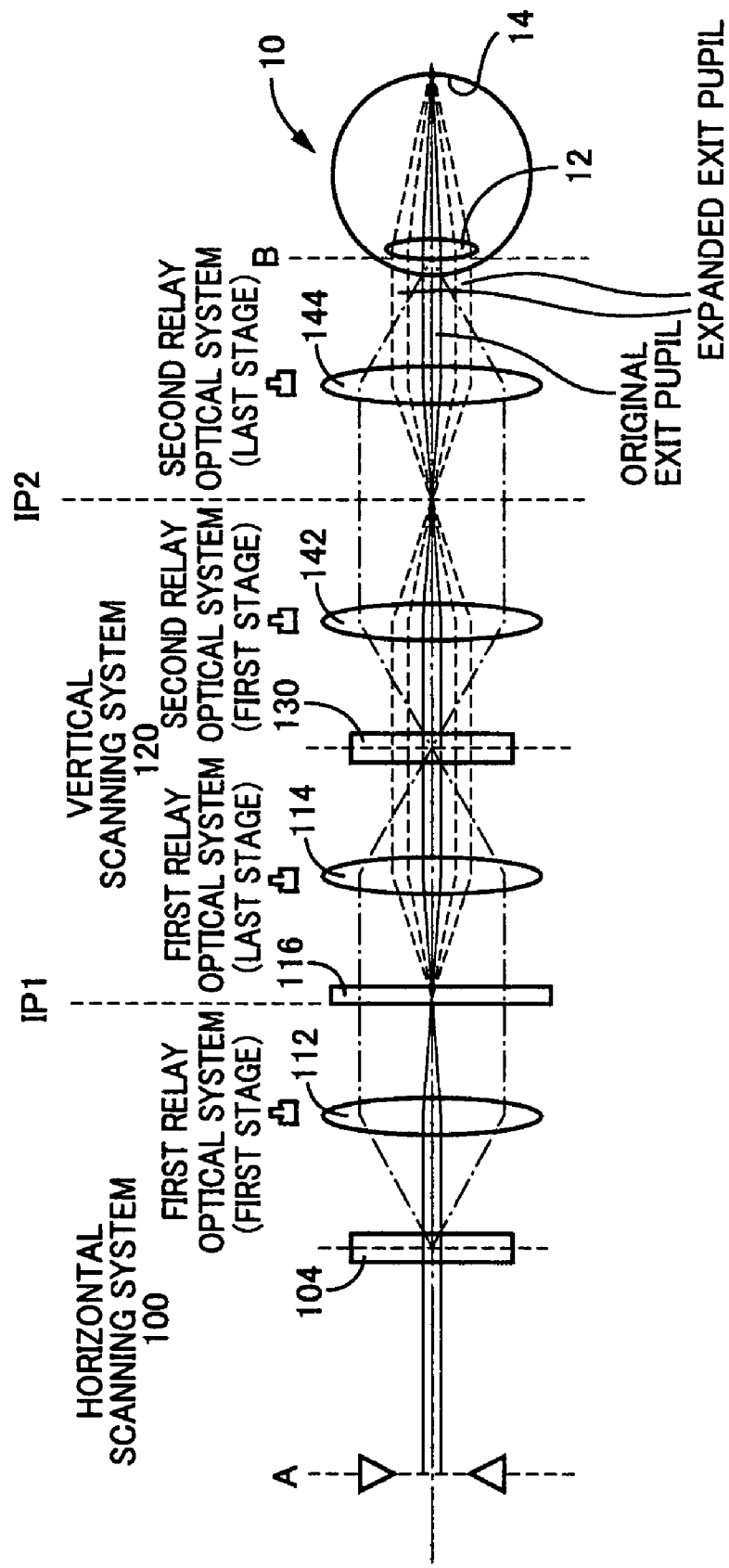
FIG. 29 is an optical path diagram illustrating a major part of an optical path defined in a retinal scanning display device constructed according to a tenth illustrative embodiment of the present invention, for explanation of a major part of an optical configuration of the retinal scanning display device.

As illustrated in FIG. 29, in the RSD constructed in accordance with the present embodiment, the first relay optical system 110 exists between the horizontal scanning system 100 and the vertical scanning system 120, and in this first relay optical system 110, the first-stage lens group 112 and the last-stage lens group 114 are arrayed along a common optical axis. Between the first-stage lens group 112 and the last-stage lens group 114, the intermediate image plane IP1 is to occur.

As illustrated in FIG. 29, in the present embodiment, the diffractive device 116 is disposed at a position coincident with the intermediate image plane IP1. As a result, once the present embodiment is implemented, as illustrated in FIG. 30, an incident beam on the diffractive device 116 is separated into a plurality of diffracted beams at least including a zeroth-order diffracted beam and positive and negative first-order diffracted beams.

The present embodiment, however, may be practiced in an alternative arrangement in which a regular position of the diffractive device 116 is set to a position a little offset from the intermediate image plane IP1 along the optical axis, and the diffractive device 116 is disposed at the regular position.

Figure 30:
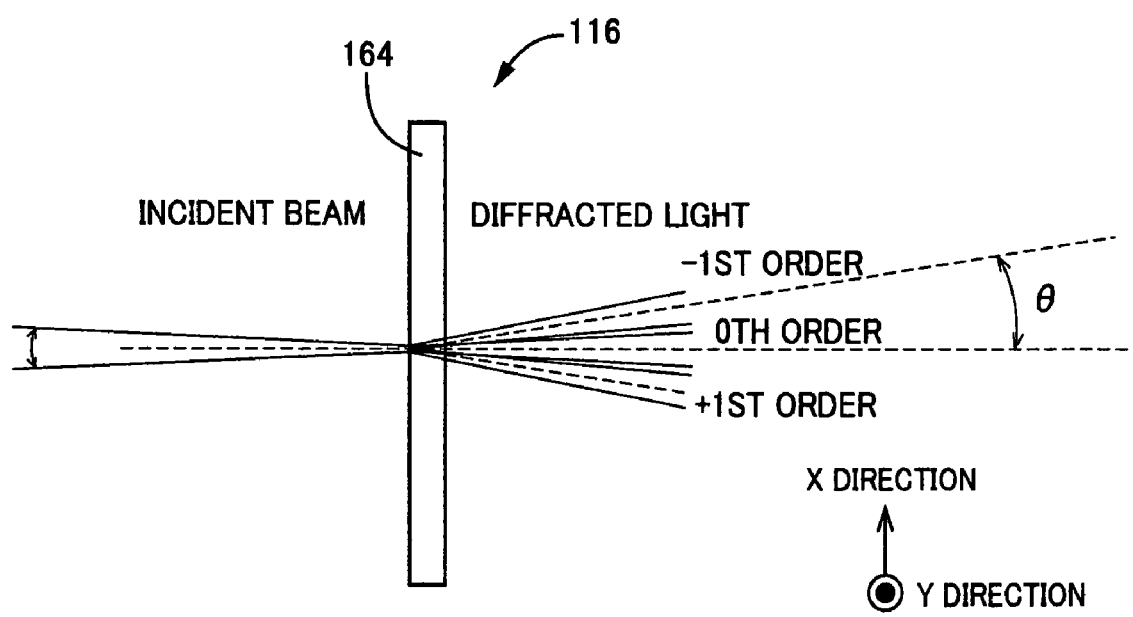
FIG. 30 is an optical path diagram for explanation of diffraction by a diffractive device depicted in FIG. 29.

Even in this arrangement, as illustrated in FIG. 30, an incident beam on the diffractive device 116 is separated into a plurality of diffracted beams at least including a zeroth-order diffracted beam and positive and negative first-order diffracted beams.

In the present embodiment, the diffractive device 116 is structured to cause an incident beam to be diffracted in one dimension (i.e., on a single plane), and its grating direction (i.e., the direction of orientation of the single plane) is selected as a horizontal direction.

As a result, a laser beam, upon entry into the diffractive device 116, is separated into a plurality of diffracted beams confined in a single horizontal plane. In FIG. 30, the "X-direction" equals to a horizontal direction, while the "Y-direction" equals to a vertical direction. Additionally, in FIG. 30, the "θ" denotes a diffraction angle.

Figure 31:
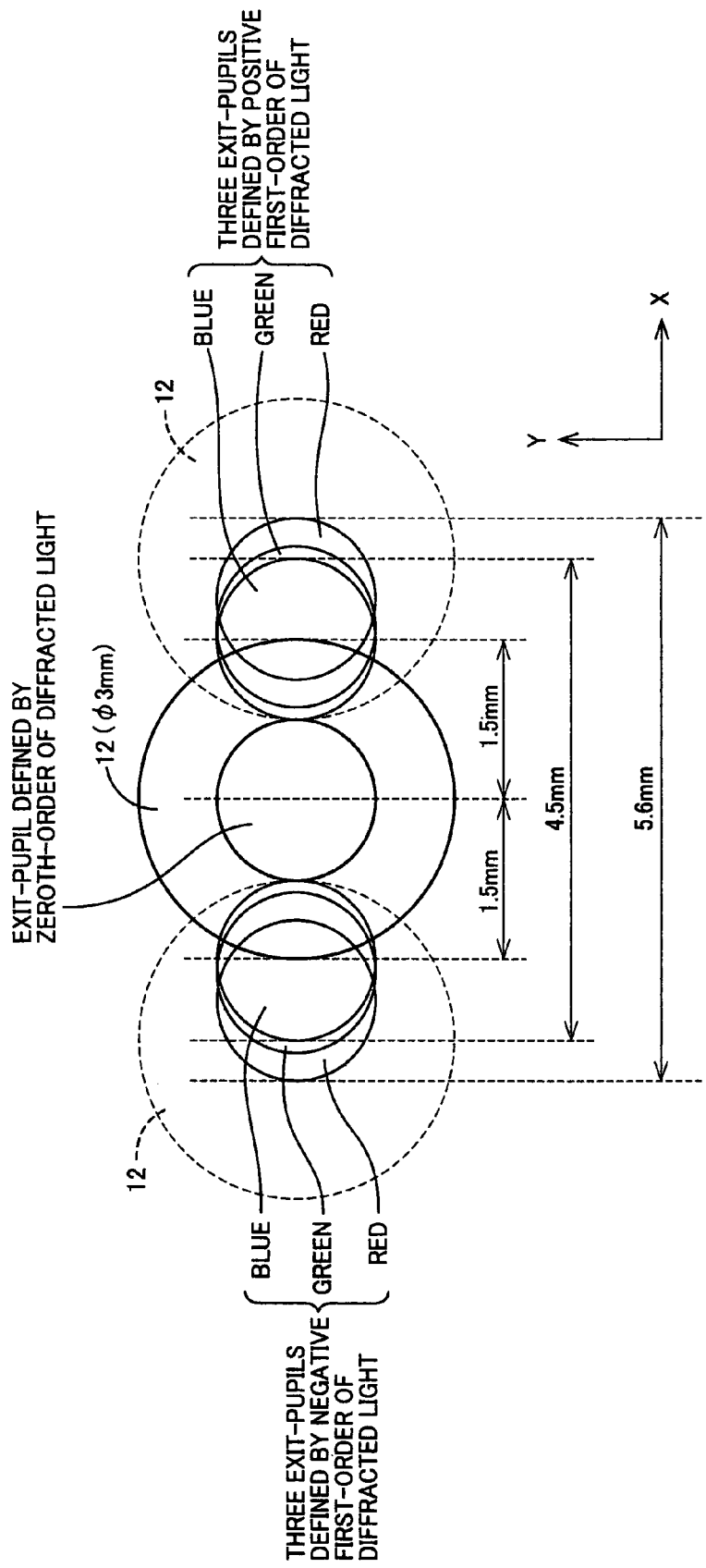
FIG. 31 is a front view for explanation of an exit pupil expanded by the diffractive device depicted in FIG. 30, in comparison with a viewer's eye pupil.

In FIG. 31, an entire exit pupil defined by this RSD is illustrated together with the eye pupil 12, in front view.

In FIG. 31, a rectilinear array of three positions of the eye pupil 12 are concurrently illustrated for better understanding of how the eye pupil 12 reciprocally moves with rotational movement of the eyeball of the eye 10.

In FIG. 31, a neutral one of the three positions of the eye pupil 12 is illustrated in solid line, while the remaining two extreme positions are each illustrated in broken line.

The eye pupil 12 has an average or typical diameter of about 3 mm, and has a moving distance of about 2.8 mm.

In the present embodiment, an incident beam on the diffractive device 116 is a composite light beam made up of a red-colored wavelength component, a green-colored wavelength component, and a blue-colored wavelength component. In other words, the incident beam has a plurality of different wavelengths.

In addition, the diffractive device 116 does not cause color aberrations due to a diffraction angle θ for a zeroth-order diffracted beam, but causes color aberrations for higher-order diffracted beams.

For this reason, a zeroth-order diffracted beam does not experience wave dispersion (angular dispersion), enabling the three colored wavelength components to define only one exit pupil, while higher-order diffracted beams experiences wave dispersion (angular dispersion), causing the three colored wavelength components to define three exit pupils, respectively.

In this regard, it can be considered that, in the case of a zeroth-order diffracted beam, a red-colored exit pupil, a green-colored exit pupil, and a blue-colored exit pupil are exactly superimposed with one another, enabling the viewer to perceive them as only one exit pupil.

In other words, the diffractive device 116 functions to cause the composite light beam incident thereon to be divided into a plurality of wavelength components, that is to say, red-, green- and blue-colored light beam components, and to generate a plurality of diffracted beams including a zeroth-order diffracted beam and at least one higher-order diffracted beam (inclusive of positive and negative higher-order diffracted beams), on a per-wavelength-component basis.

In light of the above findings, in FIG. 31, one exit pupil defined by a zeroth-order diffracted beam, three exit pupils defined by negative first-order diffracted beams, and three exit pupils defined by positive first-order diffracted beams are illustrated in the form of a rectilinear array of a plurality of circles each depicted in sold line.

This illustration is for better understanding both the fact that one ray of light traveling along a centerline of the range over which a light beam is scanned is separated into a single zeroth-order diffracted beam, three positive first-order diffracted beams having different diffraction angles, and three negative first-order diffracted beams having different diffraction angles, and the fact that the zeroth-order diffracted beam defines one exit pupil, while each of a group of positive first-order diffracted beams and a group of negative first-order diffracted beams defines three exit pupils. Each exit pupil has a diameter of about 1.5 mm.

As will be evident from the foregoing, three exit pupils defined by a set of higher-order diffracted beams having the same diffraction orders but having different wavelengths together constitute a set of red-, green- and blue-colored exit pupils.

Among each set of exit pupils, the blue-colored exit pupil is closest to the exit pupil defined by the zeroth-order diffracted beam, while the red-colored exit pupil is farthest from the exit pupil defined by the zeroth-order diffracted beam.

In the present embodiment, the exit pupil defined by the zeroth-order diffracted beam, the exit pupil defined by a blue-colored component of the positive first-order diffracted light, and the exit pupil defined by a blue-colored component of the negative first-order diffracted light are rectilinearly arrayed with a pitch generally equal in length to the diameter of each exit pupil.

That is to say, these three exit pupils are rectilinearly arrayed without gap or overlap therebetween, resulting in the three exit pupils (i.e., centrally-disposed three exit pupils) having a cumulative or overall length of about 4.5 mm, and all the exit pupils (including the centrally-disposed three exit pupils) having a cumulative or overall length of about 5.6 mm.

Therefore, in the present embodiment, the entire or collective exit pupil is expanded relative to that when there is no diffractive device 116 used. More specifically, the length of the entire exit pupil measured in a moving direction of the eye pupil 12 becomes about 3.7 times that of the original or conventional exit pupil, like that the entire length increases from about 1.5 mm to about 5.6 mm.

When the viewer moves the eye pupil 12 from the neutral position in a direction opposite to a direction in which a laser beam is scanned, a strong tendency is offered that the eye pupil 12 loses alignment with the center of the entire exit pupil.

However, the relative geometry between the eye pupil 12 and the entire exit pupil described above can reduce or eliminate a possibility that the eye pupil 12 can lose alignment with the entire exit pupil completely, even in the presence of the aforementioned strong tendency, resulting in the stabilized performance of image displaying.

In general, a diffraction grating causes a composite light beam incident thereon to be divided into a plurality of wavelength components. Concurrently, the diffraction grating also causes optical power (expressed in Watt [W]) or energy of each wavelength component to be separated into a worth of a zeroth-order diffracted beam and a worth of a higher-order diffracted beam.

However, in the absence of any special feature applied to a conventional diffraction grating, there is inadequate coincidence between the wavelength components with respect to a separation ratio (i.e., an optical power ratio) in which optical power of each wavelength component is separated into a worth of zeroth-order diffracted light and a worth of higher-order diffracted light.

Similarly, the diffractive device 116 in this RSD causes a composite light beam incident thereon to be divided into three colored wavelength components.

If, however, this diffractive device 116 is constructed with a conventional diffraction grating without any modifications, then a possibility exists that there is inadequate coincidence between those three colored wavelength components with respect to a separation ratio in which optical power of each wavelength component is separated into a worth of a zeroth-order, a worth of a positive first-order, and a worth of a negative first-order.

The existence of inadequate coincidence between the three colored wavelength components with respect to the separation ratio means the existence of inadequate coincidence between the plurality of exit pupils with respect to a ratio or intensity balance (will be described below in more detail) between diffracted beams together making up of each wavelength component. Each diffracted beam results from a corresponding one of the wavelength components.

In this regard, each exit pupil is defined by a group of three colored diffracted beams having the same diffraction orders. However, these three colored diffracted beams originate from the three colored wavelength components, respectively. In addition, the above-mentioned ratio or intensity balance is defined for indicating the relationship between the three colored diffracted beams with respect to the luminance or intensity of each diffracted beam.

As a result, the existence of inadequate coincidence between the plurality of exit pupils with respect to the intensity balance means the existence of inadequate coincidence between the plurality of exit pupils with respect to the observed color (mixed color).

In addition, the viewer may possibly move the eye pupil 12 while viewing a display image, and if the eye pupil 12 moves, then there occurs movement of one of the plurality of exit pupils which the viewer is viewing for perceiving or appreciating the display image.

For these reasons, if the diffractive device 116 is constructed with a conventional diffraction grating without any modifications, then the viewer will suffer from undesirable perception of a display image with a color (should not be time-varying, inherently) varying with changes in position of the spontaneously-observed exit-pupil due to movement of the eye pupil 12.

To prevent such disadvantages, the diffractive device 116 in the present embodiment employs a unique structure. This structure is an equalizer for equalizing separation ratios between the three colored wavelength components. In this regard, each wavelength component is separated into a zeroth-order diffracted beam and higher-order diffracted beams at the diffractive device 116. The detailed structure of the equalizer will be described below.

In the present embodiment, previous selection is made from the three colored wavelength components, of one-colored reference wavelength-component, and two-colored target wavelength-components to be compared with the reference wavelength-component.

More specifically, the reference wavelength-component is a green-colored wavelength component (G component light beam), which is intermediate in wavelength in a range of the wavelengths of the three colored wavelength components. The two-colored target wavelength components are a red-colored wavelength component (R component light beam) and a blue-colored wavelength component (B component light beam).

This equalizer is structured, as will be described later on in still greater detail, to satisfy a condition that a deviation between each target-wavelength-component separation ratio and a reference-wavelength-component separation ratio is required to be less than a set-value.

In this regard, the reference wavelength-component (G component light beam) is separated, at the diffracted device 116, into a zeroth-order, a positive first-order and a negative first-order, in the above-mentioned reference-wavelength-component separation ratio. On the other hand, each target wavelength-component (each of R and B component light beams) is separated, at the diffracted device 116, into a zeroth-order, a positive first-order and a negative first-order, in the above-mentioned target-wavelength-component separation ratio.

General Definitions

The "reference-wavelength-component separation ratio," the "target-wavelength-component separation ratio" and the "deviation" are defined as follows:

(1) Reference-Wavelength-Component Separation Ratio

The reference-wavelength-component separation ratio is defined as a ratio A/B of an input-output ratio A to an input-output ratio B, for the reference wavelength-component.

In this regard, the input-output ratio A denotes a ratio of output optical power of at least one higher-order diffracted beam exiting the diffracted device 116, to optical power of incident light on the diffracted device 116. In addition, the input-output ratio B denotes a ratio of output optical power of a zeroth-order diffracted beam exiting the diffracted device 116, to optical power of incident light on the diffracted device 116.

(2) Target-Wavelength-Component Separation Ratio

The target-wavelength-component separation ratio is defined as a ratio C/D of an input-output ratio C to an input-output ratio D, for each target wavelength-component.

In this regard, the input-output ratio C denotes a ratio of output optical power of at least one higher-order diffracted beam exiting the diffracted device 116, to optical power of incident light on the diffracted device 116. In addition, the input-output ratio D denotes a ratio of output optical power of a zeroth-order diffracted beam exiting the diffracted device 116, to optical power of incident light on the diffracted device 116.

(3) Deviation

The deviation is defined per each target wavelength-component, as a value obtained by dividing a difference between the target-wavelength-component separation ratio C/D and the reference-wavelength-component separation ratio A/B, by the reference-wavelength-component separation ratio A/B.

Specific Definitions of Input-Output Ratios

Exemplary specific versions of the above-mentioned input-output ratios A, B, C and D are defined per each colored-wavelength-component as follows:

(1) Input-Output Ratio of R Component Light Beam

R0: Ratio of output optical power of a zeroth-order diffracted beam generated by diffraction of the R component light beam incident on the diffractive device 116, to optical power of the incident R component light beam R1: Ratio of output optical power of a positive first-order diffracted beam generated by diffraction of the R component light beam incident on the diffractive device 116, to optical power of the incident R component light beam R-1: Ratio of output optical power of a negative first-order diffracted beam generated by diffraction of the R component light beam incident on the diffractive device 116, to optical power of the incident R component light beam (2) Input-Output Ratio of G Component Light Beam G0: Ratio of output optical power of a zeroth-order diffracted beam generated by diffraction of the G component light beam incident on the diffractive device 116, to optical power of the incident G component light beam G1: Ratio of output optical power of a positive first-order diffracted beam generated by diffraction of the G component light beam incident on the diffractive device 116, to optical power of the incident G component light beam G-1: Ratio of output optical power of a negative first-order diffracted beam generated by diffraction of the G component light beam incident on the diffractive device 116, to optical power of the incident G component light beam (3) Input-Output Ratio of B Component Light Beam B0: Ratio of output optical power of a zeroth-order diffracted beam generated by diffraction of the B component light beam incident on the diffractive device 116, to optical power of the incident B component light beam B1: Ratio of output optical power of a positive first-order diffracted beam generated by diffraction of the B component light beam incident on the diffractive device 116, to optical power of the incident B component light beam B-1: Ratio of output optical power of a negative first-order diffracted beam generated by diffraction of the B component light beam incident on the diffractive device 116, to optical power of the incident B component light beam It is added that each of the input-output ratios G1 and G-1 is an exemplary specific version of the aforementioned input-output ratio A, and the input-output ratio G0 is an exemplary specific version of the aforementioned input-output ratio B.

It is further added that each of the input-output ratios R1 and R-1 and B1 and B-1 is an exemplary specific version of the aforementioned input-output ratio C, and each of the input-output ratios R0 and B0 is an exemplary specific version of the aforementioned input-output ratio D.

Specific Definitions of Separation Ratios

Exemplary specific versions of the above-mentioned separation ratios A/B and C/D are defined using the above-mentioned input-output ratios, per each colored-wavelength-component, as follows:

(1) Separation Ratio on R Component Light Beam

R1/R0: Separation ratio in which the R component light beam is separated into a zeroth-order diffracted beam and a positive first-order diffracted beam R-1/R0: Separation ratio in which the R component light beam is separated into a zeroth-order diffracted beam and a negative first-order diffracted beam (2) Separation Ratio on G Component Light Beam G1/G0: Separation ratio in which the G component light beam is separated into a zeroth-order diffracted beam and a positive first-order diffracted beam G-1/G0: Separation ratio in which the G component light beam is separated into a zeroth-order diffracted beam and a negative first-order diffracted beam (3) Separation Ratio on B Component Light Beam B1/B0: Separation ratio in which the B component light beam is separated into a zeroth-order diffracted beam and a positive first-order diffracted beam B-1/B0: Separation ratio in which the B component light beam is separated into a zeroth-order diffracted beam and a negative first-order diffracted beam It is noted that each of the separation ratios G1/G0 and G-1/G0 is an exemplary specific version of the reference-wavelength-component separation ratio for the G component light beam which is a reference wavelength-component.

It is further noted that each of the separation ratios R1/R0 and R-1/R0 is an exemplary specific version of the target-wavelength-component separation ratio for the R component light beam as a first target-wavelength-component.

It is still further noted that each of the separation ratios B1/B0 and B-1/B0 is an exemplary specific version of the target-wavelength-component separation ratio for the B component light beam as a second target-wavelength-component.

Specific Definitions of Deviations

An exemplary specific version of the aforementioned deviation is defined, per each target wavelength-component, as follows:

(1) Deviation on R Component Light Beam (a) Deviation dev(R1) of the separation ratio, between a zeroth-order and a positive first-order of diffracted beams $$\mathrm{dev}(R1)=1-(R1\times G0)/(R0\times G1)$$

(b) Deviation dev(R-1) of the separation ratio between a zeroth-order and a negative first-order of diffracted beams $$dev(R\text{-}1)=1-(R\text{-}1\times G0)/(R0\times G\text{-}1)$$

(2) Deviation on B Component Light Beam (a) Deviation dev(B1) of the separation ratio between a zeroth-order and a positive first-order of diffracted beams $$dev(B1)=1-(B1\times G0)/(B0\times G1)$$

(b) Deviation dev(B-1) of the separation ratio between a zeroth-order and a negative first-order of diffracted beams $$dev(B\text{-}1)=1-(B\text{-}1\times G0)/(B0\times G\text{-}1)$$

It is noted that the aforementioned equalizer is structured to satisfy a condition that an absolute value of every one of the above-mentioned deviations dev(R1), dev(R-1), dev(B1) and dev(B-1) is required to be less than about 0.2. In this regard, the "about 0.2" is an example of the "first set-value" set forth in the above mode (29).

Failure of every one of the input-output ratios R0, R1, R-1, G0, G1, G-1, B0, B1 and B-1 to exceed about 0.1 means that an amount of light of a specific diffracted beam is below an allowable limit, and that amounts of light are not uniform between a plurality of diffracted beams and therefore amounts of light are not uniform between a plurality of exit pupils.

To prevent this, the equalizer employed by the diffraction grating 164 is structured to further satisfy an additional condition that every one of the input-output ratios R0, R1, R-1, G0, G1, G-1, B0, B1 and B-1 is required to exceed about 0.1 (more preferably, about 0.2). In this regard, the "about 0.1" is an example of the "second set-value" set forth in the above mode (31).

Figure 32:
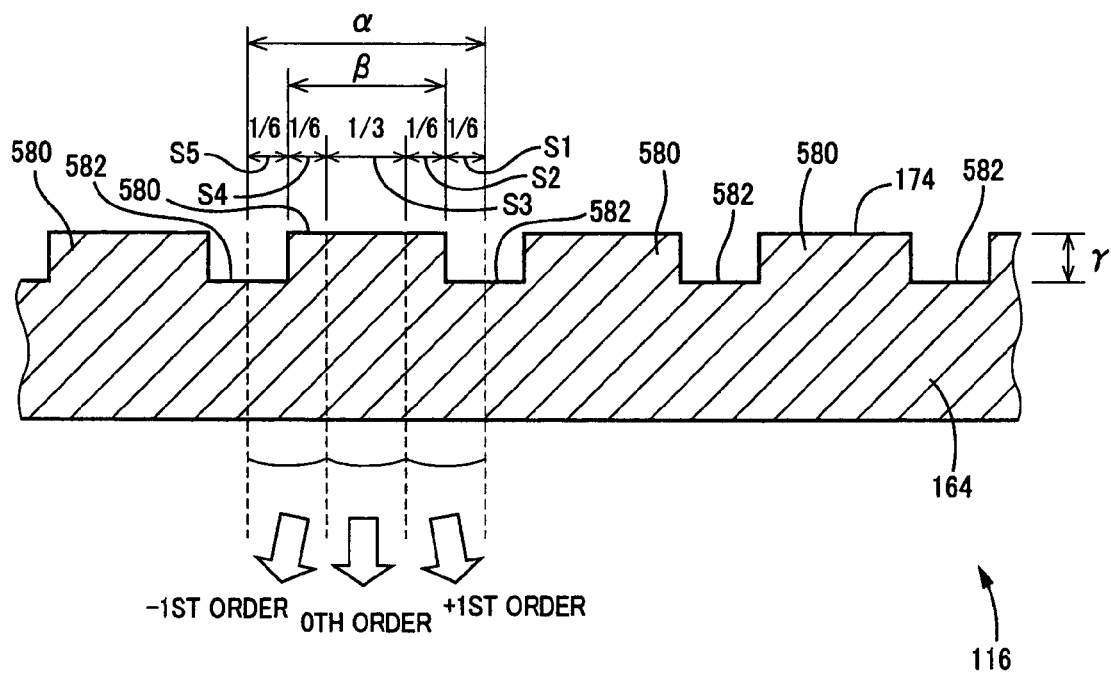
FIG. 32 is an enlarged cross-sectional view illustrating a fraction of a diffraction grating used in the diffractive device depicted in FIG. 29.

Referring now to FIG. 32, this equalizer will be described below in greater detail.

In FIG. 32, a fraction of the diffraction grating 164 of the diffractive device 116 is illustrated in an enlarged sectional view. This diffraction grating 164 is binary and transmissive.

This diffraction grating 164 is structured to have a one-dimensional array of alternating a plurality of raised portions 580 and a plurality of recessed portions 582. The array is located on the diffraction plane (light entrance plane) 174, and is elongated along one dimension (i.e., the grating direction).

In FIG. 32, there are also illustrated three coefficients $\alpha$, $\beta$ and $\gamma$ for use in defining a specific structure of the diffraction grating 164.

The coefficient $\alpha$ denotes a center-to-center distance (pitch) between two adjacent ones of the recessed portions 582, the coefficient $\beta$ denotes widths (e.g., equal widths) of the raised portions 580, and the coefficient $\gamma$ denotes heights (e.g., equal heights) of the raised portions 580, that is to say, depths (e.g., equal depths) of the recessed portions 582.

This diffraction grating 164 is of a periodic structure featured to concurrently satisfy a first condition pertaining to the coefficient $\gamma$ and a second condition pertaining to the coefficients $\alpha$ and $\beta$.

The first condition pertaining to the coefficient $\gamma$ is expressed by the following equation:

$$\gamma=\lambda/[2(n+1)],$$

where
$\lambda$: center wavelength of diverse wavelengths of the light incident on the diffraction grating 164, and
n: refractive index of the diffraction grating 164.

In this regard, the "center wavelength" may be defined as, for example, a center value between the wavelengths of the R and B component light beams, or a value equal to the wavelength of the G component light beam.

Once the diffraction grating 164 has been structured to satisfy the above-mentioned equation, a $\lambda/2$ (i.e., half-wavelength) phase difference is achieved between a portion of the incident planar wave on the diffraction grating 164 which is propagated by the raised portions 580 and another portion which is propagated by the grooves defined within and by the recessed portions 582.

This configuration (equalizer) of the diffraction grating 164 can cause mutual cancellation of a plurality of zeroth-order diffracted beams during propagation in the diffraction grating 164, resulting in distribution of total energy of the incident light on the diffraction grating 164 to a plurality of diffracted beams, in a manner that the output energy is distributed more intensively at higher-order diffracted light than at zeroth-order diffracted light.

Concurrently, this configuration (equalizer) of the diffraction grating 164 enables the energy distribution of the higher-order diffracted beams to show an extreme value (generally flat gradient range) with respect to the coefficient $\gamma$ and therefore the wavelength $\lambda$, resulting in relaxed wavelength-dependent characteristic of an amount of the distributed energy (output optical power) of the higher-order diffracted beams.

Zeroth-order diffracted light does not have an inherent wavelength-dependency, as will be understood from FIG. 31, as opposed to higher-order diffracted light. Therefore, there is no need of performing wavelength-dependency relaxation for zeroth-order diffracted light.

The aforementioned second condition pertaining to the coefficients $\alpha$ and $\beta$ are expressed by the following equation:

$$\beta/\alpha=2/3.$$

Describing with reference to FIG. 32, once the diffraction grating 164 has been fabricated so as to satisfy this second condition, the width of the raised portions 580 becomes twice as great as the width of the recessed portions 582.

Adding that, once the diffraction grating 164 has been fabricated so as to satisfy this second condition, a portion of the diffraction grating 164 which has the same width as the coefficient $\alpha$ is divided into five sub-portions S1-S5.

More specifically, the sub-portion S1 is defined by one of two halves of one of adjacent two recessed portions 582, and the sub-portion S5 is defined by one of two halves of the counterpart recessed portion 582. For each of the sub-portions S1 and S5, its one half has a width of one sixth of the coefficient $\alpha$.

The sub-portion S2 is defined by a fraction of one raised portion 580 which is adjacent to the sub-portion S1 and which has the same width as that of the sub-portion S1. The sub-portion S4 is defined by a fraction of one raised portion 580 which is adjacent to the sub-portion S5 and which has the same width as that of the sub-portion S5.

The sub-portion S3 is defined by a central fraction of one raised portion 580 which is interposed between its opposite ends defining the sub-portions S2 and S4, respectively.

As illustrated in FIG. 32, satisfaction of the aforementioned first condition by the sub-portions S1 and S2 enables only positive first-order diffracted light to be generated with its relaxed wavelength dependency as described above, without generating zeroth-order diffracted light. It is because mutual interference exists between the fraction of the light incident on and propagated by the sub-portion S1 and the fraction of the light incident on and propagated by the sub-portion S2.

Similarly, satisfaction of the first condition by the sub-portions S4 and S5 enables only positive first-order diffracted light to be generated with its relaxed wavelength dependency, without generating zeroth-order diffracted light. It is because mutual interference exists between the fraction of the light incident on and propagated by the sub-portion S4 and the fraction of the light incident on and propagated by the sub-portion S5.

A fraction of the diffraction grating 164 which causes positive first-order diffracted light to occurr has a width equal to the sum of the widths of the sub-portions S1 and S2, that is to say, a width equal to one third of the coefficient α.

Similarly, a fraction of the diffraction grating 164 which causes negative first-order diffracted light to occur has a width equal to the sum of the widths of the sub-portions S4 and S5, that is to say, a width equal to one third of the coefficient α.

In contrast, the sub-portion S3, which causes only zeroth-order diffracted light to occur, has a width equal to one third of the coefficient α, as described above.

Accordingly, this diffraction grating 164 operates to emit zeroth-order diffracted light and positive and negative first-order diffracted light at three equiwidth sub-areas of this diffraction grating 164, with generally equal amounts of output energy, respectively.

In other words, this diffraction grating 164 operates to emit three colored wavelength components into which a composite light beam incident on this diffraction grating 164 has been separated so as to have balanced distribution ratios with respect to an amount of output energy (also of an amount of light).

As will be evident from the above explanation, in the present embodiment, the three lasers 30, 32, and 34 together constitute an example of the "light source" set forth in each of the above modes (12) and (25), the horizontal scanning system 100 and the vertical scanning system 120 together constitute an example of the "scanner" set forth in the same mode, the last-stage lens group 144 constitutes an example of the "light exit" set forth in the same mode, and the diffractive device 116 constitutes an example of the "pupil expanding element" set forth in the same mode.

ELEVENTH EMBODIMENT

Next, an eleventh illustrated embodiment of the present invention will be described below.

The present embodiment is different from the tenth embodiment only with respect to the configuration of the diffractive device, and is common to the first embodiment with respect to the remaining elements.

Therefore, only the different elements of the present embodiment from those of the tenth embodiment will be described below in greater detail, while the common elements of the present embodiment to those of the tenth embodiment will be omitted in the description using the identical reference numerals or names for reference.

Figure 33:
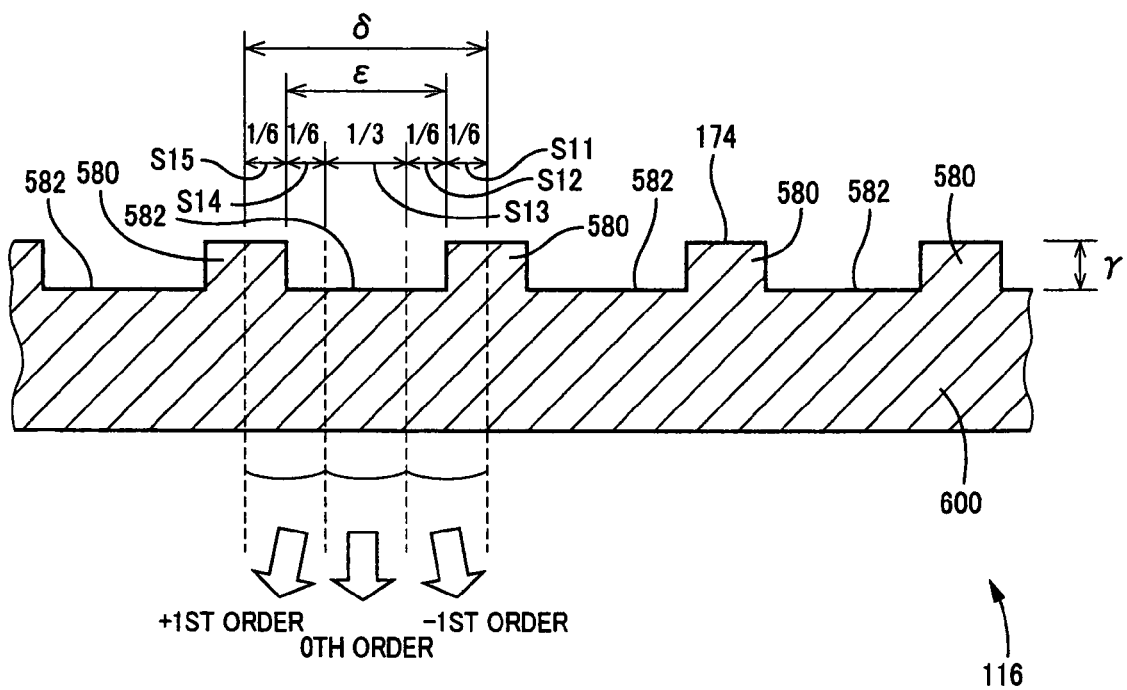
FIG. 33 is an enlarged cross-sectional view illustrating a fraction of a diffraction grating used in a diffractive device included in a retinal scanning display device constructed according to an eleventh illustrative embodiment of the present invention.

In FIG. 33, a diffraction grating 600 is illustrated in a partially-enlarged sectional view, which is used in an RSD constructed in accordance with the present embodiment, instead of the diffraction grating 164. This diffraction grating 600 employs the above-mentioned equalizer, similarly with the diffraction grating 164.

This diffraction grating 600 is binary and transmissive, similarly with the diffraction grating 164. This diffraction grating 600 is structured to have a one-dimensional array of alternating a plurality of raised portions 580 and a plurality of recessed portions 582. The array is located on the diffraction plane (light entrance plane) 174, and is elongated along one dimension (i.e., the grating direction).

In FIG. 33, three coefficient γ, δ and ε are also illustrated for use in defining the structure of the diffraction grating 600.

The coefficient δ, which is used instead of the above-mentioned coefficient α, denotes a center-to-center distance (pitch) between adjacent ones of the raised portions 580, differently from the coefficient α. The coefficient ε, which is used instead of the above-mentioned coefficient β, denotes widths (e.g., equal widths) of the recessed portions 582, differently from the coefficient β.

Even for this diffraction grating 600, the above-mentioned coefficient γ is defined in the same manner with the diffraction grating 164, so as to denote heights (e.g., equal heights) of the raised portions 580, that is to say, depths (e.g., equal depths) of the recessed portions 582.

This diffraction grating 600 is of a periodic structure featured to concurrently satisfy a first condition pertaining to the coefficient γ and a second condition pertaining to the coefficients δ and ε, similarly with the diffraction grating 164.

The first condition pertaining to the coefficient γ is expressed by the following equation, similarly with the diffraction grating 164:

$$\gamma = \lambda/[2(n+1)],$$

where

λ: center wavelength of diverse wavelengths of the light incident on the diffraction grating 600, and n: refractive index of the diffraction grating 600.

Once the diffraction grating 600 has been structured to satisfy the above-mentioned equation, total energy of the incident light on the diffraction grating 600 is distributed to a plurality of diffracted beams, in a manner that the output energy is distributed intensively at higher-order diffracted light than at zeroth-order diffracted light.

Concurrently, a tendency is offered that the energy distribution of the higher-order diffracted beams to show an extreme value (generally flat gradient range) with respect to the coefficient γ and therefore the wavelength λ, resulting in relaxed wavelength-dependent characteristic of an amount of the distributed energy (output optical power) of the higher-order diffracted beams.

The aforementioned second condition pertaining to the coefficients δ and ε are expressed by the following equation:

$$\epsilon/\delta = 2/3.$$

It is added that this second condition is expressed by the following equation, provided that the aforementioned coefficients α and β are used instead of the coefficients δ and ε:

$$\beta/\alpha = 1/3.$$

Describing with reference to FIG. 33, once the diffraction grating 600 has been fabricated so as to satisfy this second condition, the width of the raised portions 580 becomes equal to one-half the width of the recessed portions 582.

Adding that, once the diffraction grating 600 has been fabricated so as to satisfy this second condition, a portion of the diffraction grating 600 which has the same width as the coefficient δ is divided into five sub-portions S11-Sl5.

More specifically, the sub-portion S11 is defined by one of two halves of one of adjacent two raised portions 580, and the sub-portion S15 is defined by one of two halves of the counterpart raised portion 580. For each of the sub-portions S11 and S15, its one half has a width of one sixth of the coefficient δ.

The sub-portion S12 is defined by a fraction of one recessed portion 582 which is adjacent to the sub-portion S11 and which has the same width as that of the sub-portion S11. The sub-portion S14 is defined by a fraction of one ressesed portion 582 which is adjacent to the sub-portion S15 and which has the same width as that of the sub-portion S15.

The sub-portion S13 is defined by a central fraction of one recessed portion 582 which is interposed its opposite ends defining the sub-portions S12 and S14, respectively.

As illustrated in FIG. 33, satisfaction of the aforementioned first condition by the sub-portions S11 and S12 enables only positive first-order diffracted light to be generated with its relaxed wavelength dependency as described above, without generating zeroth-order diffracted light. It is because mutual interference exists between the fraction of the light incident on and propagated by the sub-portion S11 and the fraction of the light incident on and propagated by the sub-portion S12.

Similarly, satisfaction of the first condition by the sub-portions S14 and S15 enables only positive first-order diffracted light to be generated with its relaxed wavelength dependency, without generating zeroth-order diffracted light. It is because mutual interference exists between the fraction of the light incident on and propagated by the sub-portion S14 and the fraction of the light incident on and propagated by the sub-portion S15.

A fraction of the diffraction grating 600 which causes negative first-order diffracted light to occur has a width equal to the sum of the widths of the sub-portions S11 and S12, that is to say, a width equal to one third of the coefficient $\delta$.

Similarly, a fraction of the diffraction grating 600 which causes positive first-order diffracted light to occur has a width equal to the sum of the widths of the sub-portions S14 and S15, that is to say, a width equal to one third of the coefficient $\delta$.

In contrast, the sub-portion S13, which causes only zeroth-order diffracted light to occur, has a width equal to one third of the coefficient $\delta$, as described above.

Accordingly, this diffraction grating 600 operates to emit zeroth-order diffracted light and positive and negative first-order diffracted light at three equiwidth sub-areas of this diffraction grating 600, with generally equal amounts of output energy, respectively.

In other words, this diffraction grating 600 operates to emit three colored wavelength components into which a composite light beam has been separated so as to have balanced distribution ratios with respect to an amount of output energy (also of an amount of light)

It is added that, in the present embodiment, the relative geometry between the raised portions 580 and the recessed portions 582 has defined provided that transmission losses of zeroth-order diffracted light and higher-order diffracted light in the diffraction grating 600 are all zero or equal to each other. However, when those transmission losses are unnegligibly different from each other, the relative geometry between the raised portions 580 and the recessed portions 582 can be tuned accordingly.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A retinal scanning display device for projecting a light beam directly onto a retina of a viewer, and scanning the projected light beam on the retina, to thereby display an image onto the retina, the retinal scanning display device comprising:

a light source emitting the light beam;

a scanner scanning onto the retina the light beam emitted from the light source;

a light exit at which the light beam scanned by the scanner exits the retinal scanning display device;

a wavefront-curvature modulator modulating a wavefront curvature of the light beam emitted from the light source;

a pupil expanding element operable to expand an exit pupil of the retinal scanning display device, the pupil expanding element being disposed at a position which is offset from an intermediate image plane occurring between the light source and the light exit, along and within an optical path defined between the light source and the light exit; and a position adjuster adjusting a position of the pupil expanding element along the optical path, wherein:

the scanner scans onto the retina the light beam emitted from the wavefront-curvature modulator, and the light exit is in the form of a portion of the retinal scanning display device at which the light beam scanned by the scanner exits the retinal scanning display device.

2. The retinal scanning display device according to claim 1, wherein the position adjuster is configured to include a mechanical displacement mechanism which is mechanically operable in response to a user manipulation, to displace the pupil expanding element along the optical path.

3. The retinal scanning display device according to claim 1, wherein the position adjuster is configured to include an actuator which is operable in response to a drive signal, to displace the pupil expanding element along the optical path.

4. The retinal scanning display device according to claim 3, wherein the drive signal is indicative of a user-issued command.

5. The retinal scanning display device according to claim 3, wherein the drive signal is indicative of a position of the intermediate image plane in the optical path between the light source and the light exit.

6. The retinal scanning display device according to claim 3, wherein the wavefront-curvature modulator modulates the wavefront curvature in response to a depth signal indicative of depth information of the image, and the drive signal is responsive to the depth signal.

7. The retinal scanning display device according to claim 1, wherein the image is defined to include a plurality of depth-controllable minimum sub-images having individual depths and individual wavefront curvatures, respectively, the wavefront-curvature modulator modulates the individual wavefront curvatures in response to a depth signal indicative of the individual depths, on a per-depth-controllable-minimum-sub-image basis, the position adjuster is configured to include an actuator operable in response to a drive signal, to displace the pupil expanding element along the optical path, the image is defined to include a plurality of actuator-controllable minimum sub-areas of the image each of which has a size larger than that of each of the depth-controllable minimum sub-images of the image, the position adjuster is configured to further include a controller controlling the actuator depending on the depth signal, on a per-actuator-controllable-minimum-sub-area basis, and the controller is configured to generate the drive signal based on the depth signal, the drive signal allowing the actuator to be unchanged in status over a same one of the actuator-controllable minimum sub-areas of the image, the controller being further configured to supply the generated drive signal to the actuator.

8. The retinal scanning display device according to claim 7, wherein the depth signal is made up of a plurality of portions which correspond to the plurality of actuator-controllable minimum sub-areas of the image, respectively,
  each of the plurality of portions represents a plurality of individual depth values, on a per-depth-controllable-minimum-sub-image basis, and
  the controller is configured to include:
    an obtainer obtaining a representative depth value in common to the plurality of individual depth values, on a per-actuator-controllable-minimum-sub-area basis; and
    a generator generating the drive signal based on the obtained representative depth value.

9. The retinal scanning display device according to claim 8, wherein each of the plurality of actuator-controllable-minimum-sub-areas is selected from the group including:
  a group of adjacent ones of a plurality of pixels collectively making up the image;
  one of a plurality of successive scan-lines for the image;
  a selected local portion of a frame of the image;
  an entire frame of the image; and
  a group of a successive frames of the image.

10. The retinal scanning display device according to claim 8, wherein the obtainer obtains the representative depth value by averaging a total or fraction of the plurality of individual depth values, or by selecting one of the plurality of individual depth values.

11. The retinal scanning display device according to claim 1, wherein the position adjuster is configured to have a function of adjusting the position of the pupil expanding element in the optical path, in response to a user-issued command, and
  the retinal scanning display device further comprising a support-picture displaying section displaying onto the retina a support picture which is configured to visually support a user during a position adjustment work for the user to adjust the position of the pupil expanding element in the optical path, using the position adjuster.

12. The retinal scanning display device according to claim 11, further comprising a focus adjuster adjusting a focus position of the image displayed on the retina, in response to a user-issued command, wherein the support picture is configured to visually support the user not only during the position adjustment work but also during a focus adjustment work for the user to adjust the focus position of the image using the focus adjuster.

13. A retinal scanning display device for projecting a light beam directly onto a retina of a viewer, and scanning the projected light beam on the retina, to thereby display an image onto the retina, the retinal scanning display device comprising:
  a light source emitting the light beam;
  a scanner scanning onto the retina the light beam emitted from the light source;
  a light exit at which the light beam scanned by the scanner exits the retinal scanning display device; and
  a pupil expanding element operable to expand an exit pupil of the retinal scanning display device, the pupil expanding element being disposed in an optical path defined between the light source and the light exit, wherein:
    the light source emits a composite light beam having a plurality of different wavelengths,
    the scanner scans onto the retina the composite light beam emitted from the light source,
    the light exit is in the form of a portion of the retinal scanning display device at which the composite light beam scanned by the scanner exits the retinal scanning display device,
    the pupil expanding element is structured to divide the composite light beam incident thereon into a plurality of wavelength components, and to separate each of the wavelength components into a plurality of diffracted beams in different diffraction orders and in different propagation directions,
    the diffracted beams include a zeroth-order diffracted beam and at least one higher-order diffracted beam, on a per-wavelength-component basis,
    the wavelength components are each separated, at the pupil expanding element, into the zeroth-order diffracted beam and the at least one higher-order diffracted beam, in respective separation ratios, and
    the pupil expanding element is configured to include an equalizer structured to equalize the separation ratios for the plurality of wavelength components, to each other or one another.

14. The retinal scanning display device according to claim 13, wherein the plurality of wavelength components include a pre-selected reference wavelength-component, and at least one pre-selected target wavelength-component to be compared with the reference wavelength-component,
  the separation ratios include a reference-wavelength-component separation ratio in which the pre-selected reference wavelength-component is separated, at the pupil expanding element, into the zeroth-order diffracted beam and the at least one higher-order diffracted beam, and a target-wavelength-component separation ratio in which the pre-selected at least one target wavelength-component is separated, at the pupil expanding element, into the zeroth-order diffracted beam and the at least one higher-order diffracted beam, and
  the equalizer is configured to have a structure allowing a deviation between the target-wavelength-component separation ratio and the reference-wavelength-component separation ratio, to become less than a first set-value.

15. The retinal scanning display device according to claim 14 wherein the reference-wavelength-component separation ratio is defined as a ratio A/B of an input-output ratio A to an input-output ratio B, for the reference wavelength-component, provided that the input-output ratio A denotes a ratio of output optical power of the at least one higher-order diffracted beam, to optical power of incident light on the pupil expanding element, and that the input-output ratio B denotes a ratio of output optical power of the zeroth-order diffracted beam, to optical power of incident light on the pupil expanding element, and
  the target-wavelength-component separation ratio is defined as a ratio C/D of an input-output ratio C to an input-output ratio D, for each of the at least one target wavelength-component, provided that the input-output ratio C denotes a ratio of output optical power of the at least one higher-order diffracted beam, to optical power of incident light on the pupil expanding element, and that the input-output ratio D denotes a ratio of output optical power of the zeroth-order diffracted beam, to optical power of incident light on the pupil expanding element.

16. The retinal scanning display device according to claim 15, wherein the deviation for each of the at least one target wavelength-component is defined as a value obtained by dividing a difference between the target-wavelength-component separation ratio C/D and the reference-wavelength-component separation ratio A/B, by the reference-wavelength-component separation ratio A/B.

17. The retinal scanning display device according to claim 16, wherein the first set-value is equal to or greater than about 0.2.

18. The retinal scanning display device according to claim 15, wherein the input-output ratios A, B, C and D are all greater than a second set-value.

19. The retinal scanning display device according to claim 18, wherein the second set-value is equal to or greater than about 0.1.

20. The retinal scanning display device according to claim 14, wherein the plurality of wavelength components include red-, green- and blue-colored monochromatic light beams, the reference wavelength-component is selected as the green-colored monochromatic light beam, and the at least one target wavelength-component is selected as at least one of the red-and blue-colored monochromatic light beams.

21. The retinal scanning display device according to claim 13, wherein the pupil expanding element is configured to include a diffraction grating of a periodic structure having alternating raised portions and recessed portions arrayed in a predetermined direction non-parallel to a direction in which the composite light beam is incident on the pupil expanding element, and each recessed portion is structured to have a depth dimension allowing a phase difference between a portion of the composite light beam propagating in each recessed portion and a portion of the composite light beam propagating in each raised portion, to be substantially coincident with one-half a representative wavelength of the plurality of wavelength components.

22. The retinal scanning display device according to claim 21, wherein each raised portion is structured to have a width dimension substantially coincident with twice or one-half a width dimension of each recessed portion.

23. A retinal scanning display device comprising:

a light source emitting a composite light beam having multiple wavelengths;

a scanner scanning onto a viewer s retina the composite light beam emitted from the light source;

a light exit at which the composite light beam scanned by the scanner exits the retinal scanning display device; and a diffraction grating operable to generate multiple closely spaced or overlapping exit pupils of the retinal scanning display device, the diffraction grating being disposed in an optical path defined between the light source and the light exit, wherein the diffraction grating is structured to divide the composite light beam incident thereon into a plurality of wavelength components, and to separate each of the wavelength components into a plurality of diffracted beams in different diffraction orders and in different propagation directions, the diffracted beams defining the multiple exit pupils, respectively, the diffracted beams include a zeroth-order diffracted beam and at least one higher-order diffracted beam, on a per-wavelength-component basis, the wavelength components are each separated, at the diffraction grating, into the zeroth-order diffracted beam and the at least one higher-order diffracted beam, in respective separation ratios, and the diffraction grating is configured to include an equalizer structured to equalize the separation ratios for the plurality of wavelength components, to each other or one another.

* * * * *